(12) United States Patent  (10) Patent No.: US 8,083,355 B2
Yanagisawa et al.  (45) Date of Patent: Dec. 27, 2011

(54) OPTICAL DEVICE AND PROJECTOR

(75) Inventors: Yoshiyuki Yanagisawa, Matsumoto (JP); Yasunaga Momose, Tatsuno-machi (JP); Motoyuki Fujimori, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 737 days.

(21) Appl. No.: 11/902,628

(22) Filed: Sep. 24, 2007

(65) Prior Publication Data

US 2008/0174741 A1 Jul. 24, 2008

(30) Foreign Application Priority Data

Sep. 29, 2006 (JP) .................................. 2006-267943
Sep. 29, 2006 (JP) .................................. 2006-267944

(51) Int. Cl.
*G03B 21/18* (2006.01)
(52) U.S. Cl. ............................................ 353/54; 353/53
(58) Field of Classification Search .................... 353/51, 353/53, 54; 349/161, 72–75
See application file for complete search history.

(56) References Cited

U.S. PATENT DOCUMENTS

| 4,772,098 | A | * | 9/1988 | Ogawa | 349/5 |
| 5,170,195 | A | * | 12/1992 | Akiyama et al. | 353/54 |
| 7,216,988 | B2 | * | 5/2007 | Kitabayashi | 353/54 |
| 2006/0197917 | A1 | | 9/2006 | Zakoji et al. | |
| 2006/0279706 | A1 | * | 12/2006 | Bash et al. | 353/54 |
| 2007/0051057 | A1 | | 3/2007 | Zakoji et al. | |

FOREIGN PATENT DOCUMENTS

| JP | A 09-022013 | 1/1997 |
| JP | A-09-331177 | 12/1997 |
| JP | A 2001-312002 | 11/2001 |
| JP | A 2003-057754 | 2/2003 |
| JP | A 2005-202330 | 7/2005 |
| JP | A 2005-215006 | 8/2005 |
| JP | A 2006-243122 | 9/2006 |
| JP | A 2006-243123 | 9/2006 |
| JP | A 2006-330642 | 12/2006 |
| JP | A 2007-041412 | 2/2007 |
| JP | A 2007-041413 | 2/2007 |
| JP | A 2007-041414 | 2/2007 |

* cited by examiner

*Primary Examiner* — Que T Le
*Assistant Examiner* — Jerry Brooks
(74) *Attorney, Agent, or Firm* — Oliff & Berridge, PLC

(57) ABSTRACT

A projector, includes: a light source device; an optical device that modulates a light beam irradiated from the light source device in accordance with image information; and a projection optical device that projects the light beam modulated by the optical device. The optical device includes: an optical element optically converting the light beam incident thereon and emitting the converted light beam; and a heat-conducting member that is connected with the optical element in a heat transferable manner to cool the optical element. The heat-conducting member includes a heat pipe having: a tube; a capillary structure provided in the tube; and a coolant housed in the tube, the coolant circulating in the tube to transfer heat in the heat-conducting member. An optical-element-side connecting portion of the optical element to be connected with the heat-conducting member and a heat-conducting-member-side connecting portion of the heat-conducting member to be connected with the optical-element-side connecting portion are configured to be in a surface-contact when the connecting portions are connected to each other.

10 Claims, 27 Drawing Sheets

OPTICAL DEVICE AND PROJECTOR

The entire disclosure of Japanese Patent Applications No. 2006-267943 and No. 2006-267944, both filed Sep. 29, 2006, is expressly incorporated by reference herein.

BACKGROUND

1. Technical Field

The present invention relates to an optical device and a projector.

2. Related Art

There have been known projectors including an optical modulator that modulates a light beam irradiated from a light source in accordance with image information and a projection optical device that projects the light beam modulated by the optical modulator in an enlarged manner.

As the optical modulator, an optical modulating element (a liquid crystal panel) in which liquid crystal is sealed between a pair of substrates are generally used. On a light incident side and a light emitting side of the optical modulating element, an incident-side polarizer and an irradiation-side polarizer which transmit a light beam having a predetermined polarization axis are respectively disposed.

In the projector that includes optical elements such as the optical modulating element, the incident-side polarizer and the irradiation-side polarizer, heat absorption of the light beam from the light beam source by a liquid crystal layer, a black matrix, wiring and the like often causes temperature rise in the optical modulating element and heat generation in the polarizer.

Accordingly, for the projector that accommodates the above-described optical elements, a technique for cooling the optical elements using a heat pipe has been suggested (see, for instance, a patent document JP-A-2001-312002).

In the technique disclosed in the document, the heat pipe is disposed at a position spaced from the optical elements such as a liquid crystal panel and a cooling fin is in thermal contact with a heat-absorbing portion (an evaporating portion) of the heat pipe. Heat in air in the vicinity of the optical elements such as the liquid crystal panel is transferred to the cooling fin. The heat in the cooling fin is absorbed by the heat pipe, transferred to a heat releasing portion (a condensing portion) of the heat pipe to be released.

However, since the technique disclosed in the document cools the optical element via the air, thermal resistance in the heat transfer from the air to the evaporating portion (the cooling fin) of the heat pipe is large, so that it is difficult to lower the temperature of the air. As a result, the optical elements cannot be efficiently cooled.

SUMMARY

An advantage of some aspects of the present invention relates to an optical device and a projector which efficiently cool an optical element.

A projector according to an aspect of the invention includes: a light source device; an optical device that modulates a light beam irradiated from the light source device in accordance with image information; and a projection optical device that projects the light beam modulated by the optical device. The optical device includes: an optical element optically converting the light beam incident thereon and emitting the converted light beam; and a heat-conducting member that is connected with the optical element in a heat transferable manner to cool the optical element. The heat-conducting member includes a heat pipe having: a tube; a capillary structure provided in the tube; and a coolant housed in the tube, the coolant circulating in the tube to transfer heat in the heat-conducting member. An optical-element-side connecting portion of the optical element to be connected with the heat-conducting member and a heat-conducting-member-side connecting portion of the heat-conducting member to be connected with the optical-element-side connecting portion are configured to be in a surface-contact when the connecting portions are connected to each other.

The optical element may include an optical element body such as an optical modulating element, an incident-side polarizer, an irradiation-side polarizer and the like and a holder frame holding the optical element body or may only have the optical element body with no holder frame.

The heat-conducting member may include a heat pipe and another member connecting with the heat pipe in a heat transferable manner or may only have the heat pipe with no the another member.

The capillary structure may be provided in various forms, which includes extra-fine line wick of a plurality of fine copper lines and the like, net-like metal mesh wick, groove-wick in which a plurality of grooves are formed inside the tube and sintered wick of powder form.

The optical element and the heat-conducting member only need to have shapes in which connecting portions (the optical-element-side connecting portion and the heat-conducting-member-side connecting portion) surface-contact with each other. Accordingly, various arrangements of the connecting portions can be exemplified such as an arrangement where the optical-element-side connecting portion is provided on an outer surface of the optical element and the heat-conducting-member-side connecting portion is formed to coincide with a profile of the outer surface of the optical element, an arrangement where the heat-conducting-member-side connecting portion is provided on an outer surface of the heat-conducting member and the optical-element-side connecting portion is formed to coincide with a profile of the outer surface of the heat-conducting member, and an arrangement where the optical-element-side connecting portion and the heat-conducting-member-side connecting portion are respectively provided to be in surface-contact with each other.

According to the aspect of the invention, the heat-conducting member includes a heat pipe and is connected to the optical element in a heat-transferable manner. Accordingly, as compared with a related-art arrangement, the heat-conducting member is directly connected with the optical element without interposition of air, heat-resistance on the heat transfer passage from the optical element to the heat-conducting member can be lowered.

The optical element and the heat-conducting member have shapes for allowing a surface-contact of the connecting portions (the optical-element-side connecting portion and the heat-conducting-member-side connecting portion, respectively). Accordingly, a contact area between the optical element and the heat-conducting member can be increased, thereby enhancing heat transfer characteristics from the optical element to the heat-conducting member.

Hence, the optical element can be efficiently cooled to prevent temperature rise in the optical element, so that thermal degradation of the optical element can be efficiently avoided.

In the projector according the aspect of the invention, the optical-element-side connecting portion may be an outer surface of the optical element. The heat-conducting-member-side connecting portion of the heat-conducting member may be formed on an outer surface of the heat pipe. The heat-conducting-member-side connecting portion of the heat pipe may be provided by pressing so as to coincide with a profile of the outer surface of the optical element.

According to the aspect of the invention, the outer surface of the optical element is connected with the outer surface of the heat pipe in a heat transfer manner. The heat-conducting-member-side connecting portion provided on the outer surface of the heat pipe is pressed so as to coincide with the profile of the outer surface of the optical element. Accordingly, as compared with an arrangement where the outer surface of the heat pipe serves as the heat-conducting-member-side connecting portion and the optical-element-side connecting portion is formed to coincide with the outer profile of the heat pipe, a structure for achieving surface-contact between the connecting portions of the optical element and the heat pipe (the optical-element-side connecting portion and the heat-conducting-member-side connecting portion) can be obtained only by pressing the heat pipe, thereby efficiently cooling the above-described optical element with a simple arrangement to prevent temperature rise in the optical element, thereby efficiently avoiding heat degradation of the optical element.

In the projector according to the aspect of the invention, the heat-conducting member may include an outer frame body that surface-contacts with the outer surface of the heat pipe in a heat transferable connection, and the heat-conducting-member-side connecting portion may be formed on an outer surface of the outer frame body.

According to the aspect of the invention, the heat-conducting member includes the heat pipe and the outer frame body and surface-contacts with the optical element with the outer frame body interposed between the heat pipe and the optical element. Accordingly, as compared with, for example, an arrangement where the heat pipe is pressed such that the heat pipe surface-contacts with the optical element, since the outer frame body is interposed between the optical element and the heat pipe, no pressing is required on the heat pipe and it is only necessary to process the heat-conducting-member-side connecting portion on the outer surface of the outer frame body into a shape in coincidence with the profile of the outer surface of the optical element, thereby efficiently cooling the above-described optical element to prevent temperature rise in the optical element while efficiently maintaining the characteristics of the heat pipe to efficiently avoid heat degradation of the optical element.

In the projector according to the aspect of the invention, the optical-element-side connecting portion may be provided on each of mutually-opposing sides of the optical element. The heat-conducting member may have a U-shape in plan view which is formed by a base end extending in a predetermined direction and a pair of extending portions extending from ends of the base end in a direction substantially orthogonal to the extending direction of the base end. The pair of extending portions may be each provided with the heat-conducting-member-side connecting portion in correspondence with the optical-element-side connecting portion.

According to the aspect of the invention, the heat-conducting member is formed in the U-shape including the base end and the pair of extending portions, and the heat-conducting-member-side connecting portion is provided on each of the pair of extending portions. The heat-conducting-member-side connecting portions provided on the pair of extending portions of the heat-conducting member are connected with the optical-element-side connecting portions provided on the mutually-opposing sides of the optical element in a heat transferable manner. In other words, the heat pipe constituting the heat-conducting member functions as the evaporating portion on which at least a part of the pair of extending portions and sides spaced from the evaporating portion (for instance, the base end) functions as the condensing portion for releasing heat. Accordingly, as compared with an arrangement where, for instance, the heat-conducting member is connected with only one of the sides of the optical element in a heat-transferable manner, a plurality of coolant reflux passages (for example, two) can be provided in the tube between at least one of the evaporating portions of the extending portions and the condensing portions located apart from the evaporating portions (for example, two), so that a heat transfer rate in the tube can be increased to efficiently cool the optical element, thereby preventing temperature rise in the optical element to efficiently avoid heat degradation of the optical element. To efficiently cool the optical element, an arrangement where, for example, two heat-conducting members are connected to the mutually-opposing sides of the optical element in a heat-transferable manner is conceivable. In the arrangement according to the invention, the optical element can be sufficiently cooled by only one heat-conducting member, so that the structure of the optical device can be simplified to reduce the cost of the optical device.

In the projector according to the aspect of the invention, the optical-element-side connecting portion may be provided on each of mutually-opposing sides of the optical element. The heat-conducting member may have a ring shape enclosing an outer periphery of the optical element, the heat-conducting member being provided with the heat-conducting-member-side connecting portion on mutually-opposing inner sides of the ring shape.

According to the aspect of the invention, the heat-conducting member has a ring shape enclosing an outer periphery of the optical element and is provided with the heat-conducting-member-side connecting portions on mutually-opposing inner sides of the ring shape. The mutually-opposing heat-conducting-member-side connecting portions provided of the inner side of the ring shape of the heat-conducting member are connected with the optical-element-side connecting portions provided on the mutually-opposing sides of the optical element in a heat transferable manner. In other words, in the heat pipe constituting the heat-conducting member, at least a part of the portions on which the heat-conducting-member-side connecting portions are provided functions as the evaporating portion for absorbing heat, and the portions located between the heat-conducting-member-side connecting portions on the sides spaced from the evaporating portion function as the condensing portion for releasing heat. Accordingly, as compared with, an arrangement where, for instance, the heat-conducting member is connected only with one of the sides of the optical element in a heat-transferable manner, a plurality of (for example, four) coolant reflux passages can be provided in the tube between at least the part of the portions on which the heat-conducting-member-side connecting portions are provided and the condensing portions located apart from the evaporating portions (the portions located between the heat-conducting-member-side connecting portions), so that a heat transfer rate in the tube can be increased, which allows efficient cooling of the optical element, thereby preventing temperature rise in the optical element to efficiently avoid heat degradation of the optical element. To efficiently cool the optical element, for example, an arrangement where two heat-conducting members are connected to the mutually-opposing sides of the optical element in a heat-transferable manner is conceivable. In the arrangement according to the invention, the optical element can be efficiently cooled by only one heat-conducting member and temperature increase in the optical element can be prevented, so that the structure of the optical device can be simplified to reduce the cost of the optical device.

In the projector according to the aspect of the invention, a fin-like portion for heat-releasing may be provided on the outer surface of the heat-conducting member.

According to the aspect of the invention, since the fin-like portion for releasing heat is provided on the outer surface of the heat-conducting member, the heat absorbed by the evaporating portions of the heat-conducting member from the optical element is released to the outside via the fin-like portion. Hence, a sufficient heat releasing area of the heat-conducting member can be obtained, thereby providing excellent heat releasing characteristics.

In the projector according to the aspect of the invention, the fin-like portion may be made by forming the outer surface of the heat-conducting member into a fin-like shape.

According to the aspect of the invention, as compared with an arrangement where the fin-like portion is provided as a body separate from the heat-conducting member, since the outer surface of the heat-conducting member is formed in a fin-like shape, the heat moving in the tube in the heat-conducting member can be efficiently transferred to the fin-like portion and efficiently released via the fin-like portion.

In the projector according to the aspect of the invention, the fin-like portion may be a body separate from the heat-conducting member, the fin-like portion being connected to the outer surface of the heat-conducting member in a heat transferable manner.

According to the aspect of the invention, since the fin-like portion is provided as a body separate from the heat-conducting member, the shape of the fin-like portion may be selected with less limitation and flexibility in the designing the fin-like portion can be enhanced as compared with an arrangement where the outer surface of the heat-conducting member is formed into a fin-like shape to serve as the fin-like portion.

A projector according to an aspect of the invention includes: a light source device; an optical device that modulates a light beam irradiated from the light source device in accordance with image information; and a projection optical device that projects the light beam modulated by the optical device. The optical device includes: an optical element optically converting an incident light beam and emitting the converted light beam; and a heat pipe of which outer surface is connected with the optical element in a heat transferable manner to cool the optical element. The heat pipe includes: a tube; a capillary structure provided in the tube; and a coolant housed in the tube, the coolant circulating in the tube to transfer heat in the heat pipe. A fin-like portion for heat-releasing is provided on the outer surface of the heat pipe.

The optical element may include an optical element body such as an optical modulating element, an incident-side polarizer, an irradiation-side polarizer and the like and a holder frame holding the optical element body or may only have the optical element body with no holder frame.

The capillary structure may be provided in various forms, which includes extra-fine line wick of a plurality of fine copper lines and the like, net-like metal mesh wick, groove-wick in which a plurality of grooves are formed inside the tube and sintered wick of powder form.

According to the aspect of the invention, the outer surface of the heat pipe is connected with the optical element in a heat-transferable manner. Accordingly, as compared with a related-art arrangement, the heat pipe is directly connected with the optical element without interposition of air, heat-resistance on the heat transfer passage from the optical element to the heat pipe can be lowered.

On the outer surface of the heat pipe, the fin-like portion for releasing heat is provided. Accordingly, the heat absorbed by the evaporating portions of the heat pipe from the optical element is released to the outside via the fin-like portion. Hence, a sufficient heat releasing area can be obtained in the heat pipe to ensure excellent heat releasing characteristics of the heat pipe, so that the temperature of the condensing portions located apart from the evaporating portions can be lowered. Specifically, a temperature difference between the evaporating portions and the condensing portions of the heat pipe can be set large, thereby increasing the heat transfer rate in the tube.

Hence, the optical element can be efficiently cooled to prevent temperature rise in the optical element, so that thermal degradation of the optical element can be efficiently avoided.

The projector according to the aspect of the invention, the heat pipe may have an I-shape in plan view.

According to the aspect of the invention, since the heat pipe has the I-shape in plan view, no processing such as bending the heat pipe is required, the optical element can be efficiently cooled by a simply-structured heat pipe.

Further, the heat pipe has the I-shape in plan view and is adapted to have a length substantially the same as the outer dimension of the optical element (the longitudinal dimension and the lateral direction) and to be connected with the outer surface of the optical element, the size of the optical device can be compact even when the heat pipe is attached to the optical element, thereby contributing to downsizing of the optical device.

The projector according to the aspect of the invention, the heat pipe may have a U-shape in plan view which is formed by a base end extending in a predetermined direction and a pair of extending portions extending from both ends of the base end in a direction substantially orthogonal to the extending direction of the base end. An outer surface of an outer side of the U-shape of one of the pair of extending portions may be connected with the optical element in a heat transferable manner.

According to the aspect of the invention, the heat pipe has the U-shape in plan view having the base end and the pair of extending portions and the outer surface of the outer side of the U-shape of one of the pair of extending portions is connected with the optical element in a heat transferable manner. Accordingly, by connecting the heat pipe to a side extending in a self-weight direction (vertical direction) out of the sides of the optical element, the length in the vertical direction (the thickness) of the projector on which the optical device is mounted will not be large on account of the heat pipe. When the optical device is housed in the projector, the heat pipe can be easily located in a gap between components in the projector, thereby avoiding increase in size of the projector. In addition, the heat pipe has the above-described shape and connecting structure, so that the length of the heat pipe can be large while avoiding increase in size of the projector in order to increase a heat-releasing area of the heat pipe and a temperature difference of the evaporating portions and the condensing portions, thereby increasing the heat transfer rate in the tube.

The projector according to the aspect of the invention, the fin-like portion may include a first fin-like portion provided on the outer surface of an inner side of the U-shape of the heat pipe and a second fin-like portion provided on the outer surface of the outer side of the U-shape of the heat pipe.

According to the aspect of the invention, since the fin-like portion includes the first fin-like portion provided on the outer surface of the inner side of the U-shape of the heat pipe and the second fin-like portion provided on the outer surface of the outer side of the U-shape of the heat pipe, a sufficient heat releasing area can be obtained while preventing increase in size of the optical device on account of to the fin-like portion provided on the heat pipe.

In the projector according to the aspect of the invention, the heat pipe may have a ring shape, and an outer surface of an outer side of the ring shape may be connected to the optical element in a heat transferable manner.

According to the aspect of the invention, the heat pipe has a ring shape and the outer surface of the heat pipe of the outer side of the ring shape is connected with the optical element in a heat-transferable manner. Accordingly, by connecting the heat pipe to a side extending in a self-weight direction (vertical direction) out of the sides of the optical element, the length of the heat pipe can be set large while avoiding increase in size of the projector as described above, so that a heat-releasing area of the heat pipe can be increased and a temperature difference of the evaporating portions and the condensing portions can be increased, thereby increasing the heat transfer rate in the tube.

Further, by forming and connecting the heat pipe in the above-described manner, at least a part of the connecting portion of the heat pipe to be connected with the optical element functions as the evaporating portion and the portions on the sides spaced from the evaporating portion function as the condensing portions. Accordingly, since the heat pipe has the ring shape, two reflux passages for coolant in the tube can be provided between the evaporating portions and the condensing portion in the heat pipe, thereby increasing the heat transfer rate in the tube.

In the projector according to the aspect of the invention, the fin-like portion may include a first fin-like portion provided on the outer surface of an inner side of the ring shape of the heat pipe and a second fin-like portion provided on the outer surface of the outer side of the ring shape of the heat pipe.

According to the aspect of the invention, since the fin-like portion includes the first fin-like portion provided on the outer surface of the inner side of the ring shape of the heat pipe and the second fin-like portion provided on the outer surface of the outer side of the ring shape of the heat pipe, a sufficient heat releasing area can be obtained while preventing increase in size of the optical device due to the fin-like portion provided on the heat pipe.

In the projector according to the aspect of the invention, the heat pipe may have a U-shape in plan view which is formed by a base end extending in a predetermined direction and a pair of extending portions extending from both ends of the base end in a direction substantially orthogonal to the extending direction of the base end, and the pair of extending portions of the heat pipe are connected to the mutually-opposing sides of the optical element in a heat transferable manner.

According to the aspect of the invention, the heat pipe is formed in the U-shape in plan view including the base end and the pair of extending portions and the pair of extending portions of the heat pipe are connected to the mutually-opposing sides of the optical element in a heat transferable manner. In other words, at least a part of the pair of extending portions functions as the evaporating portion and the sides spaced from the evaporating portion (for example, the base end) of the heat pipe function as the condensing portions. Accordingly, as compared with an arrangement where, for instance, the heat pipe is connected with only one of the sides of the optical element in a heat-transferable manner, a plurality of (for example, two) coolant reflux passages can be provided in the tube between at least the one evaporating portion of the extending portions and the condensing portions located apart from the evaporating portions, so that a heat transfer rate in the tube can be increased. To efficiently cool the optical element, for example, an arrangement where the heat pipes in the above-described I-shape are connected to the mutually-opposing sides of the optical element in a heat-transferable manner is conceivable. In the arrangement according to the invention, the optical element can be efficiently cooled by only one heat pipe, so that the structure of the optical device can be simplified to reduce the cost of the optical device.

In the projector according to the aspect of the invention, the fin-like portion may be provided on each of outer surfaces of the pair of extending portions.

According to the aspect of the invention, sufficient heat releasing area can be obtained on account of the two fin-like portions provided on the outer surfaces of the pair of extending portions of the heat pipe.

In the projector according to the aspect of the invention, the heat pipe may have bend-forming portions in which distal ends of the pair of extending portions are bent away from each other and further bent to extend so as to respectively face the pair of extending portions.

According to the aspect of the invention, the heat pipe is formed in a shape including the base end, the pair of extending portions and the bend-forming portion. Accordingly, as compared with an arrangement where, for example, two heat pipes having U-shape in plan view are provided and the outer surface of the outer side of the U-shape of one of the pair of extending portions is connected with the optical element in a heat-transferable manner, these two heat pipes being connected to the mutually-opposing sides of the optical element in a heat-transferable manner, the optical element can be efficiently cooled by only one heat pipe, so that the structure of the optical device can be simplified to reduce the cost of the optical device.

In the projector according to the aspect of the invention, the fin-like portion may include first fin-like portions provided on outer surfaces of an inner side of a U-shape formed by the pair of extending portions and the bend-forming portions and second fin-like portions provided on the outer surfaces of an outer side of the U-shape formed by the pair of extending portions and the bend-forming portions.

According to the aspect of the invention, since the fin-like portion includes the first fin-like portions provided on the outer surface of the inner side of the U-shape formed by the pair of extending portions and the bend-forming portion and the second fin-like portions provided on the outer surface of the outer side of the U-shape formed by the pair of extending portions and the bend-forming portion, sufficient heat releasing area can be obtained while preventing increase in size of the optical device on account of the fin-like portions provided on the heat pipe.

In the projector according to the aspect of the invention, the optical device may include: a color-combining projector in a rectangular shape in plan view that includes three light-incident-side surfaces on which the light beam is respectively incident and a light-emitting-side surface from which the light beam is irradiated, the color-combining projector emitting the incident light beams after being combined. Three of the optical element may be respectively provided on the three light-beam incident side surfaces so as to enclose the color-combining projector. A plurality of the heat pipes may be provided and connected to respective sides of the three optical elements in a heat transferable manner at positions corresponding to the four corners of the rectangular shape in plan view of the color-combining projector. The fin-like portions provided on the plurality of the heat pipes may extend in diagonal directions of the rectangular shape in plan view of the color-combining projector.

According to the aspect of the invention, a plurality of the heat pipes are provided and connected in a heat-transferable manner with the sides of the optical elements attached on the light-incident-side surfaces of the color-combining projector, the sides corresponding to the four corners of the rectangular shape in plan view of the color-combining projector. The fin-like portions provided on the plurality of the heat pipes extend in diagonal directions of the rectangular shape in plan view of the color-combining projector. Accordingly, when the optical device is assembled, the fin-like portions provided to the heat pipe do not mechanically interfere with each other, so that the size of the fin-like portions can increased. Hence, the heat releasing area of the heat pipe can be increased, so that a temperature difference between the evaporating portion and the condensing portions can be set even larger, thereby further increasing the heat transfer rate in the tube. Therefore, the optical element can be efficiently cooled while maintaining the compact size of the optical device that is integrally constituted by the three optical elements, the color-combining projector and the plurality of the heat pipe.

BRIEF DESCRIPTION OF THE DRAWINGS

The invention will be described with reference to the accompanying drawings, wherein like numbers reference like elements.

DESCRIPTION OF EXEMPLARY EMBODIMENT(S)

First Exemplary Embodiment

A first exemplary embodiment of the invention will be described below with reference to the drawings.

Outline of Arrangement of Projector

Figure 1:
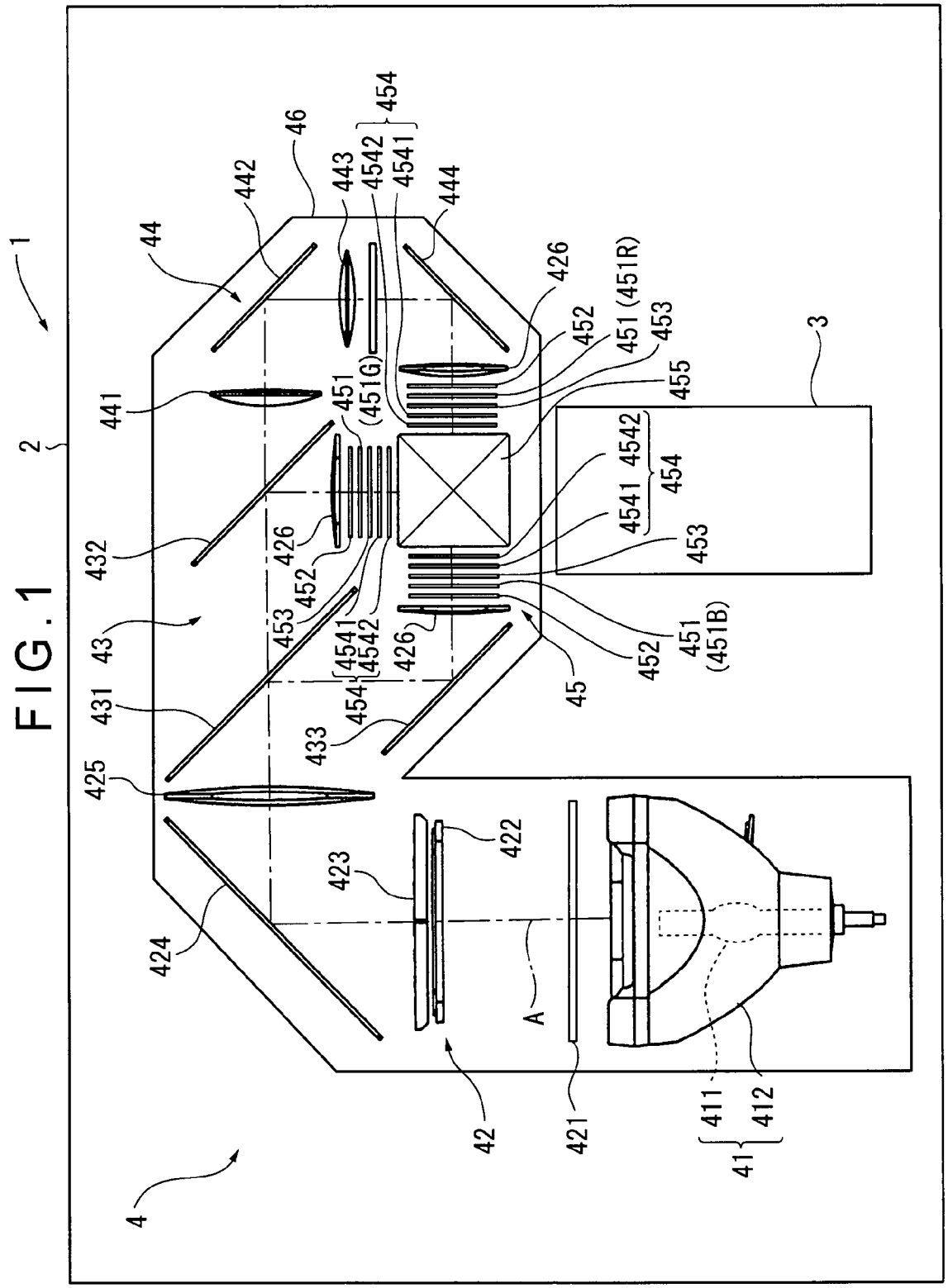
FIG. 1 schematically shows an arrangement of a projector of a first exemplary embodiment.

FIG. 1 schematically shows an arrangement of a projector 1.

The projector 1 modulates a light beam irradiated from a light source in accordance with image information to form a color image (an optical image) and projects the color image on a screen (not shown) in an enlarged manner. As shown in FIG. 1, the projector 1 includes a substantially rectangular-parallelepiped exterior casing 2, a projection lens 3 (a projection optical device), an optical unit 4 and the like.

Although not specifically shown in FIG. 1, a power unit for supplying power to components in the projector 1, a cooling unit having a cooling fan and the like for cooling the inside of the projector 1, a control device and the like for controlling the components in the projector 1 are disposed in a space not occupied by the projection lens 3 and the optical unit 4 in the exterior casing 2.

The projection lens 3 is a lens set including a plurality of lenses housed in a cylindrical barrel. The projection lens 3 projects the color image formed by the optical unit 4 on a screen in an enlarged manner.

Details of Arrangement of Optical Unit

As shown in FIG. 1, the optical unit 4, which forms the color image (image light) in accordance with image information under the control of the control device, extends from a front side to a rear side of the exterior casing 2, bends at an end in the extending direction to further extend and bends again toward the front side to extend, thereby forming a substantially U-shape in plan view. As shown in FIG. 1, the optical unit 4 includes a light source device 41, an integrator illuminating optical device 42, a color separating optical device 43, a relay optical device 44, an optical device 45 and an optical component casing 46.

The light source device 41 aligns a light beam irradiated from a light source lamp 411 in a predetermined direction to irradiate the light, thereby illuminating the optical device 45. As shown in FIG. 1, the light source device 41 includes the light source lamp 411 and a reflector 412.

As the light source lamp 411, a halogen lamp, a metal halide lamp or a high-pressure mercury lamp is often used.

The reflector 412 is a parabolic reflector that substantially collimates the light beam irradiated from the light source lamp 411 and reflects the light. Instead of employing the parabolic reflector, the reflector 412 may be an ellipsoidal reflector that is used in combination with a collimating lens to reflect the light beam irradiated from the light source lamp 411 to a predetermined position.

The integrator illuminating optical device 42 is an optical system that splits the light beam irradiated from the light source device 41 into a plurality of partial light beams and equalizes in-plane illuminance of an illumination area. As shown in FIG. 1, the integrator illuminating optical device 42 includes a first lens array 421, a second lens array 422, a polarization converter 423, a reflecting mirror 424 and a superposing lens 425.

The first lens array 421 functions as a light-beam-splitting optical element that splits the light beam irradiated from the light source device 41 into a plurality of partial light beams. The first lens array 421 includes a plurality of small lenses aligned in a matrix in a plane orthogonal to an illumination optical axis A.

The second lens array 422 is an optical element that condenses the plurality of partial light beams split by the first lens array 421. Similarly to the first lens array 421, the first lens array 421 includes a plurality of small lenses aligned in a matrix in a plane orthogonal to the illumination optical axis A.

The polarization converter 423 is a polarization converter that aligns polarization directions of the plurality of partial light beams split by the first lens array 421 to form linear polarized light in a substantially uniform direction.

Although not shown, the polarization converter 423 has an alternate arrangement of polarized-light separating films and reflecting films that are inclined relative to the illumination optical axis A. The polarized-light separating films transmit one of P polarized light beam and S polarized light beam which are contained in a partial light beam and reflect the other polarized light. The reflected polarized light beam is bent by the reflecting films and irradiated in an irradiation direction of the one of the P and S polarized light beams (in a direction along the illumination optical axis A). Some of the thus-irradiated polarized light beams are converted by a phase plate provided on a light beam emitting surface of the polarization converter 423, so that the polarization direction of substantially all of the polarization light beams are aligned. Using the polarization converter 423, the light beams irradiated from the light source device 41 can be aligned into the polarized light beams in a substantially uniform direction, so that utilization efficiency of light source light of the optical device 45 can be enhanced.

The superposing lens 425 is an optical element that condenses the plurality of partial light beams having passed through the first lens array 421, the second lens array 422, the polarization converter 423 and the reflecting mirror 424 to superpose the condensed light on image formation areas of later-described three liquid crystal panels of the optical device 45.

As shown in FIG. 1, the color separating optical device 43 includes two dichroic mirrors 431, 432 and a reflecting mirror 433 and has a function of separating the plurality of partial light beams irradiated from the integrator illuminating optical device 42 into three colors of light (red light (R), green light (G) and blue light (B)) by using the dichroic mirrors 431, 432.

The dichroic mirrors 431, 432 are an optical element that includes a wavelength-selecting film for reflecting a light beam in a predetermined wavelength range onto a substrate and transmitting a light beam in the other wavelength ranges. The dichroic mirror 431 disposed on an upstream side on an optical path reflects the blue light and transmits the red and green light. The dichroic mirror 432 disposed on a downstream side on the optical path reflects the green light and transmits the red light.

The relay optical device 44 includes an incident-side lens 441, a relay lens 443 and reflecting mirrors 442, 444 as shown in FIG. 1 and has a function of relaying the red light having passed the dichroic mirrors 431, 432 of the color separating optical device 43. Note that the reason why the relay optical device 44 is provided on an optical path of the red light is to prevent a reduction in light utilization efficiency caused by light dispersion and the like due to a longer optical path of the red light. Although the first exemplary embodiment has such an arrangement since the red light has a longer optical path, another arrangement can be employed, where the blue light has a longer optical path and the relay optical device 44 is used on the optical path of the blue light.

The blue light separated by the above-mentioned dichroic mirror 431 is bent by the reflecting mirror 433 and supplied to the optical device 45 via a field lens 426. The green light separated by the dichroic mirror 432 is directly supplied to the optical device 45 via the field lens 426. The red light is condensed and bent by the lenses 441, 443 and the reflecting mirrors 442, 444 of the relay optical device 44 to be supplied to the optical device 45 via the field lens 426. Note that the field lens 426 is provided for each of the colors to convert the partial light beams irradiated from the second lens array 422 into light beams collimated to a main light beam of the partial light beams, the field lens 426 being disposed on an upstream side on the optical path of each color light.

The optical device 45 modulates an incident light beam in accordance with image information to form a color image. As shown in FIG. 1, the optical device 45 includes three optical modulators 451 (optical elements) each having a liquid crystal panel 4511 (an optical modulating element (an optical element body, see FIG. 2, FIG. 3) (an optical modulator 451R on a red color side, an optical modulator 451G on a green color side and an optical modulator 451B on a blue color side), incident-side polarizers 452 disposed on the upstream of the respective optical modulators 451, viewing angle compensators 453 disposed on the downstream of the respective optical modulators 451, irradiation-side polarizers 454 and cross dichroic prisms 455 (color-combining projectors). The optical modulator 451, the viewing angle compensators 453, the irradiation-side polarizers 454 and the cross dichroic prisms 455 out of the components 451 to 455 are integrated to constitute an optical device body 45A (see FIG. 2). Details of the optical device body 45A will be described later. Note that the optical device body 45A may be integrally constituted by the components 451 and 453 to 455 and the incident-side polarizers 452.

The three incident-side polarizers 452 only transmit polarized light having substantially the same polarization direction as that of the light aligned by the respective polarization converters 423 out of the color light separated by the color separating optical device 43 and absorb the other light beams. The incident-side polarizers 452 each include a polarization film adhered on a light-transmissive substrate.

The liquid crystal panels 4511 of the three optical modulators 451 each include a pair of substrates 4511A, 4511B (see FIGS. 10A and 10B) made of glass or the like and formed in a rectangle in plan view and liquid crystal (electrooptic material) sealed therebetween. The substrate 4511A is a drive substrate for driving the liquid crystal which includes a plurality of data lines aligned in parallel to each other, a plurality of scan lines aligned in a direction orthogonal to that of the plurality of data lines, picture electrodes arranged in a matrix at locations correspondence to intersections of the scan lines and the data lines, a switching element such as a TFT (Thin Film Transistor) or the like and a driving portion for driving the switching element. The substrate 4511B is a opposing substrate disposed at a predetermined position from the substrate 4511A and has a common electrode on which a predetermined voltage Vcom is applied. The substrates 4511A, 4511B are connected with an FPC cable 4511C (a circuit substrate) that is in an electrical connection with the control device and outputs a predetermined drive signal to the scan lines, the data lines, the switching element, the common electrode and the like. By inputting the drive signal from the control device via the FPC cable 4511C, a voltage is applied between a predetermined picture electrode and the common electrode and an orientation of the liquid crystal interposed between the picture electrode and the common electrode is controlled to modulate the polarization direction of the polarized light beam irradiated from the incident-side polarizer 452.

Figure 10A:
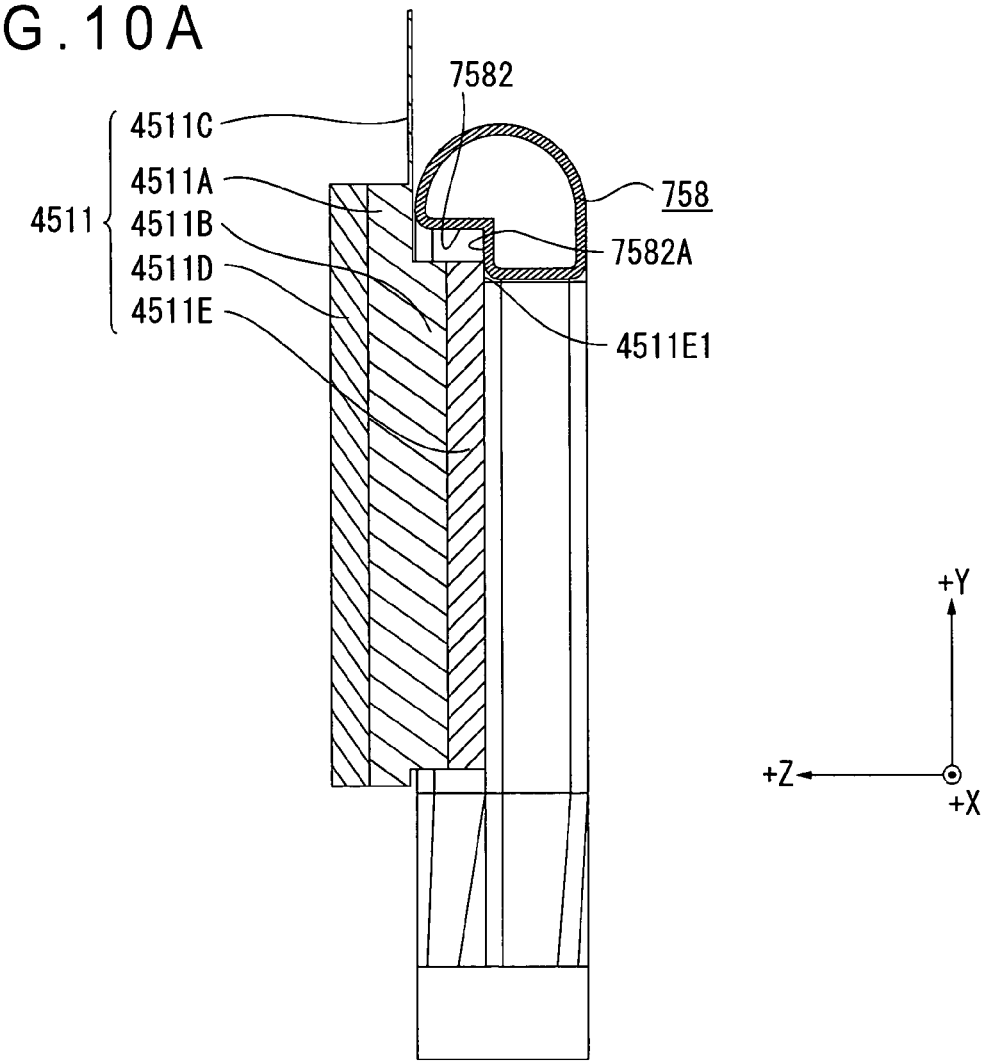
FIG. 10A shows the structure of the heat-conducting member and the connecting structure of the heat-conducting member and the liquid crystal panel of the fourth exemplary embodiment.
Figure 10B:
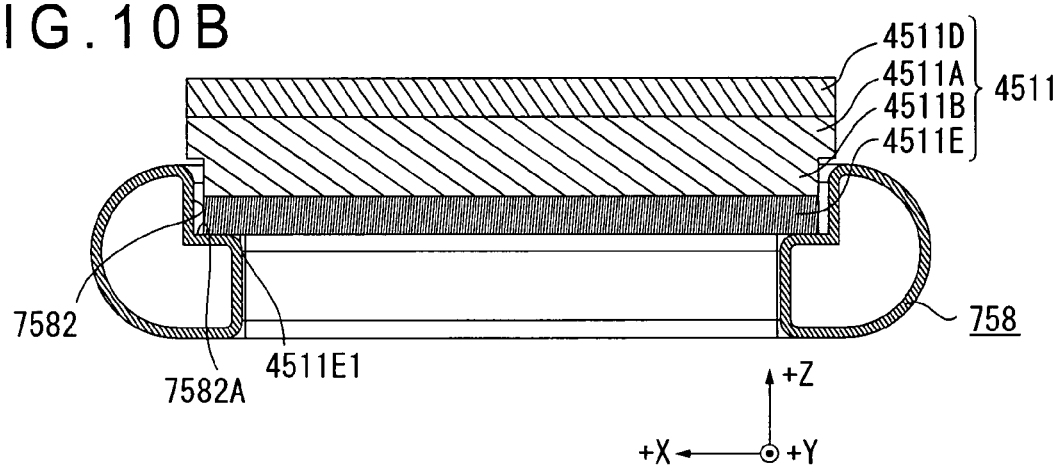
FIG. 10B shows the structure of the heat-conducting member and the connecting structure of the heat-conducting member and the liquid crystal panel of the fourth exemplary embodiment.

An outer profile of the drive substrate 4511A of the liquid crystal panel 4511 is set larger than that of the opposing substrate 4511B (see FIGS. 10A and 10B). In other words, the liquid crystal panel 4511 has a shape in which the outer profile becomes smaller toward the light incident side to form a step-like portion.

A thermally-conductive dust-proof glass 4511D having substantially the same outer profile as that of the drive substrate 4511A (FIGS. 10A and 10B) is adhered on an outer surface of the drive substrate 4511A. Similarly, a thermally-conductive dust-proof glass 4511E (FIGS. 10A and 10B) having substantially the same outer profile as that of the opposing substrate 4511B is adhered on an outer surface of the opposing substrate 4511B. Accordingly, even when dust sticks on the outer surface of the liquid crystal panel 4511, the dust-proof glasses 4511D, 4511E prevent the dust from sticking on a focus position, so that the shadow of the dust will not be displayed on a projection image.

The three viewing angle compensators 453 are respectively disposed on the optical paths on the downstream of the optical modulators 451. The viewing angle compensators 453 each include a light-transmissive substrate 4531 having a rectangule in plan view and an optical compensating-film 4532 adhered on the substrate 4531 (see FIG. 3).

In the first exemplary embodiment, the light-transmissive substrate 4531 is made of a thermally-conductive material such as crystal or sapphire.

The optical compensating-film 4532 compensates a phase difference generated between an ordinary ray and an extraordinary ray due to a birefringence on the liquid crystal panel 4511 to improve visibility characteristics of the liquid crystal panel 4511. The optical compensating-film 4532 is an optical anisotropic body having a negative uniaxiality and an optical axis is directed in a predetermined direction in a plane of the film 4532 with an inclination of a predetermined angle in an out-plane direction.

The optical compensating-film 4532 may be provided by forming a discotic compound layer on a transparent supporting body (such as TAC: Toly Acctate) with an oriented film interposed. For example, a WV film manufactured by FUJIFILM Corporation may be employed as the optical compensating-film 4532.

The three irradiation-side polarizers 454 have substantially the same function as the incident-side polarizers 452 which transmit polarized light in a certain direction out of the light beams irradiated via the liquid crystal panels 4511 and the viewing angle compensators 453 and absorb the other light beams. As shown in FIG. 1, the irradiation-side polarizer 454 includes a first irradiation-side polarizer 4541 disposed on the light incident side and a second irradiation-side polarizer 4542 disposed on the light emitting side. Similarly to the incident-side polarizers 452, the first irradiation-side polarizer 4541 and the second irradiation-side polarizer 4542 are formed by adhering a polarization film 4542B (FIG. 3) respectively on a light-transmissive substrate 4541A, 4542A (FIG. 3) in a rectangule in plan view. Note that the polarization film 4542B is not shown in FIG. 3 since the polarization film is adhered on a light-emitting-side surface of the light-transmissive substrate 4541A of the first irradiation-side polarizer 4541. In the first exemplary embodiment, similarly to the light-transmissive substrates 4531 of the viewing angle compensators 453, the light-transmissive substrates 4541A, 4542A are made of a thermally-conductive material such as crystal and sapphire.

The first irradiation-side polarizer 4541 and the second irradiation-side polarizer 4542 have different light-absorbing characteristics and are disposed with polarization axes thereof aligned in parallel. By forming the irradiation-side polarizer 454 by two components, heat absorbed by the irradiation-side polarizer 454 can be proportionally split by the two components, so that thermal degradation of the irradiation-side polarizer 454 can be prevented more efficiently as compared with an arrangement where the irradiation-side polarizer 454 is formed by only one component.

The first irradiation-side polarizer 4541 and the second irradiation-side polarizer 4542 are disposed such that the polarization axes thereof are in parallel to each other and substantially orthogonal to a polarization axis of the incident-side polarizer 452.

The cross dichroic prism 455 combines the color light that is irradiated from the irradiation-side polarizers 454 and modulated for each color, thereby forming a color image. The cross dichroic prism 455 is substantially square in plan view with four right-angle prisms adhered with each other. Dielectric multi-layered films are formed on the boundaries of the right-angle prism. The dielectric multi-layered films transmit the color light that is irradiated from the optical modulator 451G and passes through the viewing angle compensator 453 and the irradiation-side polarizer 454 and reflects the color light that is irradiated from the optical modulators 451R, 451B and passes through the viewing angle compensators 453 and the irradiation-side polarizers 454. Thus, the color light is combined into a color image. The color image formed by the cross dichroic prism 455 is projected by the above-mentioned projection lens 3 in an enlarged manner onto a screen.

The optical component casing 46 is a member that is disposed at a predetermined position relative to the illumination optical axis A and houses the optical components 41 to 45. Although not specifically shown, the optical component casing 46 includes a container-like component-housing for housing the optical components 41 to 45 and a lid member for closing an opening of the component-housing.

Details of Arrangement of Optical Device Body

Figure 2:
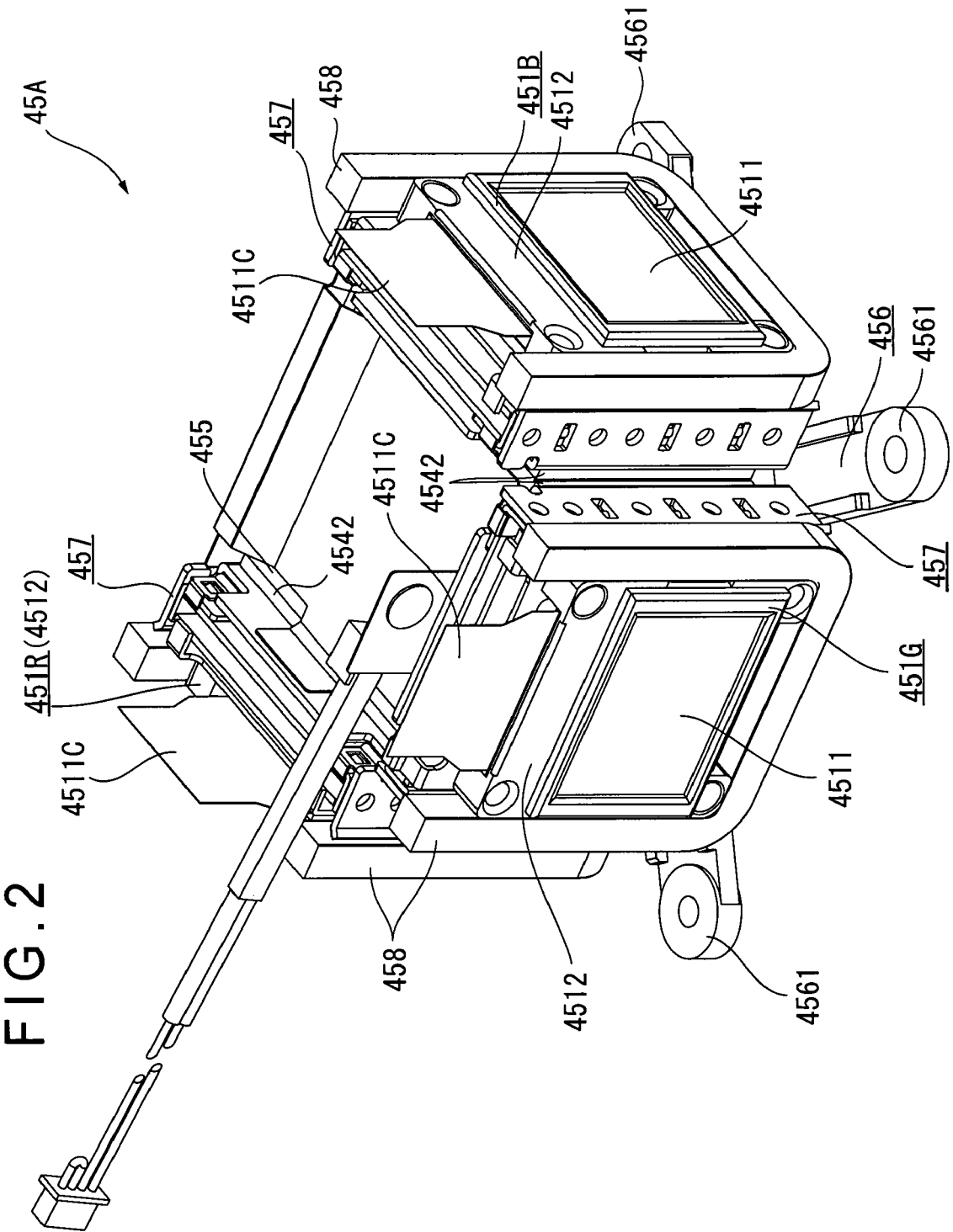
FIG. 2 schematically shows an arrangement of an optical device body of the first exemplary embodiment.
Figure 3:
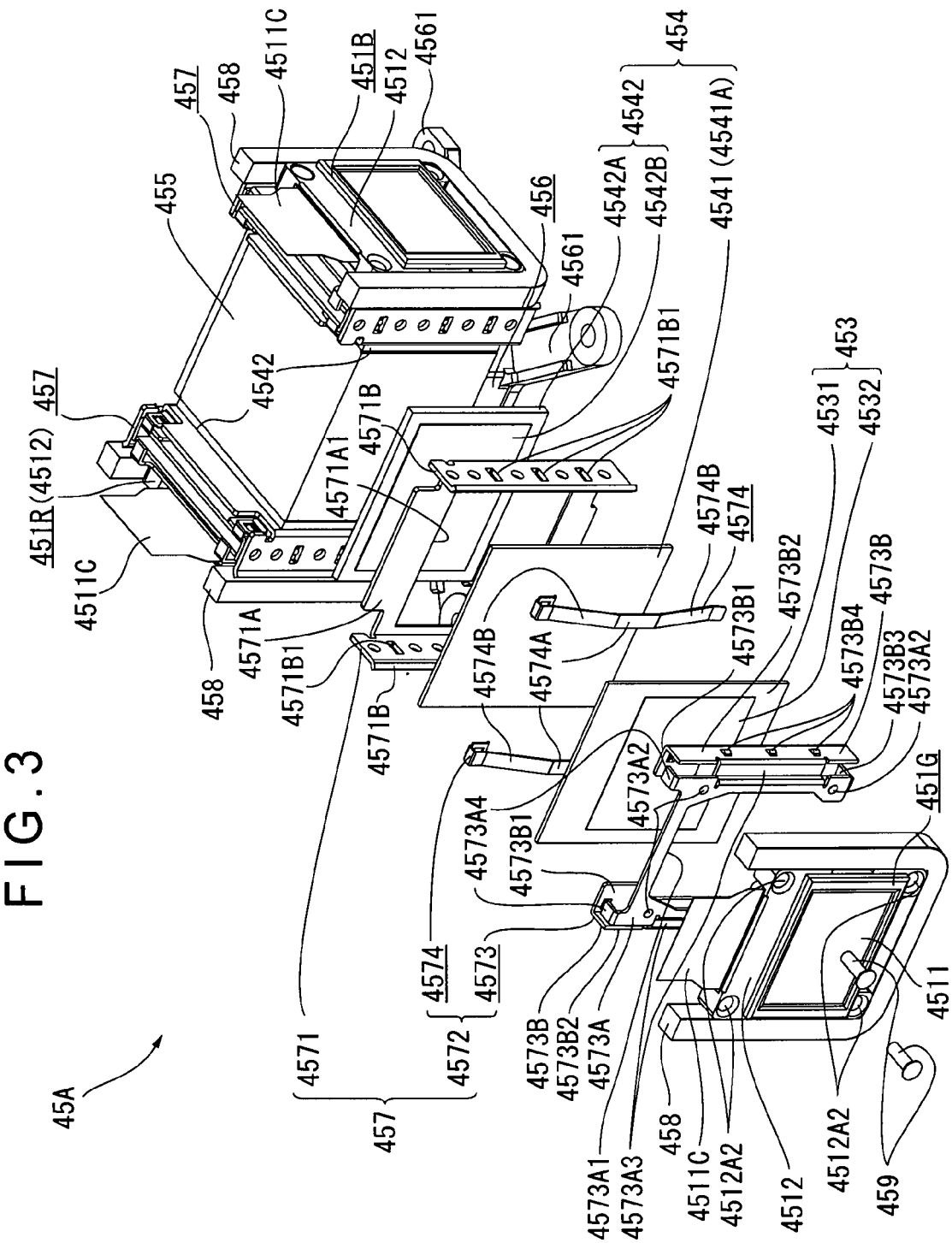
FIG. 3 schematically shows the arrangement of the optical device body of the first exemplary embodiment.

FIGS. 2 and 3 schematically show an arrangement of the optical device body 45A. Specifically, FIG. 2 is a perspective view of the optical device body 45A when seen from the optical modulator 451G side. FIG. 3 is an exploded perspective view of the optical device body 45A. In FIG. 3, the optical modulator 451G side of the optical device body 45A is shown in an exploded manner. However, the sides of the optical modulators 451R, 451B are also arranged in the same manner.

The optical device body 45A includes the above-described optical modulators 451, viewing angle compensators 453, irradiation-side polarizers 454 and cross dichroic prism 455 as well as a supporting structure body 456, three optical-element holders 457 and three heat-conducting members 458. The components 451 and 453 to 458 are integrally provided.

As shown in FIG. 2 or 3, each of the three irradiation-side polarizers 454 has an arrangement where the second irradiation-side polarizer 4542 is fixed with an adhesive or the like on a light-incident-side surface of the cross dichroic prism 455 with the polarization film 4542B facing the light emitting side.

As shown in FIG. 2 or 3, the optical modulators 451 each include the above-described liquid crystal panel 4511 and a holder frame 4512 for holding the liquid crystal panel 4511.

Figure 4A:
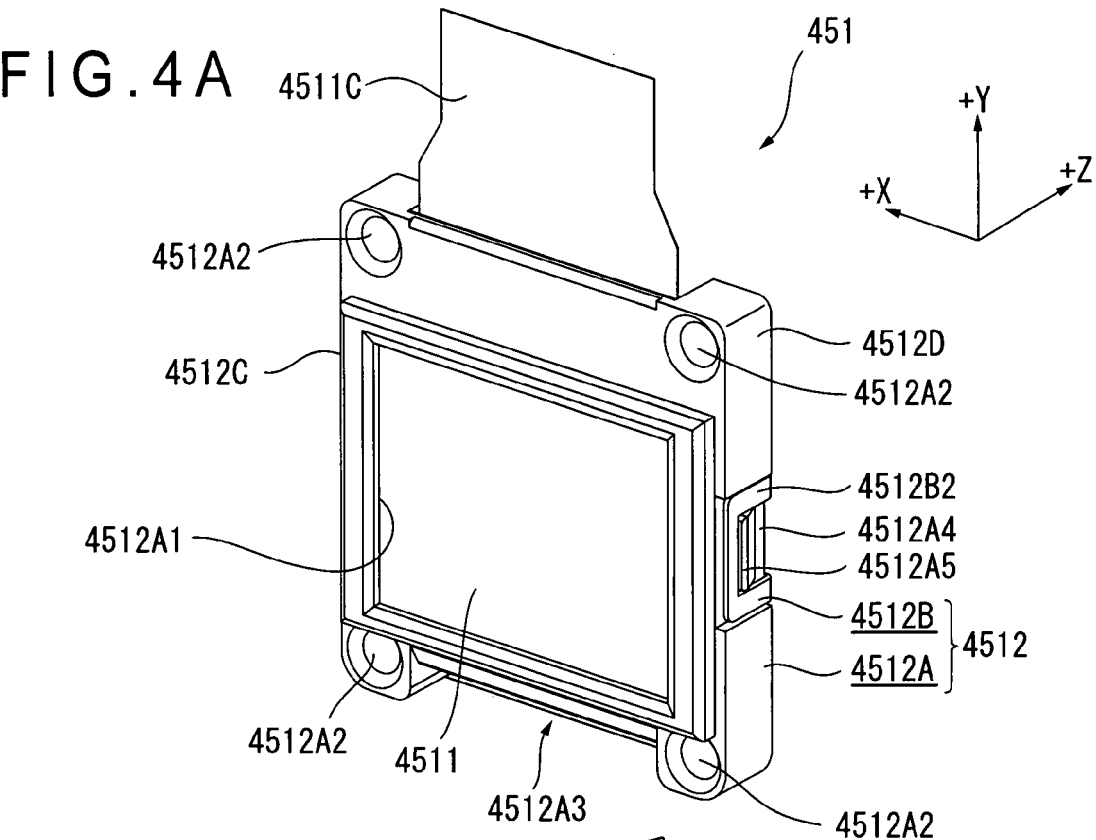
FIG. 4A schematically shows an arrangement of an optical modulator of the first exemplary embodiment.
Figure 4B:
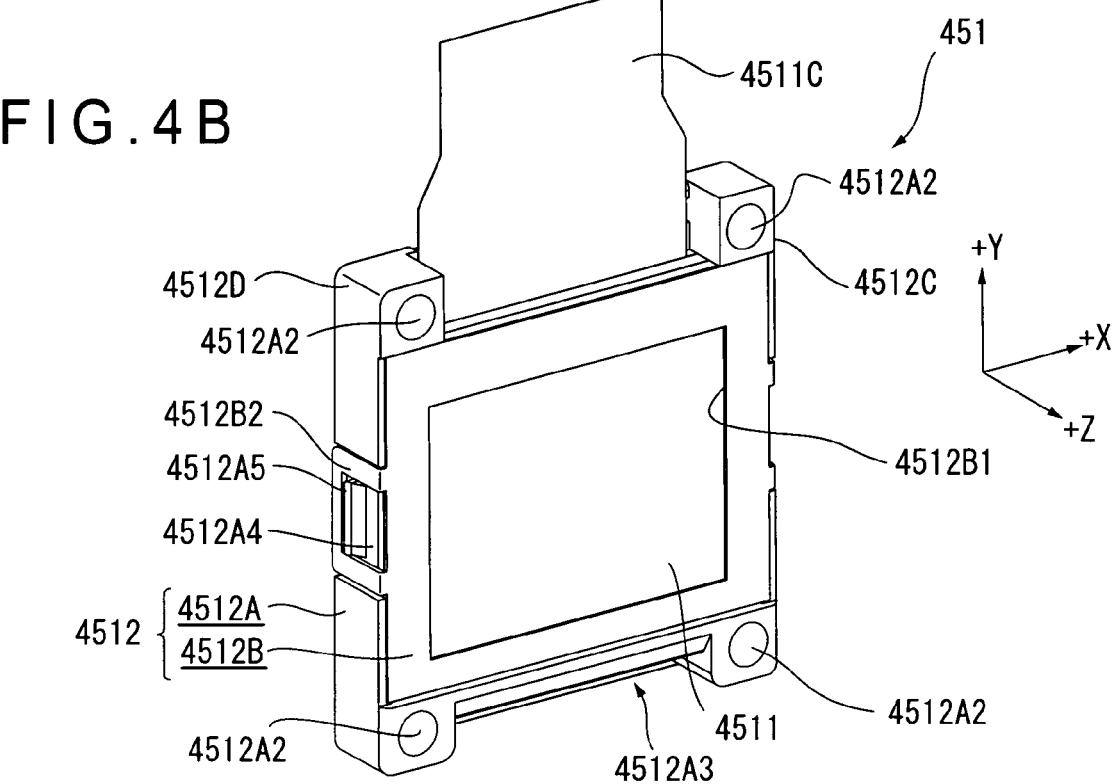
FIG. 4B schematically shows the arrangement of the optical modulator of the first exemplary embodiment.

FIGS. 4A and 4B schematically show an arrangement of the optical modulator 451. Specifically, FIG. 4A is a perspective view of the optical modulator 451 when seen from the light incident side. FIG. 4B is a perspective view of the optical modulator 451 when seen from the light emitting side. Note that, in FIGS. 4A and 4B, an optical axis of a light beam irradiated from the optical modulator 451 is defined as Z-axis and two axes orthogonal to Z-axis are defined as X-axis (horizontal axis) and Y-axis (vertical axis) for convenience for description.

It should be noted that, in the description below, following definitions will be used. The direction toward the left in the figures along X-axis is defined as +X direction. The direction toward the right in the figures along X-axis is defined as −X direction. The direction toward the top in the figures along Y-axis is defined as +Y direction. The direction toward the bottom in the figures along Y-axis is defined as −Y direction. The direction toward the right in the figures along Z-axis is defined as +Z direction. The direction toward the left in the figures along Z-axis is defined as −Z direction.

A surface facing +X direction of each component is defined as +X side. A surface facing −X direction thereof is defined as −X side. In the same manner, ±Y sides and ±Z sides of a component are defined.

The holder frame 4512 is a member for housing and holding the liquid crystal panel 4511. As shown in FIGS. 4A and 4B, the holder frame 4512 includes a holder frame body 4512A disposed on the light incident side and formed in a rectangle in plan view and a light-shielding plate 4512B disposed on the light emitting side and formed in a rectangule in plan view.

As shown in FIG. 4A, the holder frame body 4512A has an opening 4512A1 substantially at the center thereof, the opening 4512A1 corresponding to an image formation area of the liquid crystal panel 4511.

Although not specifically shown, a dented portion corresponding to the outer profile (the step-like portion) and housing the liquid crystal panel 4511 is provided around a periphery of the opening 4512A1 on the light emitting side of the holder frame body 4512A.

In FIGS. 4A and 4B, at the four corners of the holder frame body 4512A, fixing holes 4512A2 for fixing the optical modulator 451 to the optical-element holder 457 penetrate the holder frame body 4512A from a light-incident-side surface to a light-emitting-side surface.

A dented portion 4512A3 dented toward an upper side (+Y side) in a U-shape in plan view is formed at a portion between the two fixing holes 4512A2 on a lower side (−Y side) of the holder frame body 4512A.

As shown in FIGS. 4A and 4B, dented portions 4512A4 having a rectangular shape in plan view are formed substantially at the center (in Y direction) of +X and −X sides (right and left sides) of the holder frame body 4512A. As shown in FIGS. 4A and 4B, a hook 4512A5 to be connected with the light-shielding plate 4512B is formed in a bottom portion of the dented portion 4512A4.

As shown in FIG. 4B, the light-shielding plate 4512B is a rectangular plate body fixed to the holder frame body 4512A on the light emitting side, the light-shielding plate 4512B having an opening 4512B1 substantially at the center thereof in correspondence with the image formation area of the liquid crystal panel 4511. The light-shielding plate 4512B prevents malfunction of the liquid crystal panel 4511 that may be caused by the light transmitted through the liquid crystal panel 4511 and reflected by the viewing angle compensator 453, the irradiation-side polarizer 454, the cross dichroic prism 455 and the like onto a driver of the liquid crystal panel 4511.

As shown in FIGS. 4A and 4B, a hook engaging portion 4512B2 that has a shape in plan view substantially the same as the dented portion 4512A4 of the holder frame body 4512A and is engaged with the hook 4512A5 of the holder frame body 4512A is formed substantially at the center (in Y direction) of +X and −X sides of the light-shielding plate 4512B. By engaging the hook engaging portion 4512B2 with the hook 4512A5, the light-shielding plate 4512B is fixed to the holder frame body 4512A.

As described above, when the light-shielding plate 4512B is fixed to the holder frame body 4512A, ±X sides of the holder frame body 4512A (surfaces excluding the dented portions 4512A4) are substantially in flush with outer surfaces of the hook engaging portions 4512B2 of the light-shielding plate 4512B, so that ±X sides 4512C, 4512D of the holder frame 4512 are flat and parallel to YZ plane. The ±X sides 4512C, 4512D serve as optical-element-side connecting portions to which the heat-conducting member 458 is connected.

The above-described holder frame 4512 is made of a thermally-conductive material.

The thermally-conductive material may be, for instance, metals including a nickel-iron alloy such as Invar™ and 42Ni—Fe, a magnesium alloy, a carbon steel, a stainless steel or resins (a polycarbonate, a polyphenylene sulfide, a liquid crystal resin and the like) in which a carbon filler such as a carbon fiber and a carbon nanotube is mixed. The holder frame body 4512A and the light-shielding plate 4512B of the holder frame 4512 may be made of a common material or different materials out of the above-mentioned materials. By making the holder frame 4512 with the thermally-conductive materials, heat generated on the liquid crystal panel 4511 by irradiation of light beams can be efficiently released to the holder frame 4512.

As shown in FIG. 2 or 3, the supporting structure body 456 has a substantially rectangular parallelepiped shape. The cross dichroic prism 455 is mounted at a predetermined position on an upper surface of the supporting structure body 456, thereby supporting the whole optical device body 45A.

As shown in FIG. 2 or 3, arm portions 4561, which extend outward from the four corners of the supporting structure body 456 to be connected with the component-housing of the optical component casing 46, are provided to the supporting structure body 456. By connecting the arm portions 4561 to the component-housing of the optical component casing 46, the whole optical device body 45A is fixed to the component-housing.

The three optical-element holders 457 are respectively disposed between the optical modulators 451 and the cross dichroic prism 455. Each optical-element holders 457 supports the optical modulator 451, the viewing angle compensator 453 and the first irradiation-side polarizer 4541 of the irradiation-side polarizer 454 to fix these components to the cross dichroic prism 455. As shown in FIG. 3, the optical-element holder 457 includes a first support 4571 and a second support 4572.

As shown in FIG. 3, the first support 4571 includes a plate portion 4571A formed substantially in a rectangle in plan view and a projection 4571B projecting toward the light incident side from right and left end of the plate portion 4571A.

As shown in FIG. 3, a rectangular (in plan view) opening 4571A1 for transmitting a light beam is formed substantially at the center of the plate portion 4571A.

As shown in FIG. 3, three openings 4571B1 aligned vertically in a line are formed in the projection 4571B. As shown in FIG. 3, the openings 4571B1 is a rectangle in plan view with long sides extending in a direction in which the projection 4571B projects.

The projections 4571B of the first support 4571 support the second support 4572. A light-emitting-side surface of the plate portion 4571A is adhered, with an adhesive or the like, to a light-incident-side surface of the light-transmissive substrate 4542A with the polarization film 4542B fitted in the opening 4571A1, so that the first support 4571 is fixed to the second irradiation-side polarizer 4542 fixed on the light-incident-side surface of the cross dichroic prism 455.

The second support 4572 supports and fixes the optical modulator 451, the viewing angle compensator 453 and the first irradiation-side polarizer 4541 of the irradiation-side polarizer 454. As shown in FIG. 3, the second support 4572 includes a second support body 4573 and a pair of biasing members 4574.

As shown in FIG. 3, the second support body 4573 includes a plate portion 4573A formed in a substantially rectangular shape in plan view and a projection 4573B projecting toward the light emitting side from right and left ends of the plate portion 4573A.

As shown in FIG. 3, the plate portion 4573A is cut off from a lower end toward an upper side in FIG. 3, forming a U-shape (in plan view) cut portion 4573A1 for transmitting a light beam.

As shown in FIG. 3, fixing holes 4573A2 for fixing the optical modulator 451 are respectively formed at the four corners of the plate portion 4573A. The optical modulator 451 is fixed to the second support body 4573 by connecting the second support body 4573 with the holder frame 4512 using screws 459 (FIG. 3) inserted through a pair of fixing holes 4573A2 located at diagonal positions out of the four fixing holes 4573A2 and a pair of fixing holes 4512A2 located at diagonal positions out of the four fixing holes 4512A2 formed in the holder frame 4512 of the optical modulator 451.

As shown in FIG. 3, connecting portions 4573A3 that project toward the light emitting side are provided substantially at the center of right and left sides of the plate portion 4573A. Distal ends in the projecting direction of the connecting portions 4573A3 extend substantially in parallel to a surface of the plate portion 4573A and are connected with the projections 4573B.

First position restrictors 4573A4 are formed at corners of an upper side of the plate portion 4573A, the first position restrictors 4573A4 projecting toward the light emitting side and abutting to an upper side of the viewing angle compensator 453 supported by the second support 4572 to restrict a vertical position of the viewing angle compensators 453.

As shown in FIG. 3, distal ends 4573B1 of the projections 4573B are bent substantially in parallel to the plate portion 4573A to extend toward each other.

Second position restrictors 4573B3 are formed on lower sides of the distal ends 4573B1 (FIG. 3) and project toward the light emitting side to abut to a lower side of the first irradiation-side polarizer 4541 supported by the second support 4572 to restrict a vertical position of the first irradiation-side polarizer 4541.

As shown in FIG. 3, three protrusions 4573B4 are respectively formed on outer surfaces of base ends 4573B2 of the projections 4573B, the three protrusions 4573B4 aligned in a vertical direction in correspondence with the openings 4571B1 of the first support 4571. The protrusions 4573B4 are loosely fitted in the openings 4571B1 when the second supports 4572 are disposed between the projections 4571B of the first support 4571. Owing to such an arrangement, the protrusions 4573B4 can be slid relative to the openings 4571B1 (the first support 4571). In other words, the optical modulator 451 (the liquid crystal panel 4511) fixed to the second support 4572 can be moved toward and away from the cross dichroic prism 455 to achieve a focus adjustment.

As shown in FIG. 3, the pair of biasing members 4574 are plate springs, each including a base 4574A located at a center portion of the biasing member 4574 and a pair of extending portions 4574B extending obtusely from both ends of the base 4574A. The pair of biasing members 4574 are disposed between the viewing angle compensators 453 and the first irradiation-side polarizer 4541 with the base 4574A abutting to a light-emitting-side surface of the viewing angle compensators 453 and with distal ends of the pair of extending portions 4574B abutting to a light-incident-side surface of the first irradiation-side polarizer 4541 to bias the viewing angle compensators 453 and the first irradiation-side polarizer 4541 in a direction to be away from each other.

The above-described second support 4572 supports and fixes the viewing angle compensators 453 and the first irradiation-side polarizer 4541 as described below.

Specifically, in a space enclosed by the plate portion 4573A and the projections 4573B of the second support body 4573, the viewing angle compensators 453 with the optical compensating-film 4532 faced toward the light incident side, the pair of biasing members 4574 and the first irradiation-side polarizer 4541 with the polarization film faced toward the light emitting side are disposed. In this state, the pair of biasing members 4574 biases and pushes the viewing angle compensators 453 toward the light incident side, so that a light-incident-side surface of the light-transmissive substrate 4531 of the viewing angle compensators 453 abuts on a light-emitting-side surface of the plate portion 4573A of the second support 4572. The pair of biasing members 4574 also biases and pushes the first irradiation-side polarizer 4541 toward the light emitting side, so that the light-emitting-side surface of the light-transmissive substrate 4541A of the first irradiation-side polarizer 4541 abuts to the distal ends of the projections 4573B of the second support 4572. As described above, the biasing force of the pair of biasing members 4574 supports and fixes the viewing angle compensators 453 and the first irradiation-side polarizer 4541 to the second support 4572.

As shown in FIG. 2 or 3, the three heat-conducting members 458 are respectively connected to the three optical modulators 451 in a heat-transferable manner to release heat generated on the optical modulators 451 due to the light beams irradiated thereon. Each heat-conducting member 458 is formed as a tube having capillary-tube structure (wick) and accommodating a coolant in the tube, where the coolant circulates within the tube to transfer the heat within the heat-conducting member 458 (so-called heat pipe).

Although not specifically shown, the capillary structure of the heat-conducting member 458 is a sintered wick of powder form. Water is used as the coolant herein. The capillary structure is not limited to sintered wick, but other wicks such as extra-fine line wick of a plurality of fine copper lines and the like, net-like metal mesh wick and groove-wick in which a plurality of grooves are formed inside the tube, may be used. The coolant is not limited to water, but other coolant such as alcohol may be used.

Figure 5:
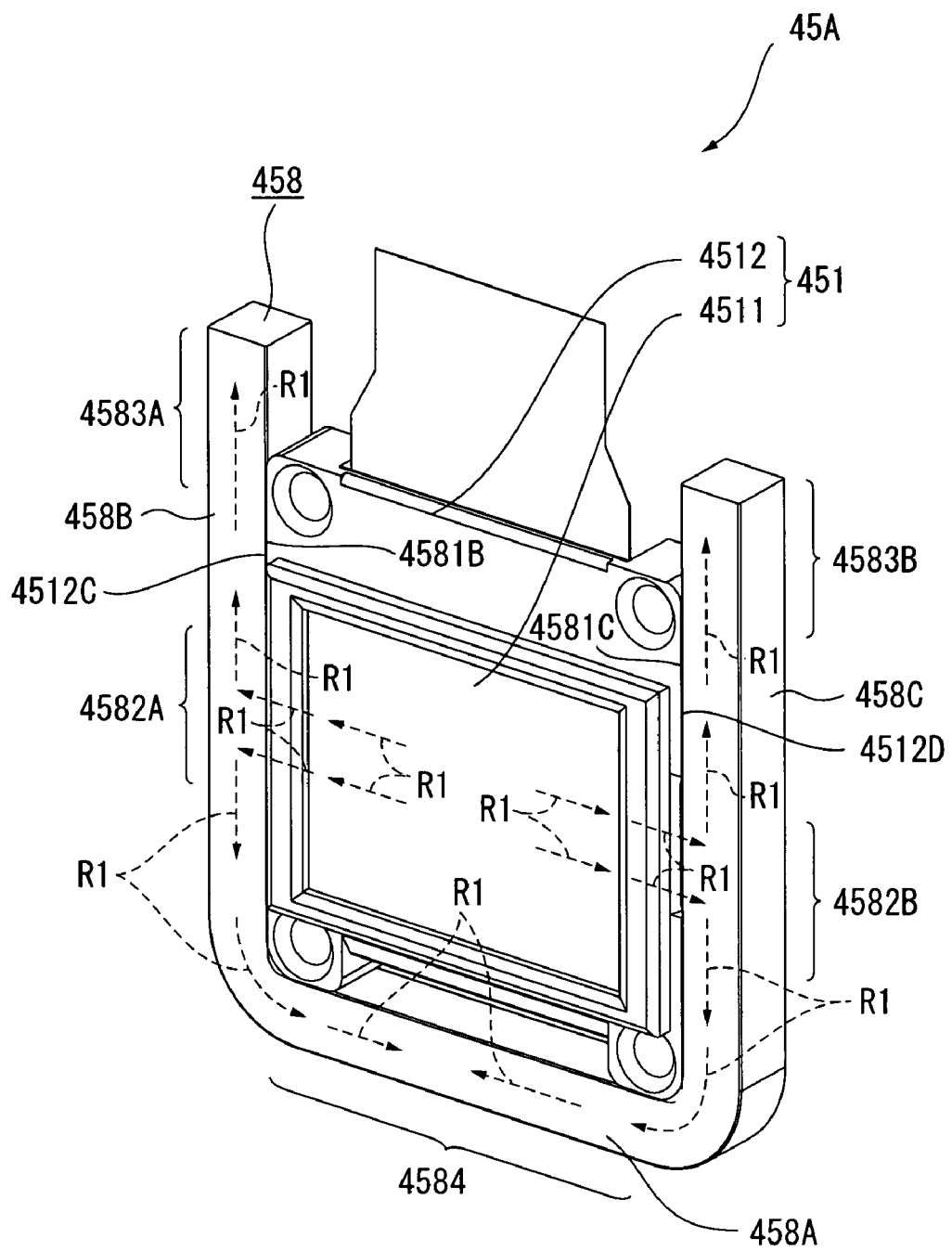
FIG. 5 is a perspective view showing a connecting structure of a heat-conducting member to the optical modulator of the first exemplary embodiment.

FIG. 5 is a perspective view showing a connecting structure of the heat-conducting member to the optical modulator 451. Note that, in FIG. 5, an optical axis of a light beam irradiated from the optical modulator 451 is defined as Z-axis and two axes orthogonal to Z-axis are defined as X-axis (horizontal axis) and Y-axis (vertical axis) for convenience for description.

As shown in FIG. 5, the heat-conducting member 458 is pressed to be bent into a U-shape in plan view, in which a base end 458A extends in X direction along −Y side of the optical modulator 451, the shape corresponding to the outer profile of the optical modulator 451; a pair of extending portions 458B, 458C extends in Y direction along ±X sides of the optical modulator 451, and inner surfaces of the U-shape are formed in a rectangle in plan view to be flat in parallel to YZ plane in correspondence with the optical-element-side connecting portions 4512C, 4512D of the optical modulator 451. As shown in FIG. 5, the heat-conducting member 458 is formed such that a distance (in X direction) between the pair of extending portions 458B, 458C is substantially the same as the outer dimension in X direction of the optical modulator 451 and a length in the extending direction of the pair of extending portions 458B, 458C (in Y direction) is longer than the outer dimension in Y direction of the optical modulator 451. Opposing surfaces 4581B, 4581C of the pair of extending portions 458B, 458C of the heat-conducting member 458 are heat-conducting-member-side connecting portions connected with the optical modulator 451 in a heat-transferable manner.

By fitting the optical modulator 451 in the U-shape of the heat-conducting members 458 (where the end of −Y side of the optical modulator 451 abuts the base end 458A), the optical-element-side connecting portions 4512C, 4512D of the optical modulator 451 surface-contact with the heat-conducting-member-side connecting portions 4581B, 4581C of the heat-conducting member 458, so that the optical modulator 451 and the heat-conducting members 458 are connected with each other in a heat-transferable manner. The heat-conducting members 458 may be connected with the optical modulator 451 by connecting the optical-element-side connecting portions 4512C, 4512D with the heat-conducting-member-side connecting portions 4581B, 4581C by soldering, welding, adhering with a thermally-conductive adhesive and the like. By employing such an arrangement, even a microlevel non-contacting portion caused on account of surface roughness between the optical-element-side connecting portions 4512C, 4512D and the heat-conducting-member-side connecting portions 4581B, 4581C can be connected in a heat-transferable manner.

Next, a structure for releasing heat generated on the liquid crystal panel 4511 due to irradiation of light beams will be described.

When the heat-conducting member 458 is connected with the optical modulator 451 in a heat-transferable manner as described above, heat generated on the liquid crystal panel 4511 due to irradiation of light beams is released in a below-described manner.

For example, as indicated by arrows R1 in FIG. 1, the heat generated on the liquid crystal panel 4511 moves in X direction to the optical-element-side connecting portions 4512C, 4512D that are connected with the heat-conducting members 458 in a heat-transferable manner to be transferred to the holder frame 4512.

As indicated by arrows R1 in FIG. 5, the heat transferred to the holder frame 4512 is transferred to substantially center portions (in Y direction) of the pair of extending portions 458B, 458C via the heat-conducting-member-side connecting portions 4581B, 4581C that are in a heat-transferable connection with the holder frame 4512 of the heat-conducting member 458.

Inside the substantially center portions (in Y direction) of the pair of extending portions 458B, 458C, coolant is heated by the transferred heat to be evaporated and gasified, where the heat is absorbed as latent heat (vaporization heat). Specifically, the substantially center portions (in Y direction) of the pair of extending portions 458B, 458C function as evaporating portions 4582A, 4582B of the heat-conducting members 458.

As indicated by the arrows R1 in FIG. 5, the vaporized coolant forms vapor flow and moves to low-temperature sides (sides located apart from the evaporating portions 4582A, 4582B: distal ends of the pair of extending portions 458B, 458C and the base end 458A). The coolant having moved to the distal ends of the pair of extending portions 458B, 458C and the base end 458A is cooled and liquidized to release the heat (heat-releasing by condensed latent heat). Specifically, the distal ends of the pair of extending portions 458B, 458C and the base end 458A function as condensing portions 4583A, 4583B of the heat-conducting members 458. The liquidized coolant by the condensing portions 4583A, 4583B returns to the evaporating portions 4582A, 4582B through the capillary-tube structure (wick).

As described above and indicated by the arrows R1 in FIG. 5, the heat generated on the liquid crystal panel 4511 moves through a heat transfer passage from the liquid crystal panel 4511 via the holder frame 4512 to the heat-conducting member 458 and from the evaporating portions 4582A, 4582B of the heat-conducting member 458 to the condensing portions 4583A, 4583B and 4584 from which the heat is released to the outside.

According to the above-described first exemplary embodiment, following advantages can be obtained.

In the first exemplary embodiment, the heat-conducting members 458 is a heat pipe and is connected with the optical modulator 451 in a heat-transferable manner. Accordingly, as compared with a related-art arrangement, the heat-conducting member 458 is directly connected with the optical modulator 451 without interposition of air, heat-resistance on the heat transfer passage from the optical modulator 451 to the heat-conducting member 458 can be lowered.

The optical modulator 451 and the heat-conducting member 458 have shapes for allowing a surface-contact of the connecting portions (the optical-element-side connecting portions 4512C, 4512D and the heat-conducting-member-side connecting portions 4581B, 4581C respectively). A contact area between the optical modulator 451 and the heat-conducting member 458 can be increased, thereby enhancing heat transfer characteristics from the optical modulator 451 to the heat-conducting member 458.

Hence, the optical modulator 451 can be efficiently cooled to prevent temperature rise in the optical modulator 451, so that thermal degradation of the optical modulator 451 (the liquid crystal panel 4511) can be efficiently avoided. In other words, such an arrangement can provide a good projection image from the projector 1 and an increased longevity thereof.

In addition, in the first exemplary embodiment, the optical modulator 451 and the heat-conducting member 458 are connected in a heat-transferable manner on the respective outer surfaces. The heat-conducting-member-side connecting portions 4581B, 4581C provided on the outer surface of the heat-conducting member 458 are pressed to coincide with the profile of the outer surface of the optical modulator 451 (the optical-element-side connecting portions 4512C, 4512D). Accordingly, as compared with an arrangement where an outer surface of a heat-conducting member (e.g. a heat pipe) having a circular shape in plan view) serves as the heat-conducting-member-side connecting portion and the optical-element-side connecting portion is formed to coincide with the outer profile of the heat pipe, a structure for achieving a surface-contact between the connecting portions of the optical modulator 451 and the heat-conducting member 458 (the optical-element-side connecting portions 4512C, 4512D and the heat-conducting-member-side connecting portions 4581B, 4581C) can be obtained only pressing the heat-conducting member 458, so that the optical modulator 451 is efficiently cooled and temperature rise in the optical modulator 451 can be prevented, thereby efficiently avoiding heat degradation of the optical modulator 451 with a simple arrangement.

Further, in the first exemplary embodiment, the heat-conducting member 458 is formed in the U-shape in plan view having the base end 458A and the pair of extending portions 458C, 453C and the heat-conducting-member-side connecting portions 4581B, 4581C are provided on the pair of extending portions 458B, 458C. The heat-conducting member 458 connects with the optical modulator 451 by a heat-transferable connection between the heat-conducting-member-side connecting portions 4581B, 4581C of the pair of extending portions 458B, 458C and the optical-element-side connecting portions 4512C, 4512D. Accordingly, as compared with, for instance, an arrangement where the heat-conducting member (a heat pipe) is connected with only one of the sides of the optical modulator 451 in a heat-transferable manner, a plurality of coolant reflux passages (four passages in the first exemplary embodiment) can be provided in the tube between the evaporating portions 4582A, 4582B (a part of the extending portion 458B, 458C) and the condensing portions 4583A, 4583B and 4584 located apart from the evaporating portions 4582A, 4582B, so that a heat transfer rate in the tube can be increased to efficiently cool the optical modulator 451, thereby preventing temperature rise in the optical modulator 451 to efficiently avoid heat degradation of the optical modulator 451. To efficiently cool the optical modulator 451, for example, an arrangement may be employed, where two heat-conducting members (heat pipes) connect with the optical-element-side connecting portions 4512C, 4512D of the optical modulator 451 in a heat-transferable manner. However, in the arrangement of the first exemplary embodiment, the optical modulator 451 can be efficiently cooled with only one heat-conducting member 458, so that the structure of the optical device body 45A can be simplified to reduce the cost of the optical device body 45A, thereby reducing the cost of the projector 1.

In the first exemplary embodiment, the capillary-tube structure of the heat-conducting member 458 is provided by a sintered wick. Accordingly, it is not necessary to utilize the gravity for the movement of the coolant, so that the condensing portions 4583A, 4583B, 4584 and the evaporating portions 4582A, 4582B can be disposed without positional limitation. As an example, irrespective of a posture of the projector 1 such as a normal posture, a suspended posture and an inclined posture for adjusting a projection image position, heat in the heat-conducting member 458 can be efficiently moved, so that the optical modulator 451 can be efficiently cooled, thereby preventing temperature rise in the optical modulator 451 to efficiently avoid heat degradation of the optical modulator 451.

Since the capillary-tube structure of the heat-conducting member 458 is formed by sintered wick, heat resistance between the evaporating portions 4582A, 4582B and the condensing portions 4583A, 4583B, 4584 can be set sufficiently low as compared with the other wick (extra-fine line wick, metal mesh wick, groove wick and the like) and the heat can be efficiently transferred to the coolant by virtue of the excellent heat conductivity of the wick itself. Accordingly, heat transfer within the heat-conducting member 458 can be more rapidly conducted and the cooling efficiency of the optical modulator 451 can be further improved.

Second Exemplary Embodiment

A second exemplary embodiment of the invention will be described below with reference to the attached drawings.

In the following description, the same reference numerals will be attached to the same structures and components as the above-described first exemplary embodiment and detailed description thereof will be omitted or simplified.

Figure 6:
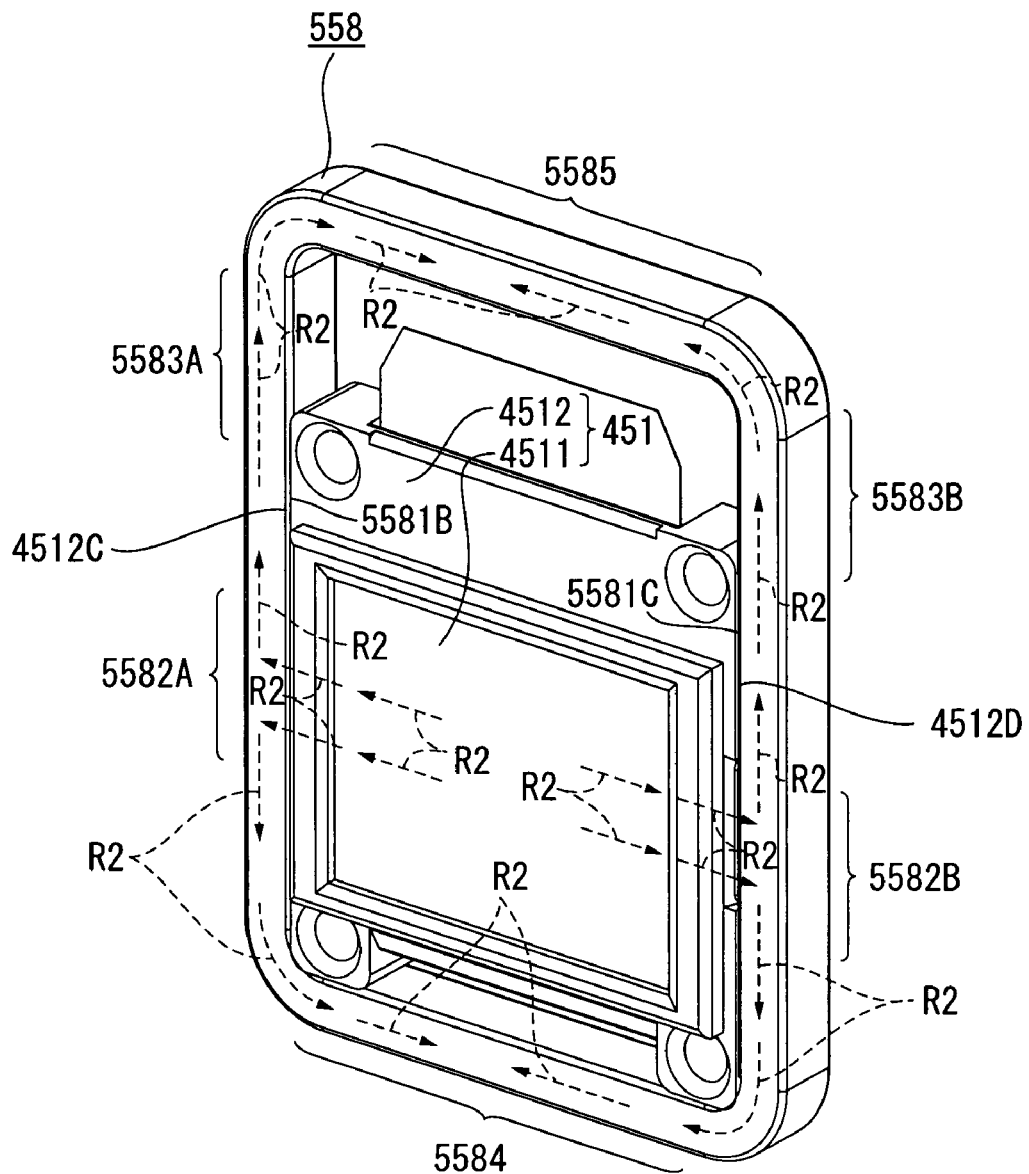
FIG. 6 is a perspective view showing a structure of a heat-conducting member and a connecting structure of the heat-conducting member and an optical modulator of a second exemplary embodiment.
Figure 6:
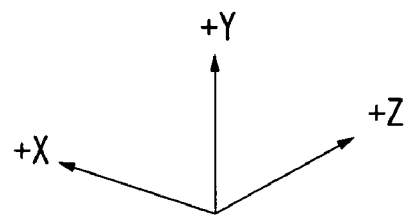

FIG. 6 is a perspective view showing a structure of a heat-conducting member 558 and a connecting structure of the heat-conducting member 558 and the optical modulator 451 according to the second exemplary embodiment. Note that, in FIG. 6, an optical axis of a light beam irradiated from the optical modulator 451 is defined as Z-axis and two axes orthogonal to Z-axis are defined as X-axis (horizontal axis) and Y-axis (vertical axis) for convenience for description.

As shown in FIG. 6, the second exemplary embodiment differs from the first exemplary embodiment only in the structure of the heat-conducting member 558. The rest of the arrangement is the same as the first exemplary embodiment.

The heat-conducting member 558 is a heat pipe, which is similar to the heat-conducting member 458 described in the first exemplary embodiment. As shown in FIG. 6, the heat-conducting member 558 is different from the heat-conducting member 458 shown in FIG. 5 in that the distal ends of the pair of extending portions 458B, 458C are connected with each other, forming a ring shape.

As shown in FIG. 6, the heat-conducting member 558 is pressed to be bent into a rectangular ring shape in plan view to coincide with the outer profile of the optical modulator 451 (to enclose an outer periphery of the optical modulator 451). An inner surface of the ring shape has a rectangular cross section, the inner surface being flat and parallel to YZ plane in correspondence with the optical-element-side connecting portions 4512C, 4512D of the optical modulator 451. As shown in FIG. 6, the heat-conducting member 558 has an in-ring inner length in X direction substantially the same as the outer dimension in X direction of the optical modulator 451 and a length in Y direction larger than the outer dimension of Y direction of the optical modulator 451. Opposing surfaces 5581B, 5581C, which face each other in X direction, of the in-ring inner surface of the heat-conducting member 558 serve as the heat-conducting-member-side connecting portions connected to the optical modulator 451 in a heat-transferable manner.

By fitting the optical modulator 451 into the ring shape of the heat-conducting member 558 (where −Y side of the optical modulator 451 abuts an inner surface on −Y side of the ring of the heat-conducting member 558), the optical-element-side connecting portions 4512C, 4512D of the optical modulator 451 surface-contact with the heat-conducting-member-side connecting portions 5581B, 5581C of the heat-conducting member 558, so that the optical modulator 451 and the heat-conducting members 558 are connected with each other in a heat-transferable manner. Similarly to the first exemplary embodiment, the heat-conducting members 558 may be connected with the optical modulator 451 by connecting the optical-element-side connecting portions 4512C, 4512D with the heat-conducting-member-side connecting portions 5581B, 5581C by soldering, welding, adhering with a thermally-conductive adhesive and the like.

Next, a structure for releasing heat generated on the liquid crystal panel 4511 due to irradiation of light beams will be described.

Note that the heat releasing structure of the second exemplary embodiment is substantially the same as that of the first exemplary embodiment but has a difference described below.

Unlike the heat-conducting member 458 described in the first exemplary embodiment, the distal ends of the pair of extending portions 458B, 458C of the heat-conducting member 558 in the second exemplary embodiment are connected to each other, thereby forming the ring shape. Hence, as shown in FIG. 6, substantially the center (in Y direction) of portions extending in parallel with each other in Y direction (the portions corresponding to the pair of extending portions 458B, 458C in the first exemplary embodiment) function as evaporating portions 5582A, 5582B. Portions between the evaporating portions 5582A, 5582B on low temperature sides (located apart from the evaporating portions 5582A, 5582B) function as condensing portions 5583A, 5583B, 5584, 5585 which correspond to the distal ends of the pair of extending portions 458B, 458C and the base end described in the first exemplary embodiment and +Y side extending in X direction.

As indicated by arrows R2 in FIG. 6, heat generated on the liquid crystal panel 4511 moves through a heat transfer passage from the liquid crystal panel 4511 via the holder frame 4512 to the heat-conducting member 558 and from the evaporating portions 5582A, 5582B of the heat-conducting member 558 to the condensing portions 5583A, 5583B, 5584 and 5585 from which the heat is released to the outside.

According to the above-described second exemplary embodiment, following advantages can be obtained as well as the same advantages as the first exemplary embodiment.

In the second exemplary embodiment, the heat-conducting members 558 has the ring shape enclosing the outer periphery of the optical modulator 451. Accordingly, the heat-conducting member 558 further has the condensing portion 5585 extending in X direction on +Y side in addition to the evaporating portions 5582A, 5582B and the condensing portions 5583A, 5583B which respectively correspond to the evaporating portions 4582A, 4582B and the condensing portions 4583A, 4583B, 4584 of the heat-conducting member 458 of the first exemplary embodiment. In other words, as compared with the heat-conducting member 458 described in the first exemplary embodiment, the heat-conducting member 558 has such enlarged heat-releasing condensing portions to ensure a larger heat releasing area, so that temperature difference between the evaporating portions and the condensing portions can be set large, thereby increasing a heat transfer rate in the tube. Hence, the optical modulator 451 can be more efficiently cooled.

Third Exemplary Embodiment

A third exemplary embodiment of the invention will be described below with reference to the attached drawings.

In the following description, the same reference numerals will be attached to the same structures and components as the above-described first exemplary embodiment and detailed description thereof will be omitted or simplified.

Figure 7:
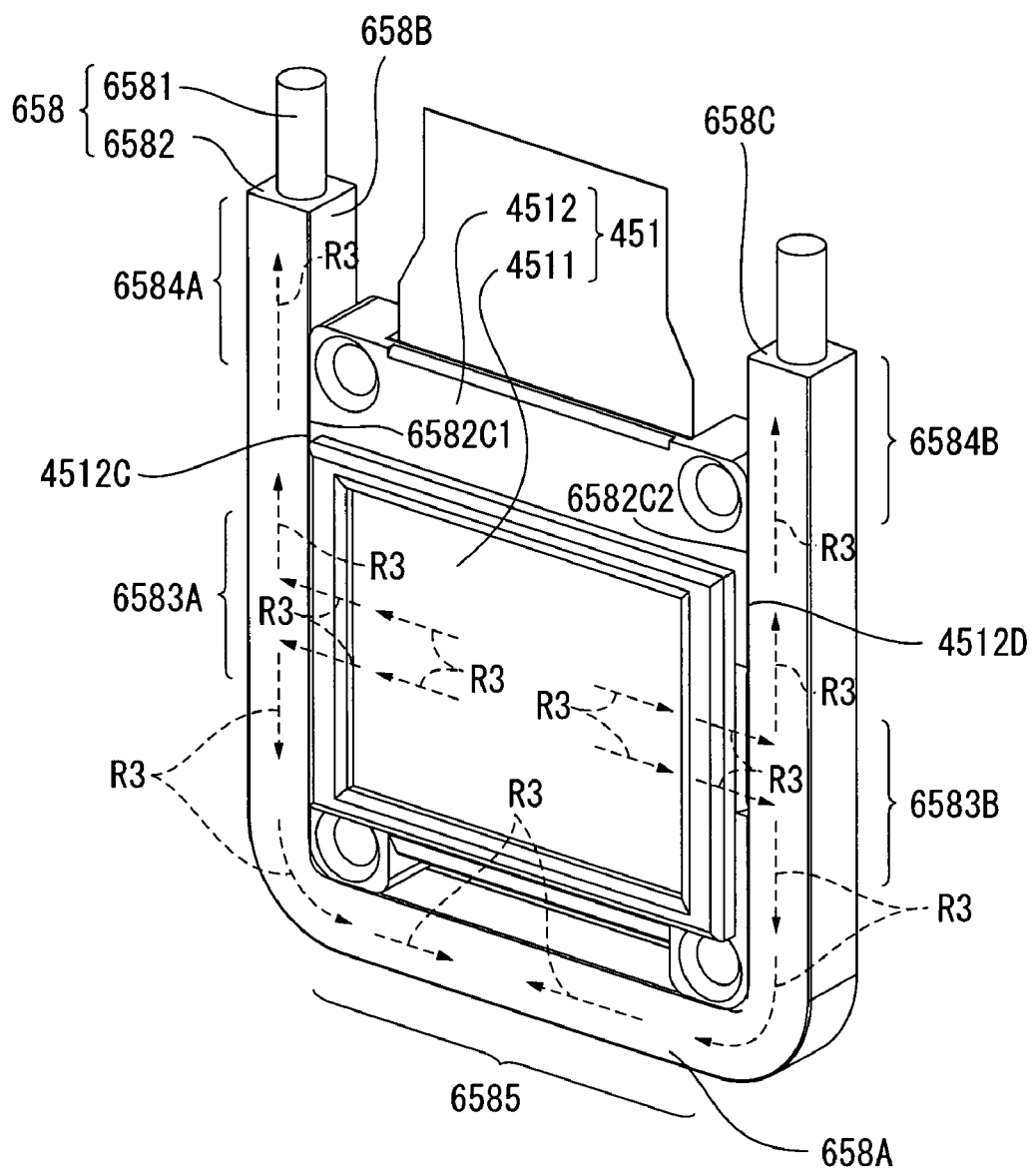
FIG. 7 is a perspective view showing a structure of a heat-conducting member and a connecting structure of the heat-conducting member and an optical modulator of a third exemplary embodiment.
Figure 7:
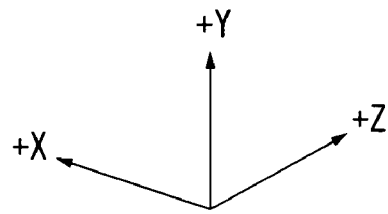

FIG. 7 is a perspective view showing a structure of a heat-conducting member 658 and a connecting structure of the heat-conducting member 658 and the optical modulator 451 according to the third exemplary embodiment.

Figure 8:
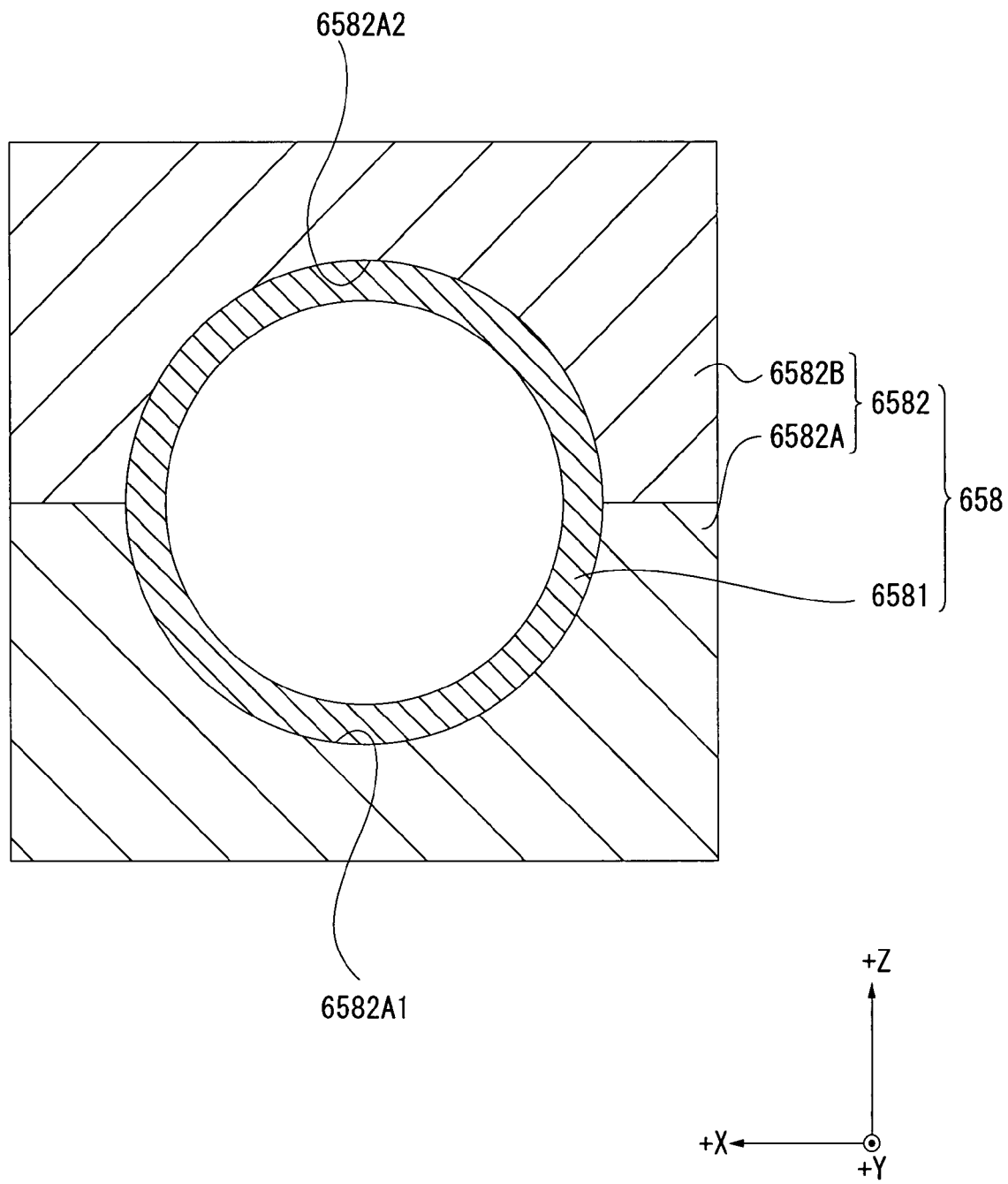
FIG. 8 is a cross section schematically showing the structure of the heat-conducting member of the third exemplary embodiment.

FIG. 8 is a cross section schematically showing a structure of the heat-conducting member 658.

As shown in FIG. 7 or 8, the third exemplary embodiment differs from the first exemplary embodiment only in the structure of the heat-conducting member 658. The rest of the arrangement is the same as the first exemplary embodiment.

As shown in FIG. 7 or 8, the heat-conducting member 658 includes a heat pipe 6581 and an outer frame body 6582.

The heat pipe 6581 has the same function as the heat-conducting member 458 described in the first exemplary embodiment. As shown in FIG. 7 or 8, the heat pipe 6581 has a substantially circular cross section and a U-shape in plan view in correspondence with the outer profile of the optical modulator 451, the U-shape including a base end extending along −Y side of the optical modulator 451 and a pair of extending portions along ±X sides of the optical modulator 451. Although not specifically shown, the heat pipe 6581 is formed such that a distance between the pair of extending portions (a distance in X direction) is larger than the outer dimension of the optical modulator 451 in X direction and a length in the extending direction (Y direction) of the pair of extending portions is larger than the outer dimension of the optical modulator 451 in Y direction.

The heat pipe 6582 is made of a thermally-conductive material and is provided so as to cover an outer circumference of the heat pipe 6581 in a heat-transferable connection with the outer circumference as shown in FIG. 7 or 8. As shown in FIG. 7, the outer frame body 6582 has a U-shape in plan view in correspondence with the shape of the heat pipe 6581, the U-shape including the base end 658A extending in X direction and a pair of extending portions 658B, 658C extending in Y direction. Any material can be employed for the outer frame body 6582 as long as the material is thermally conductive. For example, the same material as the holder frame 4512 of the optical modulator 451 can be used.

As shown in FIG. 8, the outer frame body 6582 includes two components of a first outer frame body 6582A and a second outer frame body 6582B which are assembled to each other to be thermally-coupled with the outer circumference of the heat pipe 6581.

Specifically, the first outer frame body 6582A is made by pressing, injection molding or the like into a U-shape in plan view in correspondence with the outer profile of the optical modulator 451 to coincide with the surface of −Y side and the surfaces extending from ±X sides of the optical modulator 451 and into a substantially rectangular cross section in correspondence with the optical-element-side connecting portions 4512C, 4512D of the optical modulator 451 such that an inner surface of the U-shape is flat and parallel to YZ plane. As shown in FIG. 8, a concave curve 6582A1 in an arc cross section in correspondence with the outer surface of the heat pipe 6581 is formed on a surface on +Z side of the first outer frame body 6582A. As shown in FIG. 7, the first outer frame body 6582A is formed such that a distance between the pair of extending portions 658B, 658C is substantially the same as the outer dimension in X direction of the optical modulator 451 and a length in the extending direction of the pair of extending portions 658B, 658C is larger than the outer dimension in Y direction of the optical modulator 451. The second outer frame body 6582B is formed in a similar manner as the first outer frame body 6582A. As shown in FIG. 8, a concave curve 6582B1 having an arc shape is formed on −Z side in correspondence with the outer surface of the heat pipe 6581.

By assembling the first outer frame body 6582A and the second outer frame body 6582B, the concave curves 6582A1, 6582B1 form a cylindrical space, in which the heat pipe 6581 can be disposed. When the first outer frame body 6582A and the second outer frame body 6582B are assembled for the heat pipe 6581 to be disposed in the space, the concave curves 6582A1, 6582B1 and the outer surface of the heat pipe 6581 are surface-contacted with each other, so that the heat pipe 6581 and the outer frame body 6582 are connected in a heat-transferable manner. The heat pipe 6581 may be connected with the outer frame body 6582 by connecting the outer surface of the heat pipe 6581 with the concave curves 6582A1, 6582B1 by soldering, welding, adhering with a thermally-conductive adhesive and the like. By employing such an arrangement, even a microlevel non-contacting portion caused by surface roughness between the outer surface of the heat pipe 6581 and the concave curves 6582A1, 9582B1 can be connected in a heat-transferable manner.

When the first outer frame body 6582A and the second outer frame body 6582B are assembled, an inner surface of the U-shape of the first outer frame body 6582A is substantially flush with an inner surface of the U-shape of the second outer frame body 6582B, so that an inner surface in the U-shape of the outer frame body 6582 is flat and parallel to YZ plane. Mutually opposing surfaces 6582C1, 6582C2 (FIG. 7) of the pair of extending portions 658B, 658C of the outer frame body 6582 of the heat-conducting member 658 are heat-conducting-member-side connecting portions connected with the optical modulator 451 in a heat-transferable manner.

By fitting the optical modulator 451 in the U-shape of the heat-conducting members 658 (where −Y side of the optical modulator 451 abuts the base end 658A), the optical-element-side connecting portions 4512C, 4512D of the optical modulator 451 surface-contact with the heat-conducting-member-side connecting portions 6582C1, 6582C2 of the heat-conducting member 658, so that the optical modulator 451 and the heat-conducting members 658 are connected with each other in a heat-transferable manner. Similarly to the first exemplary embodiment, the heat-conducting members 658 may be connected with the optical modulator 451 by connecting the optical-element-side connecting portions 4512C, 4512D with the heat-conducting-member-side connecting portions 6582C1, 6582C2 by soldering, welding, adhering with a thermally-conductive adhesive and the like.

Next, a structure for releasing heat generated on the liquid crystal panel 4511 due to irradiation of light beams will be described.

The heat releasing structure of the third exemplary embodiment differs from that of the first exemplary embodiment only in that the outer frame body 6582 is interposed in the heat transfer passage from the holder frame 4512 to the heat pipe 6581 in the third exemplary embodiment. As indicated by arrows R3 in FIG. 7, the heat generated on the liquid crystal panel 4511 moves through a heat transfer passage from the liquid crystal panel 4511 via the holder frame 4512 to the outer frame body 6582 and from evaporating portions 6583A, 6583B of the heat-conducting member 658 (the heat pipe 6581) to condensing portions 6584A, 6584B and 6585 from which the heat is released to the outside.

According to the above-described third exemplary embodiment, following advantages can be obtained as well as the same advantages as the first exemplary embodiment.

In the third exemplary embodiment, the heat-conducting member 658 includes the heat pipe 6581 and the outer frame body 6582 and surface-contacts with the optical modulator 451 with the outer frame body 6582 interposed between the heat pipe 6581 and the optical modulator 451. Accordingly, as compared with the heat-conducting member 458 described in the first exemplary embodiment, since the outer frame body 6582 is provided between the optical modulator 451 and the heat pipe 6581, no pressing for the heat pipe 6581 is required. It is only necessary to form the heat-conducting-member-side connecting portions 6582C1, 6582C2 on the outer surface of the outer frame body 6582 into a shape same as the profile of the outer surface (the optical-element-side connecting portions 4512C, 4512D) of the optical modulator 451. Thus, characteristics of the heat pipe 6581 can be excellent while the optical modulator 451 can be efficiently cooled, thereby preventing temperature rise in the optical modulator 451 to efficiently avoid heat degradation of the optical modulator 451 (the liquid crystal panel 4511).

Since the outer frame body 6582 is constituted by the two components of the first outer frame body 6582A and the second outer frame body 6582B, the outer frame body 6582 can be easily attached onto the heat pipe 6581.

Fourth Exemplary Embodiment

A fourth exemplary embodiment of the invention will be described below with reference to the attached drawings.

In the following description, the same reference numerals will be attached to the same structures and components as the above-described first exemplary embodiment and detailed description thereof will be omitted or simplified.

Figure 9A:
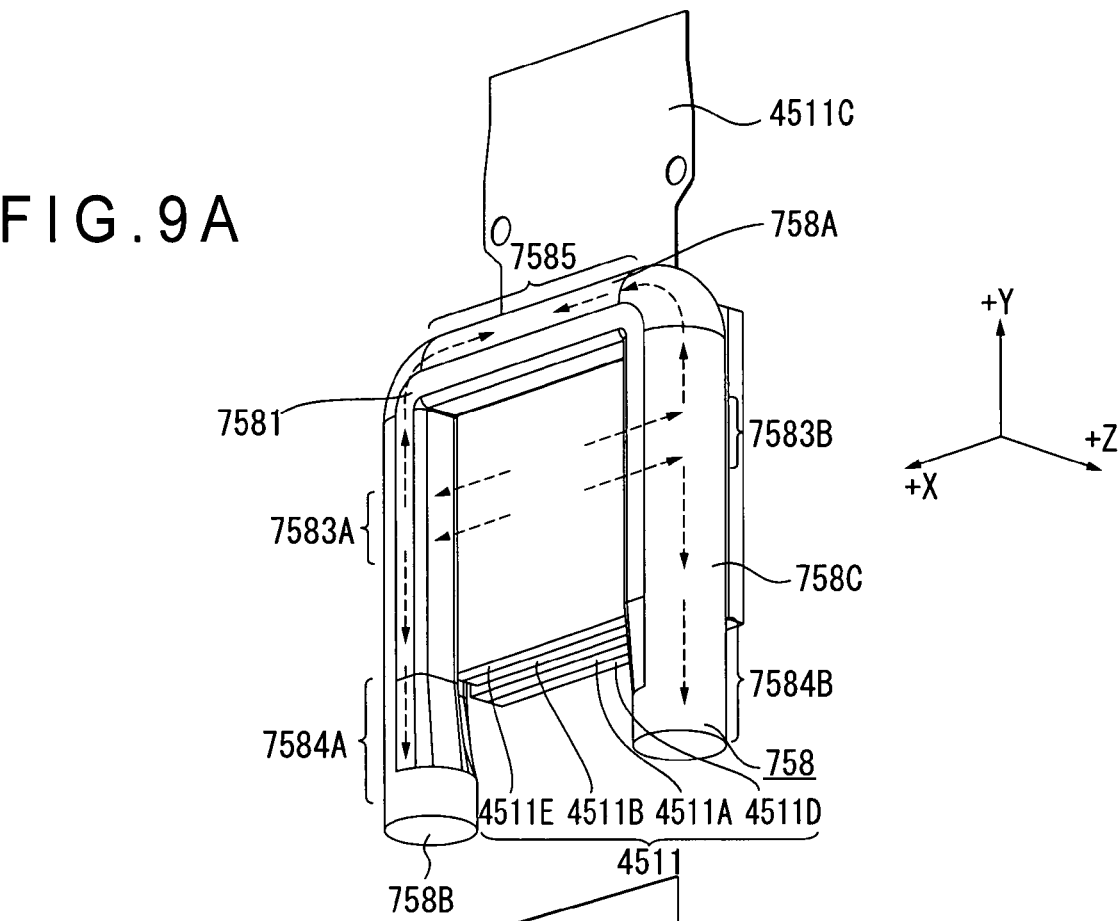
FIG. 9A is a perspective view showing a structure of a heat-conducting member and a connecting structure of the heat-conducting member and a liquid crystal panel of a fourth exemplary embodiment.

FIGS. 9A to 10B show a structure of a heat-conducting member 758 and a connecting structure of the heat-conducting member 758 and the liquid crystal panel 4511 of the fourth exemplary embodiment. Specifically, FIG. 9A is a perspective view as seen from the light incident side. FIG. 9B is a perspective view as seen from the light emitting side. FIG. 10A is a cross section as seen from a lateral side. FIG. 10B is a cross section as seen from the upper side.

Note that, in FIGS. 9A and 10B, an optical axis of a light beam irradiated from the liquid crystal panel 4511 is defined as Z-axis and two axes orthogonal to Z-axis are defined as X-axis (horizontal axis) and Y-axis (vertical axis) for convenience for description.

As shown in FIGS. 9A to 10B, the fourth exemplary embodiment differs from the first exemplary embodiment in that: the heat-conducting member 758 has a different structure; the holder frame 4512 of the optical modulator 451 is omitted; the heat-conducting member 758 holds and fixes the liquid crystal panel 4511 (an optical element); and the liquid crystal panel 4511 can be disposed at a predetermined position. The rest of the arrangement is the same as the first exemplary embodiment.

The heat-conducting member 758 is a heat pipe, which is similar to the heat-conducting member 458 described in the first exemplary embodiment.

Figure 9B:
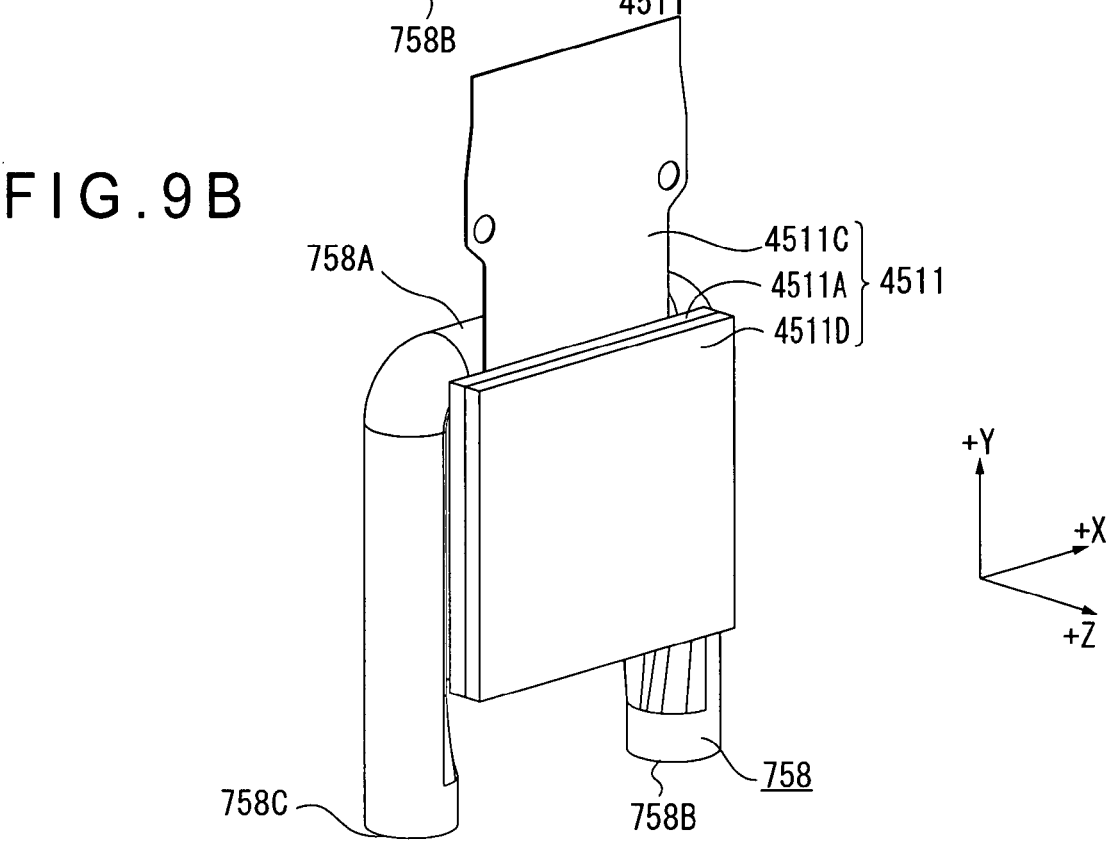
FIG. 9B is a perspective view showing the structure of the heat-conducting member and the connecting structure of the heat-conducting member and the liquid crystal panel of the fourth exemplary embodiment.

As shown in FIGS. 9A and 9B, the heat-conducting member 758 is pressed into a U-shape in plan view in correspondence with the outer profile of the liquid crystal panel 4511, the U-shape including a base end 758A extending along +Y side of the liquid crystal panel 4511 and a pair of extending portions 758B, 758C extending along ±X sides of the liquid crystal panel 4511.

As shown in FIG. 9A, the heat-conducting member 758 is pressed such that an outer surface of −Z side (on the light incident side) is flat. The flat outer surface 7581 functions as a supporting surface for supporting an optical element (such as the incident-side polarizer 452) disposed on the upstream of the optical path.

As shown in FIGS. 10A and 10B, the heat-conducting member 758 is pressed into a shape in which a periphery of the U-shape on +Z side (on the light emitting side) is dented in −Z direction in correspondence with the outer profile of the liquid crystal panel 4511, forming a dented portion 7582 in a U-shape in plan view. More specifically, as shown in FIGS. 10A and 10B, the dented portion 7582 has a shape in correspondence with the outer profiles of the opposing substrate 4511B and the dust-proof glass 4511E of the liquid crystal panel 4511, allowing the opposing substrate 4511B and the dust-proof glass 4511E of the liquid crystal panel 4511 to be loosely fit in the dented portion 7582. As shown in FIGS. 10A and 10B, a bottom portion of the dented portion 7582 is formed flat. A bottom portion 7582A of the dented portion 7582 of the heat-conducting member 758 is the heat-conducting-member-side connecting portion connected to the liquid crystal panel 4511 in a heat-transferable manner.

By arranging the light-incident-side surface of the liquid crystal panel 4511 to abut to the dented portion 7582 of the heat-conducting member 758, a light-incident-side surface 4511E1 (an optical-element-side connecting portion) of the dust-proof glass 4511E of the liquid crystal panel 4511 surface-contacts the heat-conducting-member-side connecting portion 7582A of the heat-conducting member 758, so that the liquid crystal panel 4511 is connected with the heat-conducting member 758 in a heat-transferable manner. The optical-element-side connecting portion 4511E1 and the heat-conducting-member-side connecting portion 7582A are fixed by a thermally-conductive adhesive. The adhesion allows even a microlevel non-contacting portion caused by surface roughness between the optical-element-side connecting portion 4511E1 and the heat-conducting-member-side connecting portion 7582A to be connected in a heat-transferable manner.

In other words, by employing the above-described structure of the heat-conducting member 758, the liquid crystal panel 4511 can be held and fixed directly. Further, the liquid crystal panel 4511 can be disposed at a predetermined position by fixing the heat-conducting member 758 at a predetermined position relative to the optical-element holder 457 or by fixing the heat-conducting member 758 in the optical component casing 46.

Next, a structure for releasing heat generated on the liquid crystal panel 4511 due to irradiation of light beams will be described.

The heat releasing structure of the fourth exemplary embodiment differs from that of the first exemplary embodiment only in that the holder frame 4512 is omitted on the heat transfer passage from the liquid crystal panel 4511 to the heat-conducting member 758 in the fourth exemplary embodiment. As indicated by arrows R4 in FIG. 9A, the heat generated on the liquid crystal panel 4511 moves through a heat transfer passage from the liquid crystal panel 4511 to the heat-conducting member 758 and from evaporating portions 7583A, 7583B of the heat-conducting member 758 to condensing portions 7584A, 7584B and 7585 from which the heat is released to the outside.

According to the above-described fourth exemplary embodiment, following advantages can be obtained as well as the same advantages as the first exemplary embodiment.

In the fourth exemplary embodiment, the heat-conducting member 758 has a U-shape in plan view formed by the base end 758A and the pair of extending portions 758B, 758C. The heat-conducting member 758 holds and fixes the liquid crystal panel 4511 on a bottom portion (a heat-conducting-member-side connecting portion 7582A) of the dented portion 7582 formed in an inner periphery of the U-shape to position the liquid crystal panel 4511 at a predetermined position. In other words, unlike the optical modulator 451 described in the first exemplary embodiment, the holder frame 4512 is omitted and the heat-conducting member 758 itself functions as the holder frame for holding the liquid crystal panel 4511. Thus, the holder frame 4512 is omitted and the structure of the optical device body 45A can be simplified, thereby reducing the cost of the optical device body 45A and the cost of the projector 1.

Since the holder frame 4512 can be omitted, the heat generated on the liquid crystal panel 4511 is directly released onto the heat-conducting member 758 without passing through the holder frame 4512, so that excellently heat transfer characteristics from the liquid crystal panel 4511 to the heat-conducting member 758 can be ensured, thereby improving cooling efficiency of the liquid crystal panel 4511.

Modifications of First to Fourth Exemplary Embodiments

Note that the scope of the invention is not restricted to the above-described exemplary embodiments, but includes modifications and improvements as long as an object of the invention can be achieved.

In the arrangements according to the aforesaid exemplary embodiments, the heat-conducting members 458, 558, 658, 758 are used to cool the optical modulators 451 and the liquid crystal panels 4511. However, the arrangement is not limited thereto and other optical elements such as the polarization converters 423, the incident-side polarizers 452, the irradiation-side polarizers 454 and the like may be cooled.

In the aforesaid exemplary embodiments, the heat-conducting members 458, 558, 658, 758 are formed in a U-shape in plan view or a ring shape. However, the heat-conducting members 458, 558, 658, 758 may have any other shape as long as the shape allows a surface-contact with the holder frame 4512 or the liquid crystal panel 4511 of the optical modulator 451 in a heat-transferable manner.

The optical-element-side connecting portions 4512C, 4512D and the heat-conducting-member-side connecting portions 4581B, 4581C, 5581B, 5581C, 6582C1, 6582C2, 7582A are formed flat in the aforesaid exemplary embodiments, the components may have any other form such as a curve or a concave-convex form.

In the aforesaid exemplary embodiments, an outer surface of the holder frame 4512 or the liquid crystal panel 4511 of the optical modulator 451 serves as the optical-element-side connecting portion and the heat-conducting-member-side connecting portions 4581B, 4581C, 5581B, 5581C, 6582C1, 6582C2, 7582A are formed to coincide with the outer surface. However, the outer surface of the heat pipe that is cylindrical in plan view may alternately serve as the heat-conducting-member-side connecting portion and the optical-element-side connecting portion may be provided on the holder frame or the liquid crystal panel of the optical modulator so as to coincide with the outer surface of the heat pipe. The holder frame or the liquid crystal panel of the optical modulator and the heat-conducting member may be respectively provided with the optical-element-side connecting portion and the heat-conducting-member-side connecting portion which are in a surface-contact with each other.

Figure 11:
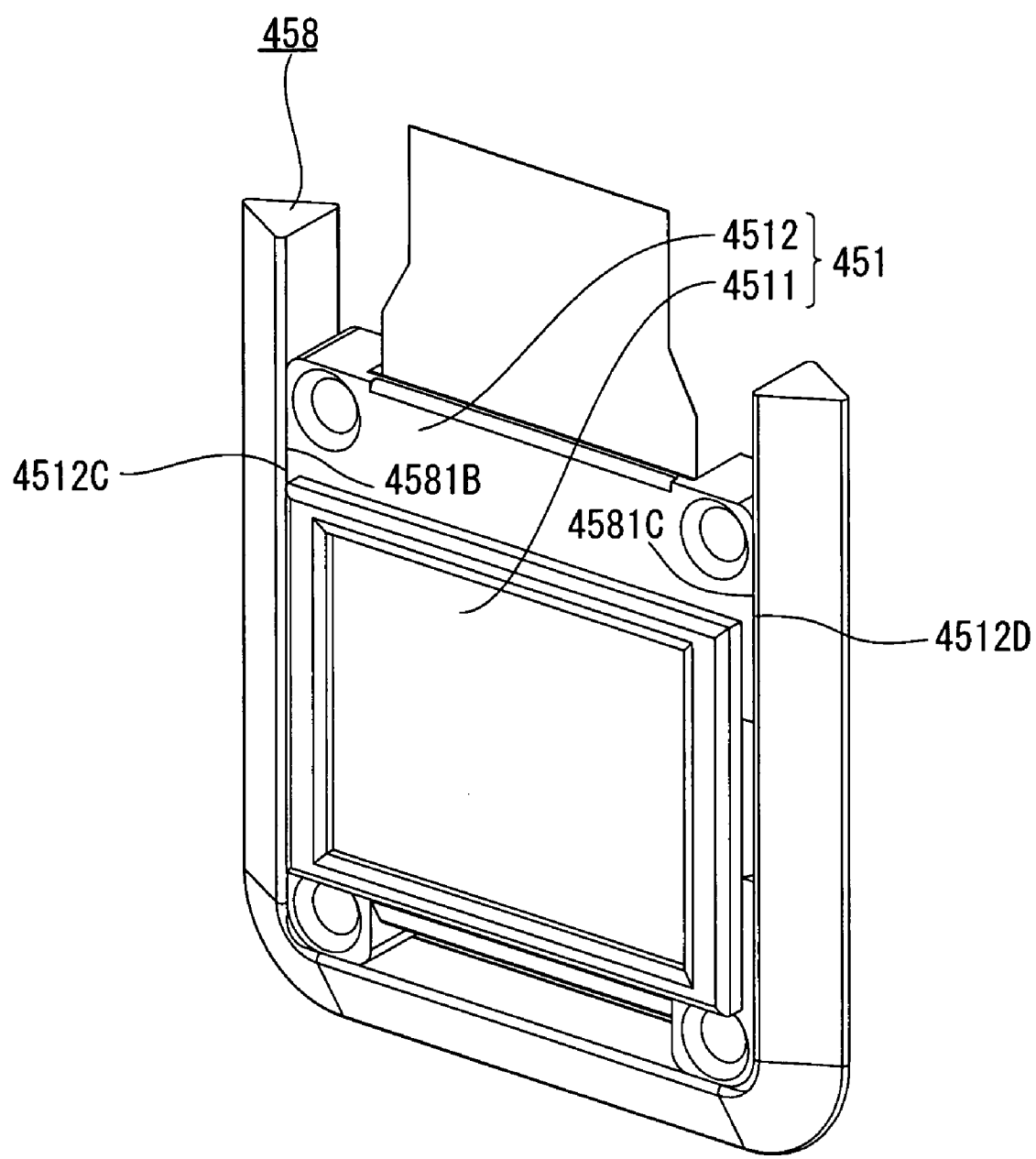
FIG. 11 shows a modification of the first exemplary embodiment.
Figure 12:
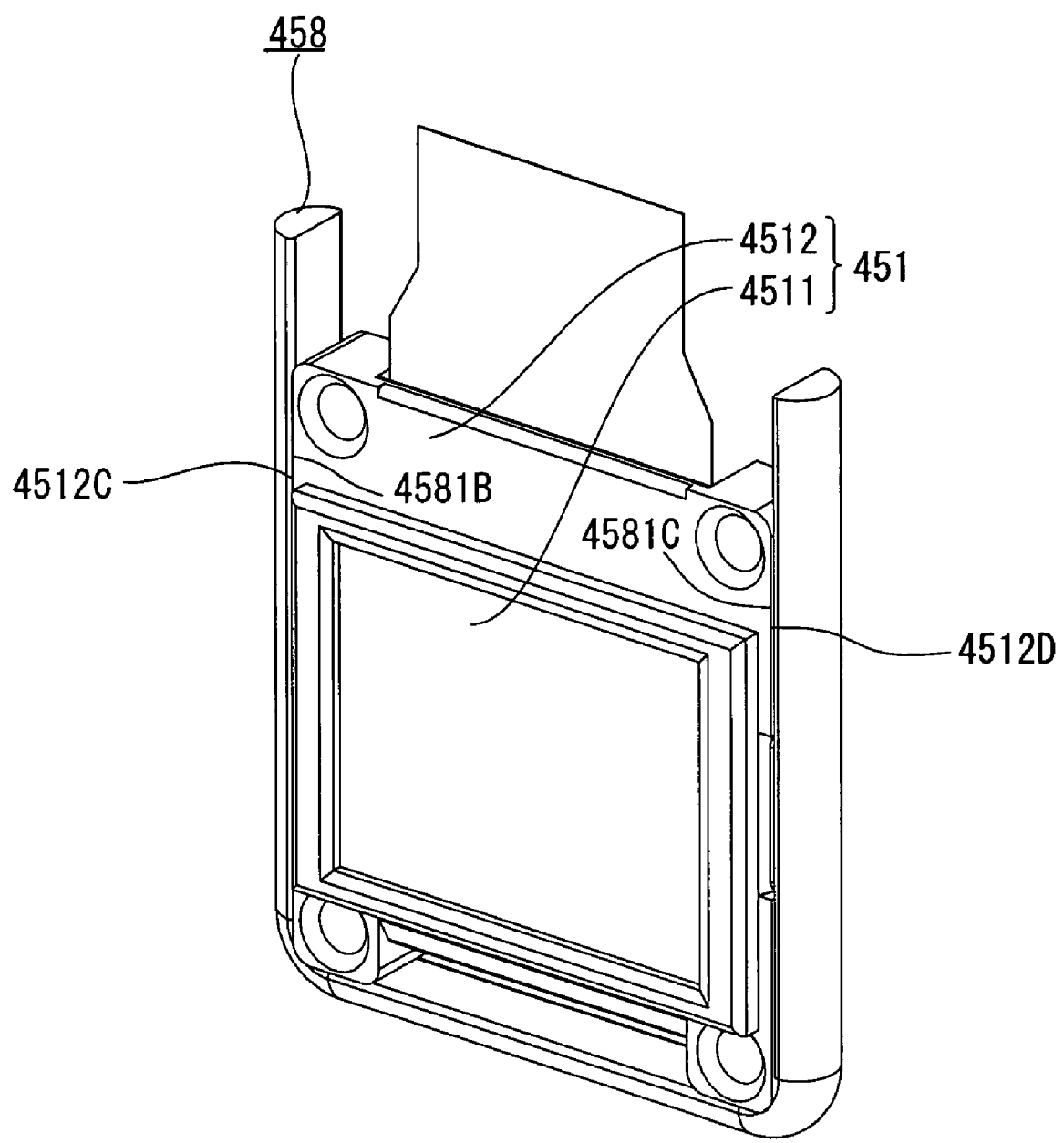
FIG. 12 shows another modification of the first exemplary embodiment.

FIGS. 11 and 12 show modifications of the first exemplary embodiment.

In the first exemplary embodiment, the heat-conducting members 458 is pressed into a substantially rectangular cross section, but the heat-conducting members 458 may have any cross-section as long as the mutually-opposing surfaces 4581B, 4581C of the pair of extending portions 458B, 458C are flat. For instance, as shown in FIG. 11, the heat-conducting member 458 may be pressed into a substantially triangle or semicircular cross section.

In the third exemplary embodiment, the outer frame body 6582 is formed in a rectangular cross section. However, the cross section is not limited thereto and the outer frame body 6582 may be formed in a triangle shape or a semicircular shape (similarly to the above) as long as the mutually-opposing surfaces 6582C1, 6582C2 of the pair of extending portions 658B, 658C are flat.

In the fourth exemplary embodiment, the heat-conducting member 758 has a U-shape in plan view. However, the heat-conducting member 758 may have a ring shape similar to the heat-conducting member 558 described in the second exemplary embodiment as long as the heat-conducting member 758 can at least fit with a portion of an outer peripheral end of the liquid crystal panel 4511. The gap between the surfaces of the dust-proof glass 4511E of the liquid crystal panel 4511 and the opposing substrate 4511B and the dented portion 7582 may be filled with a thermally-conductive adhesive to increase a heat-transferable area.

Figure 13A:
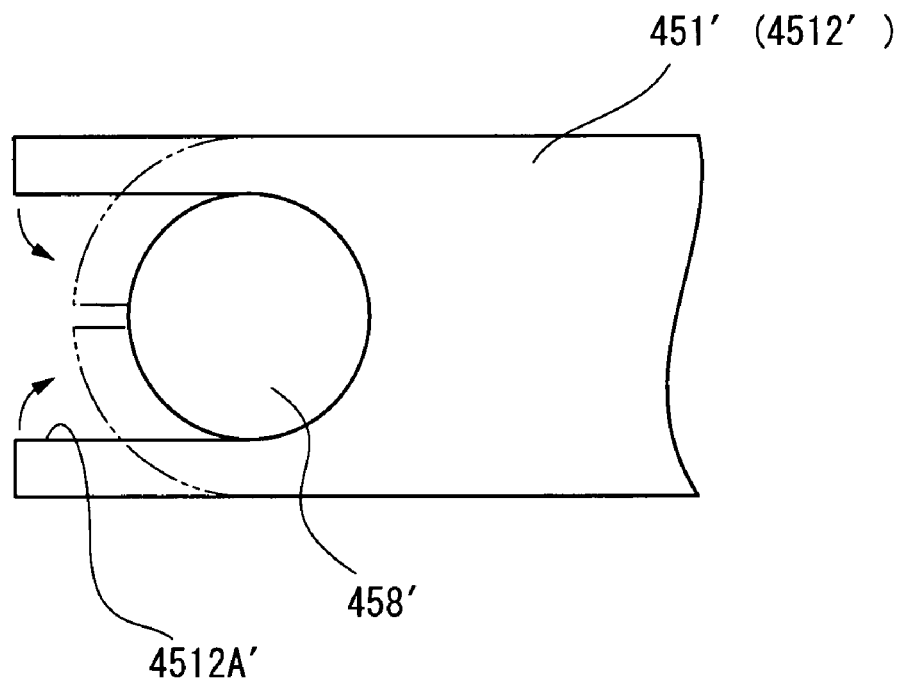
FIG. 13A shows a modification of the aforesaid exemplary embodiments.
Figure 13B:
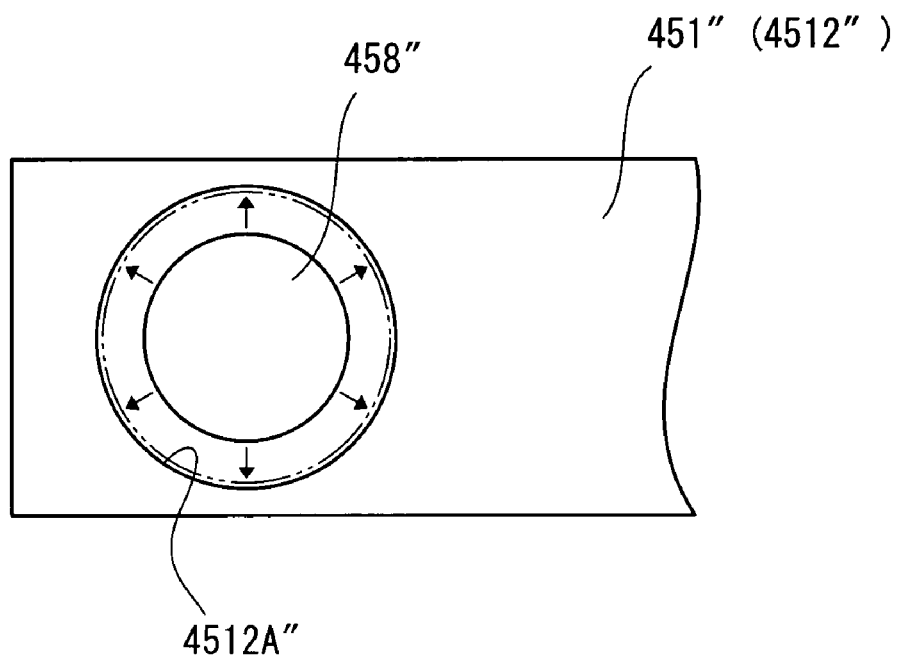
FIG. 13B shows another modification of the aforesaid exemplary embodiments.

FIGS. 13A and 13B show modifications of the aforesaid exemplary embodiments.

According to the invention, following arrangements may be employed as long as the heat-conducting member surface-contacts with the holder frame or the liquid crystal panel of the optical modulator in a heat-transferable manner.

For example, as shown in FIG. 13A, a cut portion 4512A' is formed in advance on a lateral side of a holder frame 4512' of an optical modulator 451' in a shape correspondence to the circular shape in cross section of a heat-conducting member (the heat pipe) 458'. As indicated in a broken line in FIG. 13A, distal ends of a cut portion 4512A' are bent by heat-caulking to make an inner wall surface of the cut portion 4512A' surface-contact with an outer surface of the heat-conducting member 458'.

Alternatively, as shown in FIG. 13B, an insertion hole 4512A" in which a heat-conducting member (a heat pipe) 458" of a cylindrical cross section is formed in advance on a lateral side of a holder frame 4512" of the optical modulator 451'. As indicated by a broken line in FIG. 13B, in manufacture the heat-conducting member 458", the heat-conducting member 458" is inserted into the insertion hole 4512A" and heated to pressurize the inside of the heat-conducting member 458" to expand the heat-conducting member 458", thereby connecting an outer surface of the heat-conducting member 458" to an inner surface of the insertion hole 4512A" in a surface-contact. Subsequently, distal ends of the heat-conducting member 458" are sealed.

Even in this arrangement, the heat-conducting member can surface-contact the holder frame or the liquid crystal panel of the optical modulator to achieve a good heat transfer.

Fifth Exemplary Embodiment

A fifth exemplary embodiment of the invention will be described below with reference to the attached drawings.

In the following description, the same reference numerals will be attached to the same structures and components as the above-described first exemplary embodiment and detailed description thereof will be omitted or simplified.

Details of Arrangement of Optical Device Body

Figure 14:
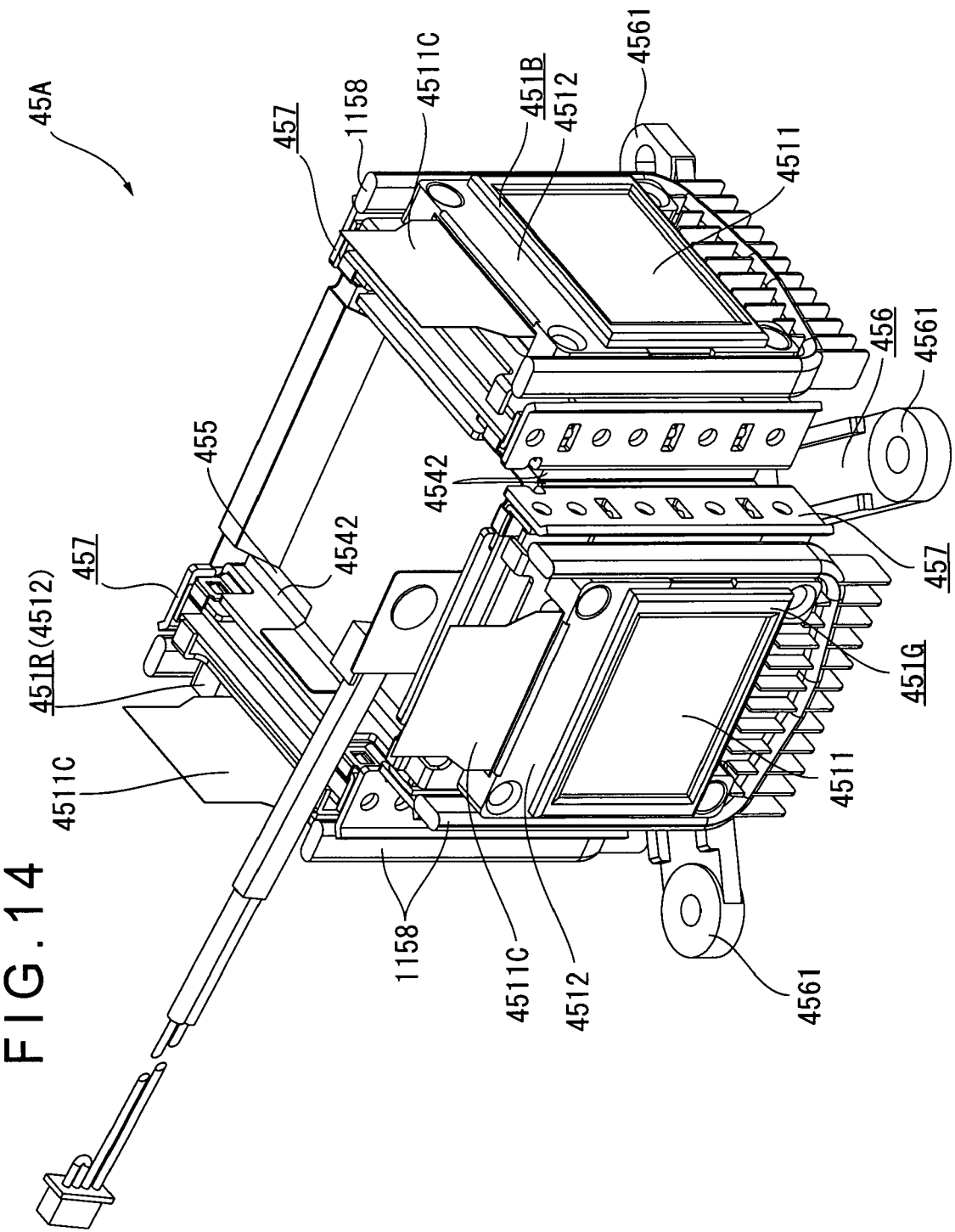
FIG. 14 schematically shows an arrangement of an optical device body of a fifth exemplary embodiment.
Figure 15:
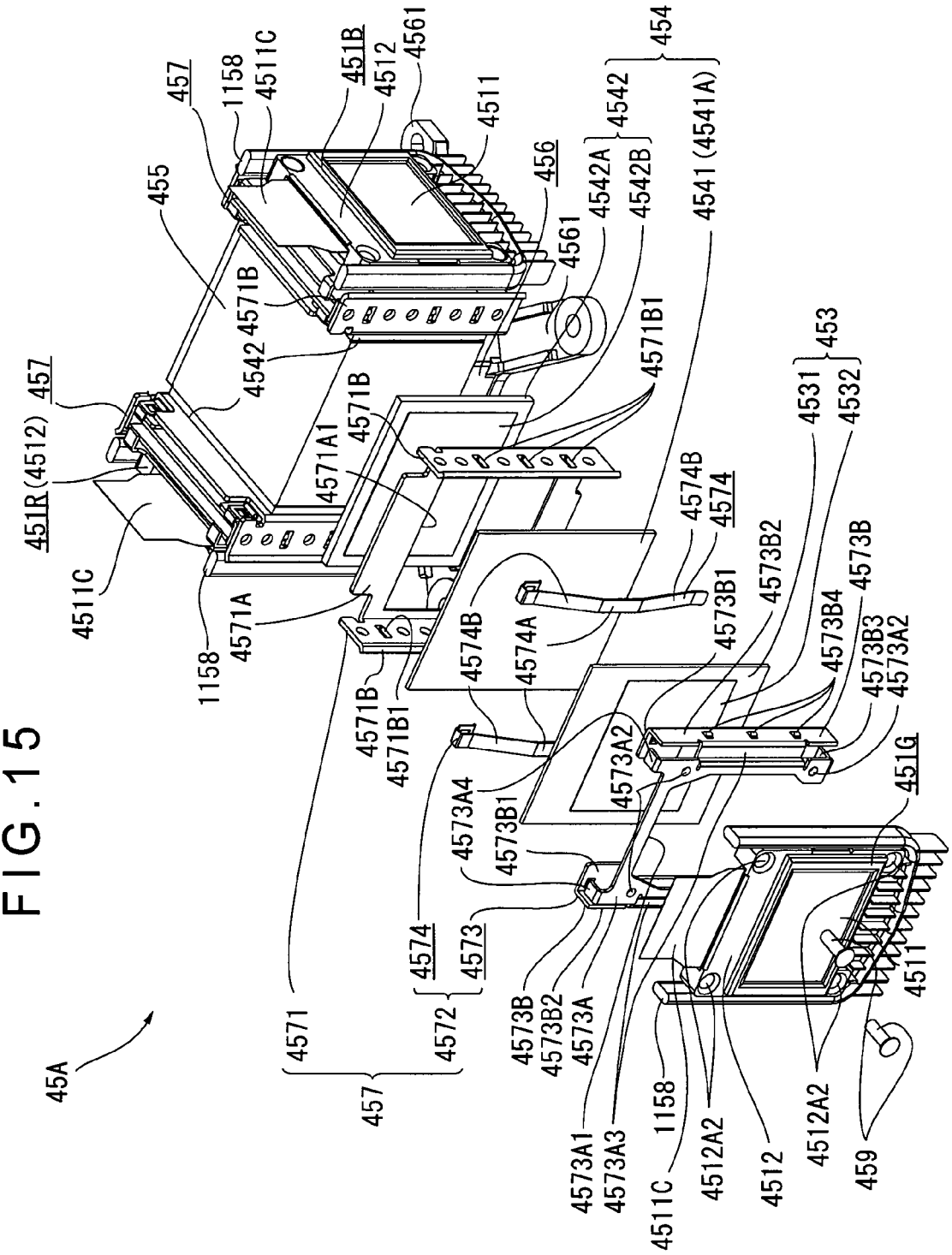
FIG. 15 schematically shows the arrangement of the optical device body of the fifth exemplary embodiment.

FIGS. 14 and 15 schematically show an arrangement of the optical device body 45A. Specifically, FIG. 14 is a perspective view of the optical device body 45A when seen from the optical modulator 451G side. FIG. 15 is an exploded perspective view of the optical device body 45A. In FIG. 15, the optical modulator 451G side of the optical device body 45A is shown in an exploded manner, but optical modulator 451R, 451B sides are also have the same structure as the optical modulator 451G side.

The optical device body 45A includes the above-described optical modulators 451, viewing angle compensators 453, irradiation-side polarizers 454 and cross dichroic prism 455 as well as the supporting structure body 456, the three optical-element holders 457 and the three heat pipes 1158, these components 451, 453 to 458 and 1158 integrally constituting the optical device body 45A.

As shown in FIG. 14 or 15, each of the three irradiation-side polarizers 454 has an arrangement where the second irradiation-side polarizer 4542 is fixed with an adhesive or the like on a light-incident-side surface of the cross dichroic prism 455 with the polarization film 4542B faced toward the light emitting side.

As shown in FIG. 14 or 15, the three heat pipes 1158 are respectively connected to the three optical modulators 451 in a heat-transferable manner and the heat-conducting members 458 release heat that generates on the optical modulators 451 due to the light beams irradiated thereon. Each heat pipe 1158 is formed as a tube having capillary-tube structure (wick) and accommodating a coolant in the tube, where the coolant circulates within the tube to transfer the heat within the heat pipe 1158.

Although not specifically shown, the capillary structure of the heat pipe 1158 is a sintered wick of powder form. Water is used as the coolant herein. The capillary structure is not limited to sintered wick, but other wicks such as extra-fine line wick of a plurality of fine copper lines and the like, net-like metal mesh wick and groove-wick in which a plurality of grooves are formed inside the tube, may be used. The coolant is not limited to water, but other coolant such as alcohol may be used.

Figure 16:
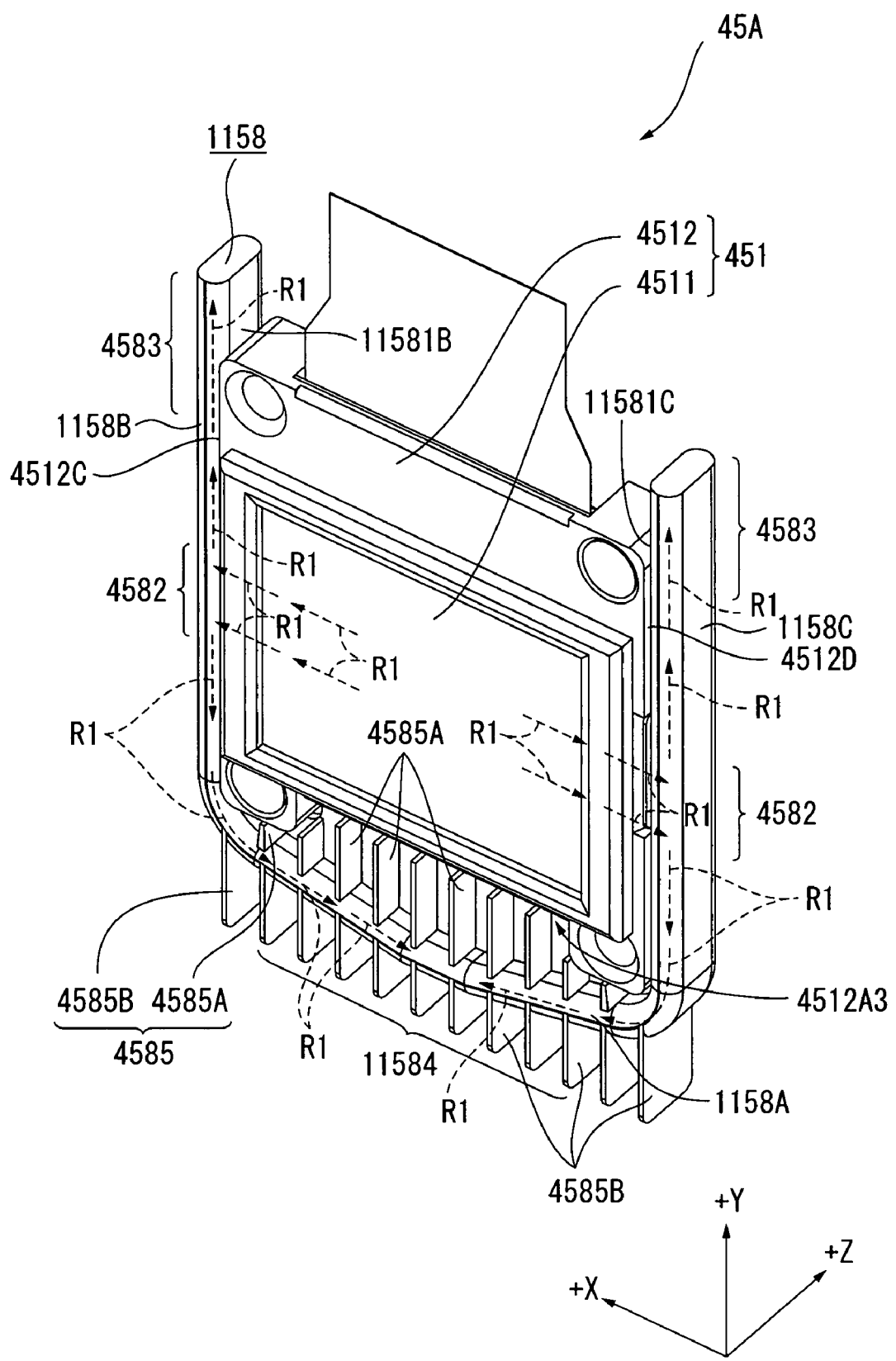
FIG. 16 is a perspective view showing a connecting structure of a heat pipe to an optical modulator of the fifth exemplary embodiment.

FIG. 16 is a perspective view showing a connecting structure of the heat pipe 1158 relative to the optical modulator 451. Note that, in FIG. 16, an optical axis of a light beam irradiated from the optical modulator 451 is defined as Z-axis and two axes orthogonal to Z-axis are defined as X-axis (horizontal axis) and Y-axis (vertical axis) for convenience for description.

As shown in FIG. 16, the heat pipe 1158 is pressed to be bent into a U-shape in plan view, in which a base end 1158A extends in X direction along −Y side of the optical modulator 451, the shape corresponding to the outer profile of the optical modulator 451; a pair of extending portions 1158B, 1158C extends in Y direction along ±sides of the optical modulator 451; and inner surfaces of the U-shape are formed substantially into an ellipse to be flat in parallel to YZ plane in correspondence with the optical-element-side connecting portions 4512C, 4512D of the optical modulator 451. As shown in FIG. 16, the heat pipe 1158 is formed such that a distance between the pair of extending portions 1158B, 1158C (a distance in X direction) is substantially the same as the outer dimension in X direction of the optical modulator 451 and a length of the pair of extending portions 1158B, 1158C in the extending direction is longer than the outer dimension in Y direction of the optical modulator 451. Opposing surfaces 11581B, 11581C of the pair of extending portions 1158B, 1158C of the heat pipe 1158 are a heat-conducting-member-side connecting portion connected with the optical modulator 451 in a heat-transferable manner.

As shown in FIG. 16, the base end 1158A of the heat pipe 1158 is provided with a fin-like portion 4585 for releasing to the outside the heat transferred from a below-described evaporating portion.

More specifically, in the fifth exemplary embodiment, the fin-like portion 4585 is provided as a fin-like (concave-convex) outer surface of the base end 1158A of the heat pipe 1158 and includes a plurality of upper fin-like portions 4585A extending in +Y direction from +Y side of the base end 1158A and a plurality of lower fin-like portions 4585B extending in −Y direction from −Y side of the base end 1158A.

As shown in FIG. 16, the plurality of upper fin-like portions 4585A have a plate-like form and are aligned with a surface disposed in parallel to YZ plane in X direction. As shown in FIG. 16, the plurality of upper fin-like portions 4585A are formed in correspondence with the outer profile on −Y side of the optical modulator 451 (i.e. in correspondence with the profile of the dented portion 4512A3 of the optical modulator 451) such that a height in Y direction of the upper fin-like portions 4585A located substantially at the center is greater than the height of the upper fin-like portion 4585A at both ends in X direction. As shown in FIG. 16, when the heat pipe 1158 is connected with the optical modulator 451, the plurality of the upper fin-like portions 4585A are arranged along to −Y side of the optical modulator 451.

As shown in FIG. 16, the plurality of lower fin-like portions 4585B have a plate-like form and are aligned with surfaces disposed in X direction to be parallel to YZ plane. As shown in FIG. 16, the plurality of lower fin-like portions 4585B are provided such that distal ends thereof are substantially on the same plane.

By fitting the optical modulator 451 in the U-shape of the heat pipe 1158, the optical-element-side connecting portions 4512C, 4512D of the optical modulator 451 surface-contact with the heat-conducting-member-side connecting portions 11581B, 11581C of the heat pipe 1158, so that the optical modulator 451 and the heat pipe 1158 are connected with each other in a heat-transferable manner. The heat pipe 1158 may be connected with the optical modulator 451 by connecting the optical-element-side connecting portions 4512C, 4512D with the heat-conducting-member-side connecting portions 11581B, 11581C by soldering, welding, adhering with a thermally-conductive adhesive and the like. By employing such an arrangement, even a microlevel non-contacting portion caused by surface roughness between the optical-element-side connecting portions 4512C, 4512D and the heat-conducting-member-side connecting portions 11581B, 11581C can be connected in a heat-transferable manner.

Next, a structure for releasing heat generated on the liquid crystal panel 4511 due to irradiation of light beams will be described.

As described above, when the heat pipe 1158 is connected with the optical modulator 451 in a heat-transferable manner, heat generated on the liquid crystal panel 4511 due to irradiation of light beams is released as follows.

For example, as indicated by arrows R1 in FIG. 16, the heat generated on the liquid crystal panel 4511 moves in X direction to the optical-element-side connecting portions 4512C, 4512D connected with the heat pipe 1158 in a heat-transferable manner to be transferred to the holder frame 4512.

As indicated by arrows R1 in FIG. 16, the heat transferred to the holder frame 4512 is transferred to substantially center portions (in Y direction) of the pair of extending portions 1158B, 1158C via the pipe-side connecting portions 11581B, 11581C that are in a heat-transferable connection with the holder frame 4512 of the heat pipe 1158.

Inside the substantially center portions (in Y direction) of the pair of extending portions 1158B, 1158C, coolant is heated by the transferred heat to be evaporated and gasified, where the heat is absorbed as latent heat (vaporization heat). Specifically, the substantially center portions (in Y direction) of the pair of extending portions 1158B, 1158C function as evaporating portions 4582 of the heat pipe 1158.

As indicated by the arrows R1 in FIG. 16, the vaporized coolant forms vapor flow and moves to low-temperature sides (sides located apart from the evaporating portions 4582) which are distal ends of the pair of extending portions 1158B, 1158C of the heat pipe 1158. The coolant having moved to the distal ends of the pair of extending portions 1158B, 1158C and the base end 1158A is cooled and liquidized, releasing the heat (heat-releasing by condensed latent heat). Specifically, the distal ends of the pair of extending portions 1158B, 1158C and the base end 1158A function as condensing portions 4583, 11584 of the heat pipe 1158. Heat in the condensing portion 11584 out of the condensing portions 4583, 11584 is released to the outside via the fin-like portion 4585. Heat in the condensing portions 4583 is directly released to the outside. The coolant liquidized by the condensing portions 4583, 11584 returns to the evaporating portions 4582 through the capillary-tube structure (wick).

As described above and indicated by the arrows R1 in FIG. 16, the heat generated on the liquid crystal panel 4511 moves through a heat transfer passage from the liquid crystal panel 4511 via the holder frame 4512 to the heat pipe 1158 and from the evaporating portions 4582 of the heat pipe 1158 to the condensing portions 4583, 11584 from which the heat is released to the outside via the fin-like portion 4585.

According to the above-described fifth exemplary embodiment, following advantages can be obtained.

In the fifth exemplary embodiment, an outer surface of the heat pipe 1158 is connected with the optical modulator 451 in a heat-transferable manner. Accordingly, as compared with a related-art arrangement, the heat pipe 1158 is directly connected with the optical modulator 451 without interposition of air, heat-resistance on the heat transfer passage from the optical modulator 451 to the heat pipe 1158 may be lowered.

On the outer surface of the heat pipe 1158, the fin-like portion 4585 for releasing heat is provided. Accordingly, the heat absorbed by the evaporating portions 4582 of the heat pipe 1158 from the optical modulator 451 is released to the outside via the fin-like portions 4585. Hence, sufficient heat releasing area can be obtained in the heat pipe 1158 to ensure excellent heat releasing characteristics thereof, so that the temperature of the condensing portions 4583, 11584 located apart from the evaporating portions 4582 can be lowered. Specifically, in the heat pipe 1158, a temperature difference between the evaporating portions 4582 and the condensing portions 4583, 11584 can be set large, thereby increasing the heat transfer rate in the tube.

Hence, the optical modulator 451 can be efficiently cooled to prevent temperature rise in the optical modulator 451, so that thermal degradation of the optical modulator 451 (the liquid crystal panel 4511) can be efficiently avoided. In other words, such an arrangement provides a good projection image from the projector 1 and an increased longevity thereof.

The fin-like portion 4585 is provided on the outer surface of the heat pipe 1158 in a fin-like shape. Accordingly, the heat moving in the tube in the heat pipe 1158 can be efficiently transferred to the fin-like portions 4585 and released via the fin-like portions 4585 as compared to an arrangement where the fin-like portion is provided as a body separated from the heat pipe.

Further, in the fifth exemplary embodiment, the heat pipe 1158 is formed in the U-shape in plan view including the base end 1158A and the pair of extending portions 1158B, 1158C (the pipe-side connecting portions 11581B, 11581C) and the pair of extending portions 1158B, 1158C are respectively connected with the optical-element-side connecting portions 4512C, 4512D of the optical modulator 451. Accordingly, as compared with, for instance, an arrangement where the heat pipe is connected with only one side of the optical modulator 451 in a heat-transferable manner, a plurality of coolant reflux passages (four passages in the fifth exemplary embodiment) can be provided in the tube between one evaporating portion 4582 of the extending portions 1158B, 1158C and the condensing portions 4583, 11584 located apart from the evaporating portions 4582, so that a heat transfer rate in the tube can be increased. To efficiently cool the optical modulator 451, for example, an arrangement where two heat pipes connect with the optical-element-side connecting portions 4512C, 4512D of the optical modulator 451 in a heat-transferable manner may be employed. However, in the arrangement of the fifth exemplary embodiment, the optical modulator 451 can be efficiently cooled by only one heat pipe 1158, so that the structure of the optical device body 45A can be simplified to reduce the cost of the optical device body 45A and the projector 1.

In the fifth exemplary embodiment, the capillary-tube structure of the heat pipe 1158 is provided by a sintered wick. Accordingly, it is not necessary to utilize gravity for the movement of the coolant, so that the condensing portions 4583, 11584 and the evaporating portions 4582 can be disposed without positional limitation. As an example, irrespective of a posture of the projector 1 such as a normal posture, a suspended posture and an inclined posture for adjusting a projection image position, heat in the heat pipe 1158 can be efficiently moved, so that the optical modulator 451 can be efficiently cooled, thereby preventing temperature rise in the optical modulator 451 to efficiently avoid heat degradation of the optical modulator 451.

Since the capillary-tube structure of the heat pipe 1158 is formed by sintered wick, heat resistance between the evaporating portions 4582 and the condensing portions 4583, 11584 can be set sufficiently low as compared with the other wick (extra-fine line wick, metal mesh wick, groove wick and the like) and the heat can be efficiently transferred to the coolant by virtue of the excellent heat conductivity of the wick itself. Accordingly, heat transfer within the heat pipe 1158 can be more rapidly conducted and the cooling efficiency of the optical modulator 451 can be further improved.

The optical modulator 451 and the heat pipe 1158 have shapes that allow a surface-contact of the respective connecting portions (the optical-element-side connecting portions 4512C, 4512D and the pipe-side connecting portions 11581B, 11581C). A contact area between the optical modulator 451 and the heat pipe 1158 can be thus increased, thereby enhancing heat transfer characteristics from the optical modulator 451 to the heat pipe 1158.

In the fifth exemplary embodiment, the pipe-side connecting portions 11581B, 11581C provided on the outer surface of the heat pipe 1158 are pressed to coincide with the profile of the outer surface of the optical modulator 451 (the optical-element-side connecting portions 4512C, 4512D). Accordingly, as compared with an arrangement where an outer surface of a heat pipe (e.g. a heat pipe having a circular cross section) serves as the pipe-side connecting portion and the optical-element-side connecting portion is formed to coincide with the outer profile of the heat pipe, a structure for achieving a surface-contact between the connecting portions of the optical modulator 451 and the heat pipe 1158 (the optical-element-side connecting portions 4512C, 4512D and the pipe-side connecting portions 11581B, 11581C) can be obtained only by pressing the heat pipe 1158, efficiently cooling the optical modulator 451 with a simple arrangement and preventing temperature rise in the optical modulator 451 to efficiently avoid heat degradation of the optical modulator 451.

Sixth Exemplary Embodiment

A sixth exemplary embodiment of the invention will be described below with reference to the attached drawings.

In the following description, the same reference numerals will be attached to the same structures and components as the above-described fifth exemplary embodiment and detailed description thereof will be omitted or simplified.

Figure 17:
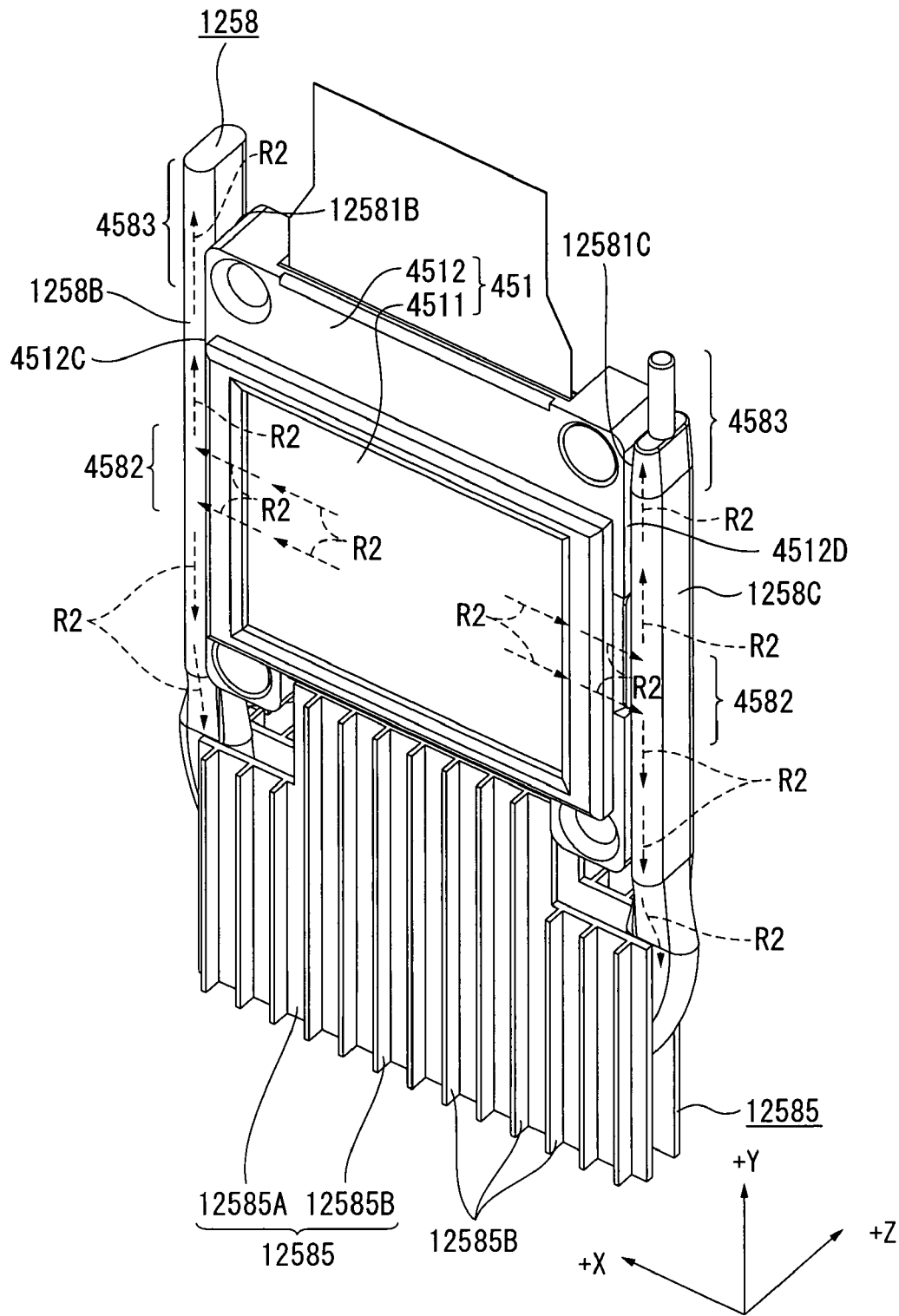
FIG. 17 is a perspective view showing a structure of a heat pipe and a connecting structure of the heat pipe and an optical modulator of a sixth exemplary embodiment.

FIG. 17 is a perspective view showing a structure of a heat pipe 1258 (a heat-conducting member) and a connecting structure of the heat pipe 1258 and the optical modulator 451 according to the sixth exemplary embodiment. Note that, in FIG. 17, an optical axis of a light beam irradiated from the optical modulator 451 is defined as Z-axis and two axes orthogonal to Z-axis are defined as X-axis (horizontal axis) and Y-axis (vertical axis) for convenience for description.

As shown in FIG. 17, the sixth exemplary embodiment differs from the fifth exemplary embodiment in that a fin-like portions 12585 is provided as a body separate from the heat pipe 1258 and attached on an outer surface of the heat pipe 1258. The rest of the arrangement is the same as the fifth exemplary embodiment.

Figure 18:
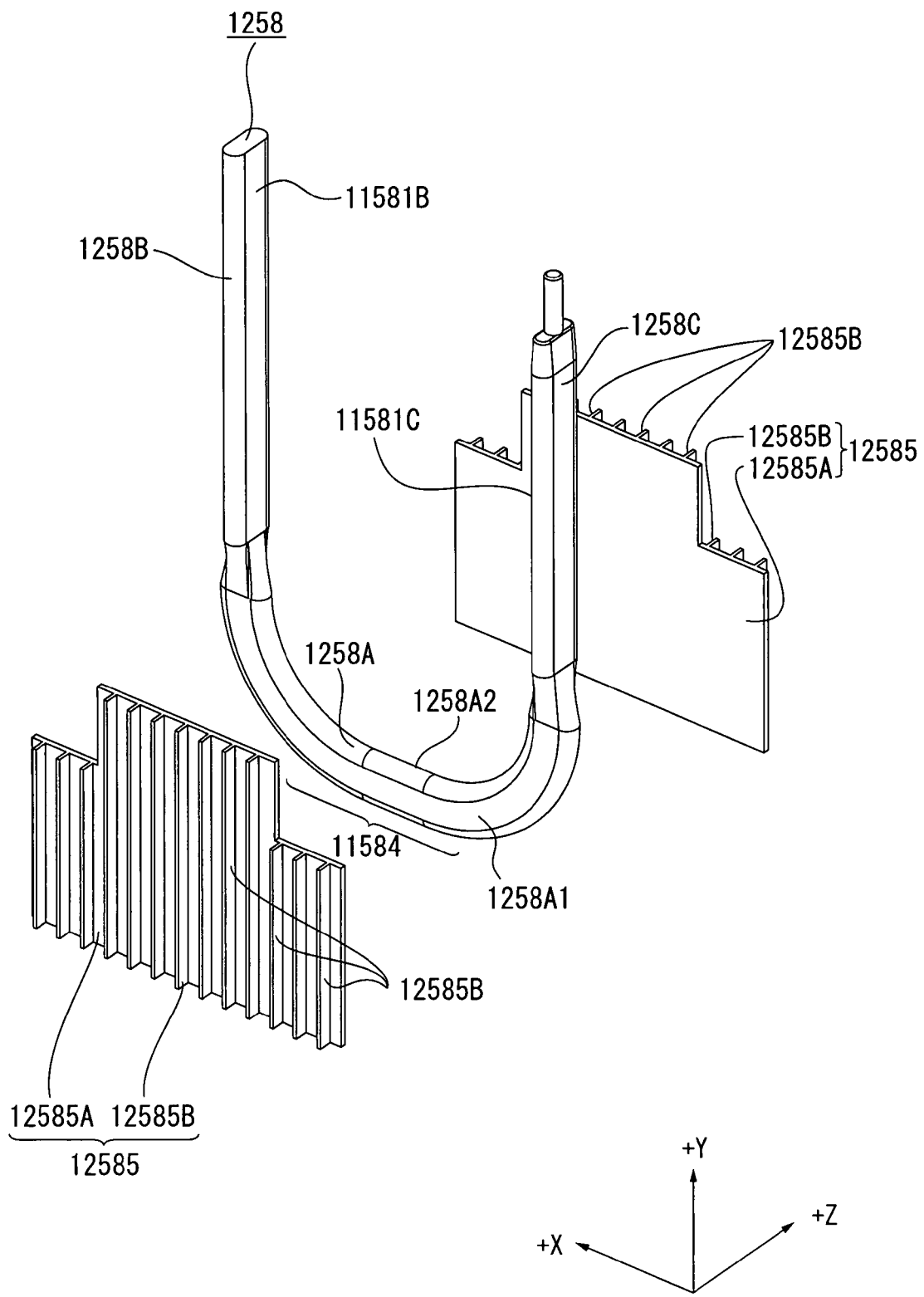
FIG. 18 is an exploded perspective view showing a connecting structure of the heat pipe and a fin-like portion of the sixth exemplary embodiment.

FIG. 18 is an exploded perspective view showing a connecting structure of the heat pipe 1258 and the fin-like portions 12585. In FIG. 18, similarly to FIG. 17, an optical axis of a light beam irradiated from the optical modulator 451 is defined as Z-axis and two axes orthogonal to Z-axis are defined as X-axis (horizontal axis) and Y-axis (vertical axis) for convenience for description.

As shown in FIG. 17 or 18, the heat pipe 1258 has the same function and substantially the same shape as the heat pipe 1158 described in the fifth exemplary embodiment. The heat pipe 1158 is pressed into a form including a base end 1258A (FIG. 18) and a pair of extending portions 1258B, 1258C (including pipe-side connecting portions 11581B, 11581C) which are respectively similar to the base end 1158A of the heat pipe 1158 and the pair of extending portions 1158B, 1158C (the pipe-side connecting portions 11581B, 11581C).

As shown in FIG. 18, the heat pipe 1258 is pressed to exhibit a substantially ellipse cross section in which both of ±Z sides of the base end 1258A is flat in parallel to XY plane. Z sides 1258A1, 1258A2 of the base end 1258A of the heat pipe 1258 serve as fin connectors connected with the fin-like portions 12585 in a heat-transferable manner.

The fin-like portions 12585 are made of, for instance, a thermally conductive material such as a metal material including aluminum. As shown in FIG. 17 or 18, the fin-like portions 12585 are provided by two bodies that are respectively connected in a heat-transferable manner with the fin connectors 1258A1, 1258A2 of the base end 1258A of the heat pipe 1258. As shown in FIG. 17 or 18, the fin-like portions 12585 are respectively constituted by a plate body 12585A and a plurality of fins 12585B integrally provided on the plate body 12585A.

The plate body 12585A is a plate having a substantially rectangular shape in plan view. Specifically, as shown in FIG. 17 or 18, a center portion (in X direction) of an end on +Y side of the body plate 12585A projects in +Y direction in correspondence with the outer profile of an end on −Y side of the optical modulator 451, i.e., in correspondence with the profile of the dented portion 4512A3 of the optical modulator 451.

As shown in FIG. 17 or 18, the plurality of fins 12585B are provided on one of Z sides of the plate body 12585A. As shown in FIG. 17 or 18, the plurality of fins 12585B have a plate-like form and extend from the end on +Y side to the end on −Y side of the plate body 12585A with plate surfaces thereof aligned in X direction in parallel to YZ plane.

The fin-like portions 12585 are connected in a heat-transferable manner with the fin connectors 1258A1, 1258A2 of the heat pipe 1258 on a surface opposite to the surface on which the plurality of fins 12585B are formed. The fin-like portions 12585 may be connected with the heat pipe 1258 by connecting the fin connectors 1258A1, 1258A2 and the fin-like portions 12585 by soldering, welding, adhering with a thermally-conductive adhesive and the like. As shown in FIG. 17, when the heat pipe 1258 connected with the fin-like portions 12585 is connected with the optical modulator 451 (similarly to the connecting structure of the heat pipe 1158 and the optical modulator 451 described in the fifth exemplary embodiment), an end on +Y side of the fin-like portions 12585 extend along −Y side of the optical modulator 451.

Next, a structure for releasing heat generated on the liquid crystal panel 4511 due to irradiation of light beams will be described.

Note that the heat releasing structure of the sixth exemplary embodiment is similar to that of the fifth exemplary embodiment. Specifically, as indicated by the arrows R2 in FIG. 17, the heat generated on the liquid crystal panel 4511 moves through a heat transfer passage from the liquid crystal panel 4511 via the holder frame 4512 to the heat pipe 1258 and from the condensing portions 4583, 11584 (FIG. 18) of the heat pipe 1258 to the condensing portions 4583, 11584 from which the heat is released to the outside via the fin-like portion 12585.

According to the above-described sixth exemplary embodiment, following advantages can be obtained as well as the same advantages as the fifth exemplary embodiment.

In the sixth exemplary embodiment, the fin-like portions 12585 are separated bodies from the heat pipe 1258. Accordingly, as compared with the structure described in the fifth exemplary embodiment (in which the outer surface of the heat pipe 1158 of the fin-like portion 4585 is formed in a fin-like shape), the fin-like portion 12585 can have any shape without limitation, so that the flexibility in designing the fin-like portion 12585 can be improved.

Seventh Exemplary Embodiment

A seventh exemplary embodiment of the invention will be described below with reference to the attached drawings.

In the following description, the same reference numerals will be attached to the same structures and components as the above-described fifth exemplary embodiment and detailed description thereof will be omitted or simplified.

Figure 19:
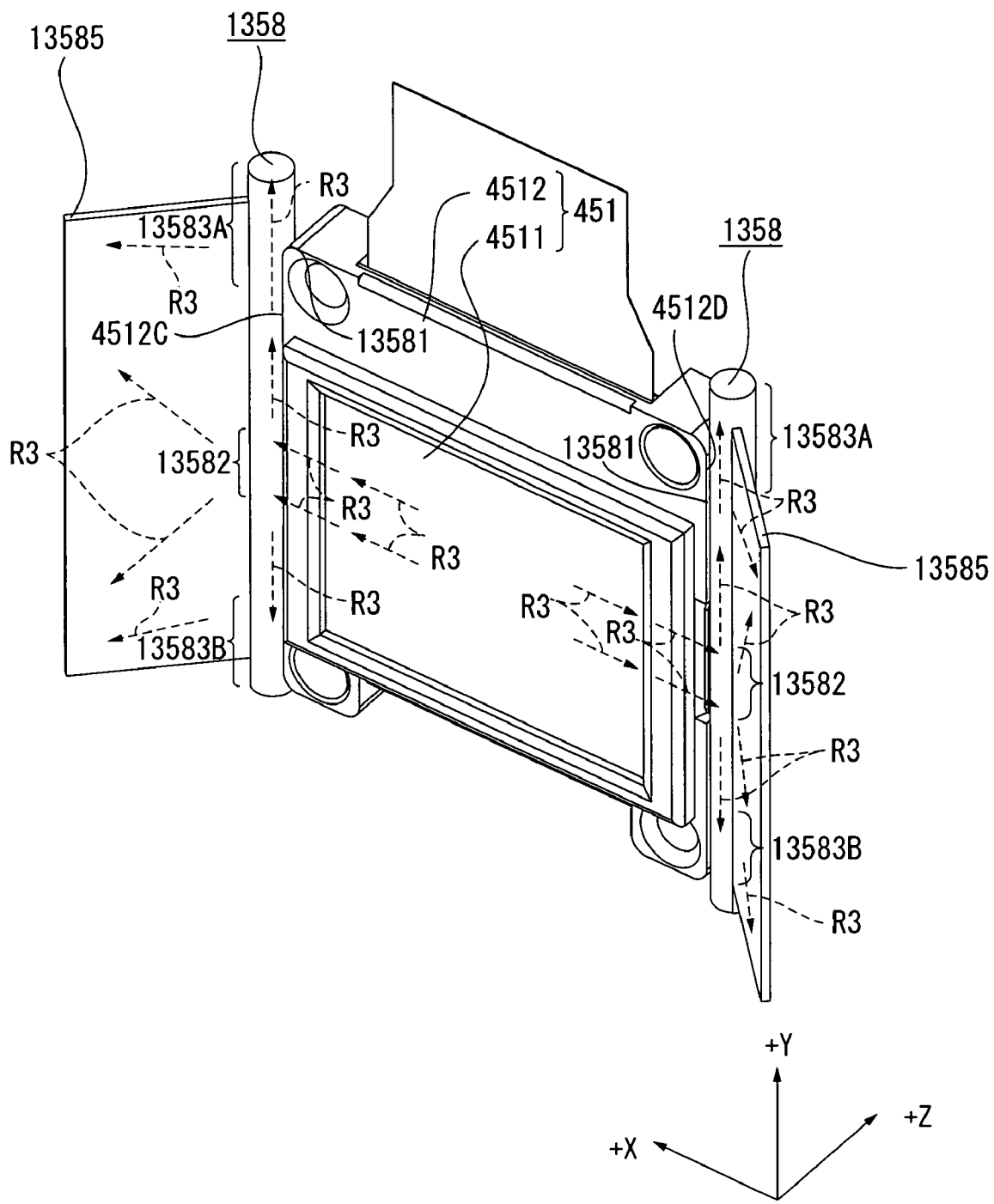
FIG. 19 is a perspective view showing a structure of a heat pipe and a connecting structure of the heat pipe and an optical modulator of a seventh exemplary embodiment.

FIG. 19 is a perspective view showing a structure of a heat pipe 1358 (a heat-conducting member) and a connecting structure of the heat pipe 1358 and the optical modulator 451 according to the seventh exemplary embodiment. Note that, in FIG. 19, an optical axis of a light beam irradiated from the optical modulator 451 is defined as Z-axis and two axes orthogonal to Z-axis are defined as X-axis (horizontal axis) and Y-axis (vertical axis) for convenience for description.

As shown in FIG. 19, the seventh exemplary embodiment differs from the fifth exemplary embodiment only in the structure of the heat pipe 1358. The rest of the arrangement is the same as the fifth exemplary embodiment.

The heat pipe 1358 is a heat pipe that has a function similar to that of the heat pipe 1158 described in the fifth exemplary embodiment, which has an I-shape in plan view extending in Y direction and a substantially circular cross section as shown in FIG. 19. As shown in FIG. 19, the heat pipe 1358 is formed such that a length in Y direction is larger than that of the outer dimension in Y direction of the optical modulator 451. As shown in FIG. 19, an outer surface of the heat pipe 1358 is connected in a heat-transferable manner with the optical-element-side connecting portions 4512C, 4512D of the optical modulator 451. In other words, as shown in FIG. 19, a portion 13581 of the outer surface connected in a heat-transferable manner with the optical-element-side connecting portions 4512C, 4512D of the heat pipe 1358 serves as a pipe-side connecting portion.

Similarly to the fifth exemplary embodiment, the heat pipe 1358 may be connected with the optical modulator 451 by connecting the optical-element-side connecting portions 4512C, 4512D with the pipe-side connecting portions 13581 by soldering, welding, adhering with a thermally-conductive adhesive and the like.

Figure 20:
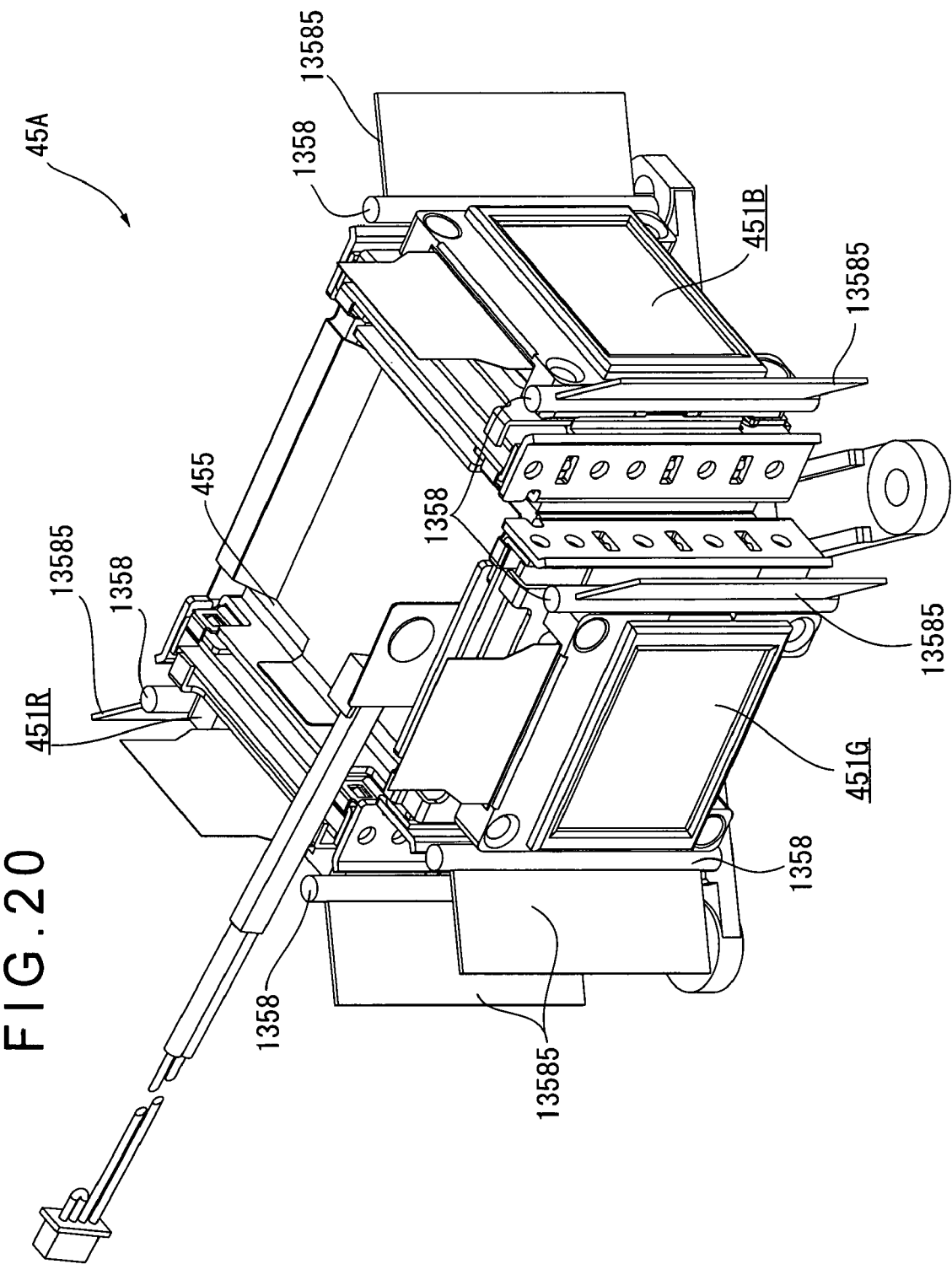
FIG. 20 is an illustration for describing an extending direction of a heat releasing member of the seventh exemplary embodiment.

In the seventh exemplary embodiment, six heat pipes 1358 are provided in correspondence with the number of the optical modulators 451 (the optical-element-side connecting portions 4512C, 4512D) (see FIG. 20).

FIG. 20 is an illustration for showing an extending direction of a fin-like portion 13585.

As shown in FIG. 19, on an outer surface of the heat pipe 1358, a fin-like portion 13585 is provided substantially at a position opposite to the pipe-side connecting portion 13581, the fin-like portion 13585 extending in a direction away from the pipe-side connecting portion 13581.

The fin-like portions 13585 are made of a thermally conductive material such as a metal material including aluminum. The fin-like portions 13585 is a rectangle in plan view as shown in FIG. 19, of which length in Y direction is substantially the same as the length in Y direction of the heat pipe 1358. As shown in FIG. 19, one of the ±Y sides of the fin-like portion 13585 is attached in a heat transferable manner on the heat pipe 1358 substantially at a position opposite to the pipe-side connecting portion 13581. The fin-like portion 13585 may be connected with the heat pipe 1358 by soldering, welding, adhering with a thermally-conductive adhesive and the like.

As shown in FIG. 20, the fin-like portions 13585 are attached on the heat pipe 1358 so as to project in diagonal directions of the rectangular shape in plan view of the cross dichroic prism 455 with the optical device body 45A integrally assembled.

Next, a structure for releasing heat generated on the liquid crystal panel 4511 due to irradiation of light beams will be described.

Note that the heat releasing structure of the seventh exemplary embodiment is substantially the same as that of the fifth exemplary embodiment except for a difference described below.

In the seventh exemplary embodiment, since two heat pipes 1358 having an I-shape in plan view are provided for each optical modulator 451, a substantially center portion (in Y direction) of the heat pipe 1358 functions as an evaporating portion 13582 and both ends (in Y direction) i.e. the low-temperature sides (the sides located apart from the evaporating portion 13582) function as condensing portions 13583A, 13583B.

Specifically, as indicated by arrows R3 in FIG. 19, the heat generated on the liquid crystal panel 4511 moves through a heat transfer passage from the liquid crystal panel 4511 via the holder frame 4512 to the heat pipe 1358 and from the evaporating portion 13582 of the heat pipe 1358 to the condensing portions 13583A, 13583B from which the heat is released to the outside via the fin-like portion 13585. Since the fin-like portion 13585 is connected on the outer surface of the heat pipe 1358 at the positions substantially opposite to the pipe-side connecting portion 13581, a part of the heat transferred to the pipe-side connecting portion 13581 is transferred toward the condensing portion 13583A, 13583B as indicated by the arrows R3 in FIG. 19 and released to the outside.

According to the above-described seventh exemplary embodiment, following advantages can be obtained as well as the same advantages as the fifth exemplary embodiment.

In the seventh exemplary embodiment, since the heat pipe 1358 has the I-shape in plan view, the heat pipe 1358 requires no bending processing or the like, so that the optical modulator 451 can be efficiently cooled by the heat pipe 1358 with a simple structure.

Additionally, the heat pipe 1358 has the I-shape in plan view and the length (in Y direction) slightly longer than the outer dimension in Y direction of the optical modulator 451 and are connected to the optical-element-side connecting portions 4512C, 4512D of the optical modulator 451, so that even when the heat pipe 1358 is attached to the optical modulator 451, the optical device body 45A can be compact in size.

The fin-like portion 13585 that extends in a direction away from the pipe-side connecting portion 13581 and has a length (in Y direction) substantially the same as the length in Y direction of the heat pipe 1358 is attached on the outer surface of the heat pipe 1358 at the position opposite to the pipe-side connecting portion 13581. Accordingly, sufficient heat releasing area of the heat pipe 1358 can be secured, so that a temperature difference between the evaporating portion 13582 and the condensing portions 13583A, 13583B can be set large, thereby increasing the heat transfer rate in the tube.

The fin-like portions 13585 are attached on the heat pipe 1358 so as to project in diagonal directions of the rectangular shape in plan view of the cross dichroic prism 455 with the optical device body 45A integrally assembled. Hence, when the optical device body 45A is integrally assembled, the fin-like portions 13585 attached to the heat pipe 1358 do not mechanically interfere with each other, so that the size of the fin-like portions 13585 can be increased. Accordingly, the heat releasing area of the heat pipe 1358 can be enlarged, so that a temperature difference between the evaporating portion 13582 and the condensing portions 13583A, 13583B can be magnified, thereby further increasing the heat transfer rate in the tube. Therefore, while maintaining the compact size of the optical device body 45A, the optical modulators 451 can be efficiently cooled.

Eighth Exemplary Embodiment

An eighth exemplary embodiment of the invention will be described below with reference to the attached drawings.

In the following description, the same reference numerals will be attached to the same structures and components as the above-described seventh exemplary embodiment and detailed description thereof will be omitted or simplified.

Figure 21:
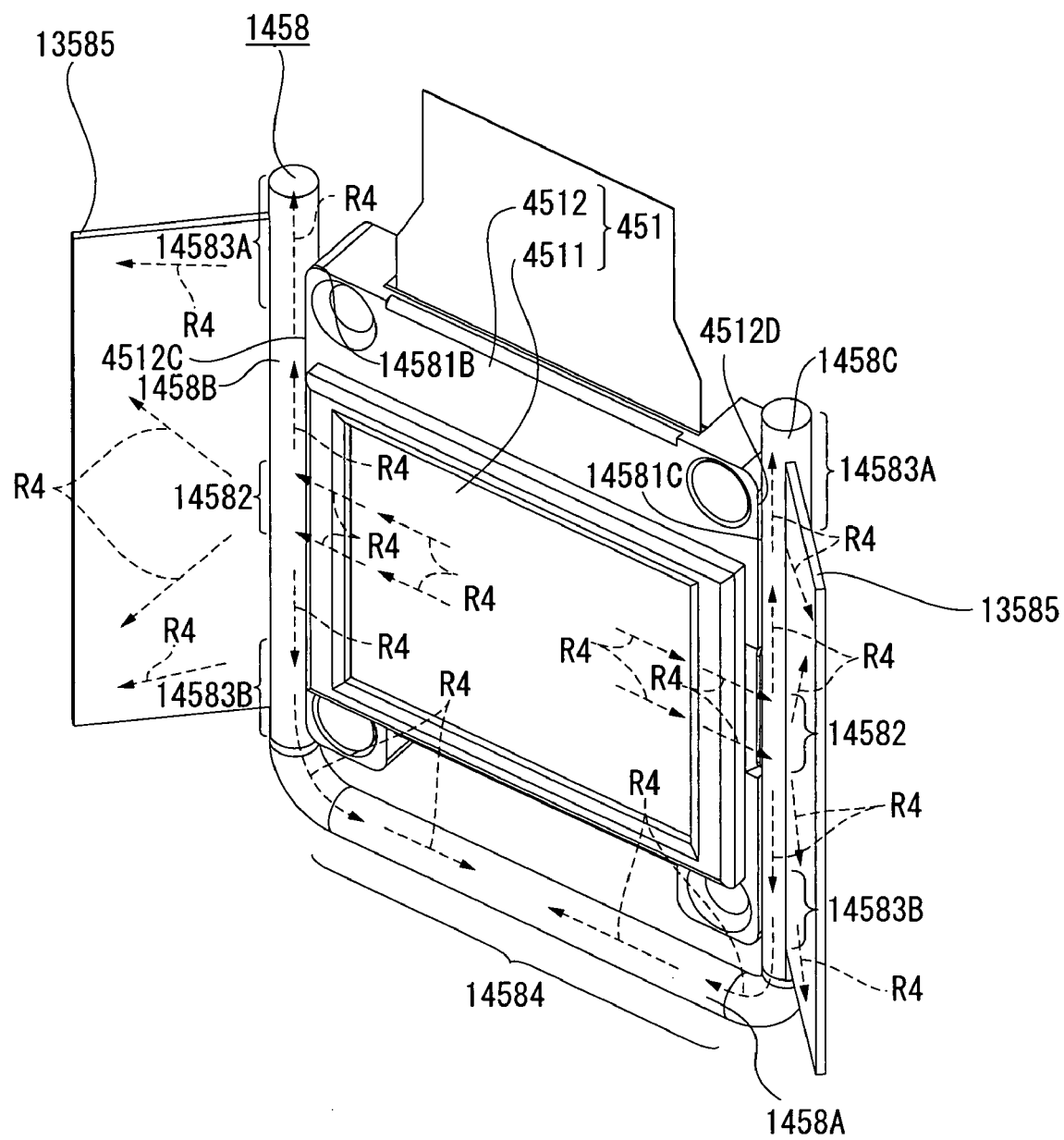
FIG. 21 is a perspective view showing a structure of a heat pipe and a connecting structure of the heat pipe and an optical modulator of an eighth exemplary embodiment.

FIG. 21 is a perspective view showing a structure of a heat pipe 1458 and a connecting structure of the heat pipe 1458 and the optical modulator 451 according to the eighth exemplary embodiment. Note that, in FIG. 21, an optical axis of a light beam irradiated from the optical modulator 451 is defined as Z-axis and two axes orthogonal to Z-axis are defined as X-axis (horizontal axis) and Y-axis (vertical axis) for convenience for description.

As shown in FIG. 21, the ninth exemplary embodiment differs from the seventh exemplary embodiment only in the structure of the heat pipe 1458. The rest of the arrangement is the same as the seventh exemplary embodiment.

The heat pipe 1458 is a heat pipe that has a function and a cross-sectional shape (circular cross section) similar to that of the heat pipe 1358 described in the seventh exemplary embodiment as shown in FIG. 21, the heat pipe 1458 is different from the heat pipe 1358 on −Y side of the heat pipes 1358 shown in FIG. 19 are connected with each other to form a U-shape in plan view.

As shown in FIG. 21, the heat pipe 1458 is pressed into the U-shape in plan view including a base end 1458A extending along −Y side of the optical modulator 451 in correspondence with the outer profile of the optical modulator 451 and a pair of extending portions 1458B, 1458C extending from the ends of X direction of the optical modulator 451. As shown in FIG. 21, the heat pipe 1458 is formed such that a distance between the pair of extending portions 1458B, 1458C is substantially the same as the outer dimension (in X direction) of the optical modulator 451 and a length of the pair of extending portions 1458B, 1458C in the extending direction thereof is longer than the outer dimension in Y direction of the optical modulator 451. As shown in FIG. 21, opposing outer-surfaces of the pair of extending portions 1458B, 1458C of the heat pipe 1458 are connected in a heat-transferable manner with the optical-element-side connecting portions 4512C, 4512D of the optical modulator 451. In other words, as shown in FIG. 21, pipe-side connecting portions 14581B, 14581C of the outer surfaces of the pair of extending portions 1458B, 1458C that is connected in a heat-transferable manner with the optical-element-side connecting portions 4512C, 4512D of the heat pipe 1458 serves as pipe-side connecting portions.

Similarly to the seventh exemplary embodiment, the heat pipe 1458 may be connected with the optical modulator 451 by connecting the optical-element-side connecting portions 4512C, 4512D with the pipe-side connecting portions 14581B, 14581C by soldering, welding, adhering with a thermally-conductive adhesive and the like.

With the above-described arrangement, in the tenth exemplary embodiment, three heat pipes 1458 are provided for the overall optical device body 45A in correspondence with the number of the optical modulators 451.

As shown in FIG. 21, on the outer surfaces of the extending portions 1458B, 1458C of the heat pipe 1458, fin-like portions 13585 are respectively attached in a manner similar to the seventh exemplary embodiment. The fin-like portions 13585 extend in diagonal directions of the rectangular shape in plan view of the cross dichroic prism 455, which is similar to the seventh exemplary embodiment.

Next, a structure for releasing heat generated on the liquid crystal panel 4511 due to irradiation of light beams will be described.

Note that the heat releasing structure of the eighth exemplary embodiment is substantially the same as that of the seventh exemplary embodiment except for a difference described below.

In the eighth exemplary embodiment, since the heat pipe 1458 has the above-described U-shape in plan view in which −Y ends of the heat pipes 1358 of the seventh exemplary embodiment are connected with each other, the substantially center portions (in Y direction) of the pair of extending portions 1458B, 1458C function as evaporating portions 14582 and the both ends in Y direction of the pair of extending portions 1458B, 1458C on the low temperature sides (the sides located apart from the evaporating portions 14582) and the base end 1458A function as condensing portions 14583A, 14583B, 14584.

Specifically, as indicated by the arrows R2 in FIG. 21, the heat generated on the liquid crystal panel 4511 moves through a heat transfer passage from the liquid crystal panel 4511 via the holder frame 4512 to the heat pipe 1458 and from the evaporating portions 14582 of the heat pipe 1458 to the condensing portions 14583A, 14583B from which the heat is released to the outside via the fin-like portions 13585. Similarly to the seventh exemplary embodiment, since the fin-like portions 13585 are provided on the outer surfaces of the heat pipe 1458 at the positions substantially opposite to the pipe-side connecting portions 14581B, 14581C, a portion of the heat transferred to the pipe-side connecting portions 14581B, 14581C is transferred toward the condensing portions 14583A, 14583B as indicated by the arrows R4 in FIG. 21 and released to the outside.

According to the above-described eighth exemplary embodiment, following advantages can be obtained as well as the same advantages as the seventh exemplary embodiment.

In the eighth exemplary embodiment, the heat pipe 1458 is formed in the U-shape in plan view, in which the ends on −Y side of the heat pipes 1358 described in the seventh exemplary embodiment are connected with each other to provide the base end 1458A and the pair of extending portions 1458B, 1458C. Accordingly, the heat pipe 1458 can have the condensing portion 14584 in addition to the evaporating portions 14582 and the condensing portions 14583A, 14583B which respectively correspond to the evaporating portions 13582 and the condensing portions 13583A, 13583B of the two heat pipes 1358 of the seventh exemplary embodiment. In other words, larger condensing portion can be provided on the 1458 as compared with the heat pipe 1358 described in the seventh exemplary embodiment to ensure a larger heat releasing area, so that temperature difference between the evaporating portions and the condensing portions can be set large, thereby increasing heat transfer rate in the tube. Further, unlike the arrangement of the seventh exemplary embodiment using two heat pipes, the optical modulator 451 can be efficiently cooled by only one heat pipe 1458, so that the structure of the optical device body 45A can be simplified, thereby reducing the cost of the optical device body 45A and accordingly the cost of the projector 1.

Ninth Exemplary Embodiment

A ninth exemplary embodiment of the invention will be described below with reference to the attached drawings.

In the following description, the same reference numerals will be attached to the same structures and components as the above-described seventh exemplary embodiment and detailed description thereof will be omitted or simplified.

Figure 22:
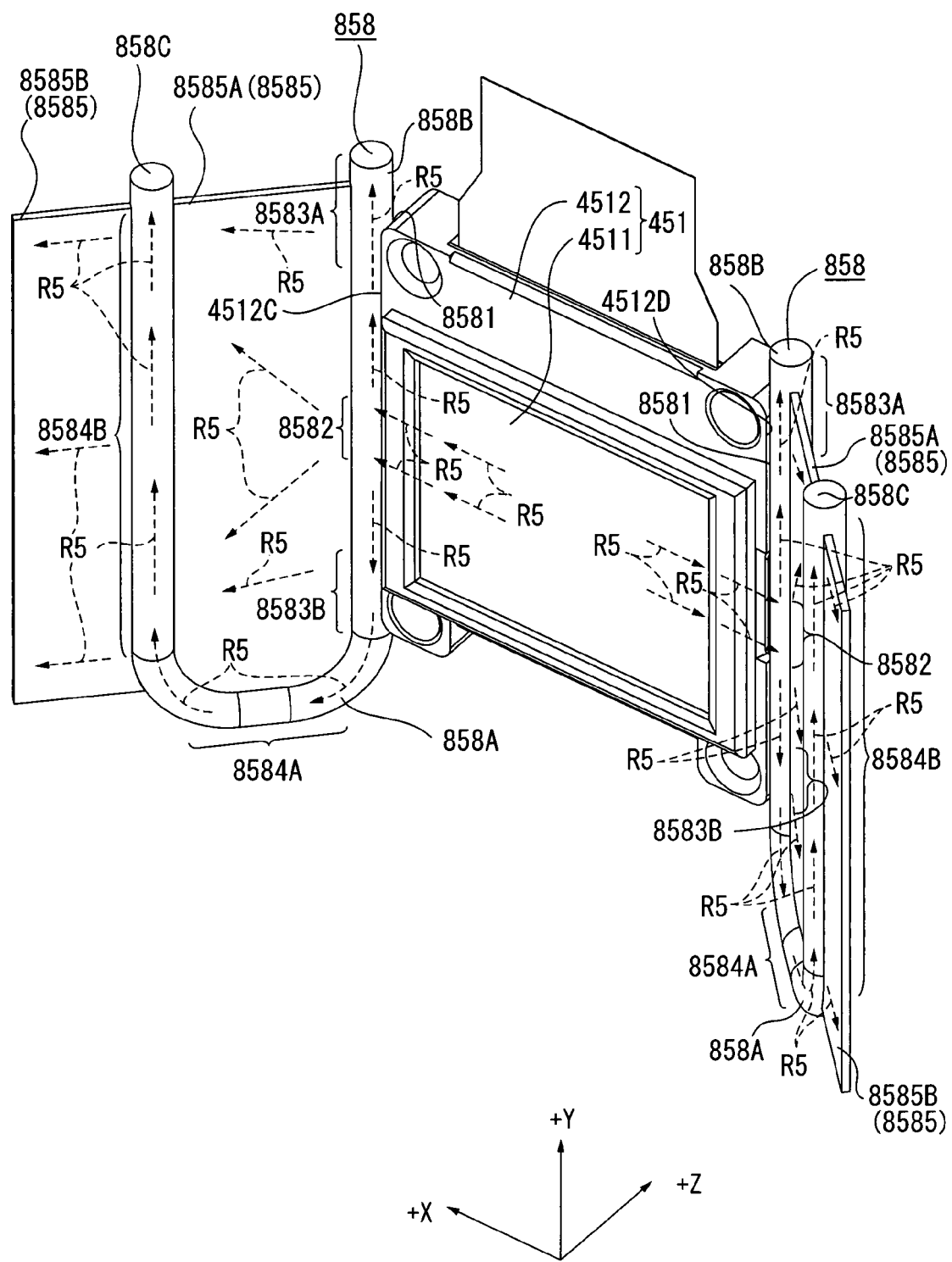
FIG. 22 is a perspective view showing a structure of a heat pipe and a connecting structure of the heat pipe and an optical modulator of a ninth exemplary embodiment.

FIG. 22 is a perspective view showing a structure of a heat pipe 858 and a connecting structure of the heat pipe 858 and the optical modulator 451 according to the ninth exemplary embodiment. Note that, in FIG. 22, an optical axis of a light beam irradiated from the optical modulator 451 is defined as Z-axis and two axes orthogonal to Z-axis are defined as X-axis (horizontal axis) and Y-axis (vertical axis) for convenience for description.

As shown in FIG. 22, the ninth exemplary embodiment differs from the seventh exemplary embodiment only in the structure of the heat pipe 858. The rest of the arrangement is the same as the seventh exemplary embodiment.

The heat pipe 858 is a heat pipe that has a function and a cross-sectional shape (circular cross section) similar to that of the heat pipe 1358 described in the seventh exemplary embodiment, which is different from the heat pipe 1358 in that −Y ends of the heat pipes 1358 shown in FIG. 19 extend and bend to form U-shapes in plan view as shown in FIG. 22.

As shown in FIG. 22, each heat pipe 858 is pressed into the U-shape in plan view including a base end 858A extending along XZ plane and a pair of extending portions 858B, 858C extending from both ends of the based end 858A in +Y direction. As shown in FIG. 22, the heat pipe 858 is formed such that a length in the extending direction (Y direction) is larger than that of the outer dimension in Y direction of the optical modulator 451. As shown in FIG. 22, outer surfaces of the outer sides of the U-shape of the extending portions 858B out of the pair of extending portions 858B, 858C of the heat pipe 858 are respectively connected in a heat-transferable manner with the optical-element-side connecting portions 4512C, 4512D of the optical modulator 451. In other words, as shown in FIG. 22, pipe-side connecting portions 8581 are provided on a part of the outer surfaces of the extending portions 858B connected in a heat-transferable manner with the optical-element-side connecting portions 4512C, 4512D of the heat pipe 858.

Similarly to the seventh exemplary embodiment, the heat pipe 858 may be connected with the optical modulator 451 by connecting the optical-element-side connecting portions 4512C, 4512D with the pipe-side connecting portions 8581 by soldering, welding, adhering with a thermally-conductive adhesive and the like.

With the above-described arrangement, similarly to the seventh exemplary embodiment, six heat pipes 858 are provided for the overall optical device body 45A in the ninth exemplary embodiment.

Figure 23:
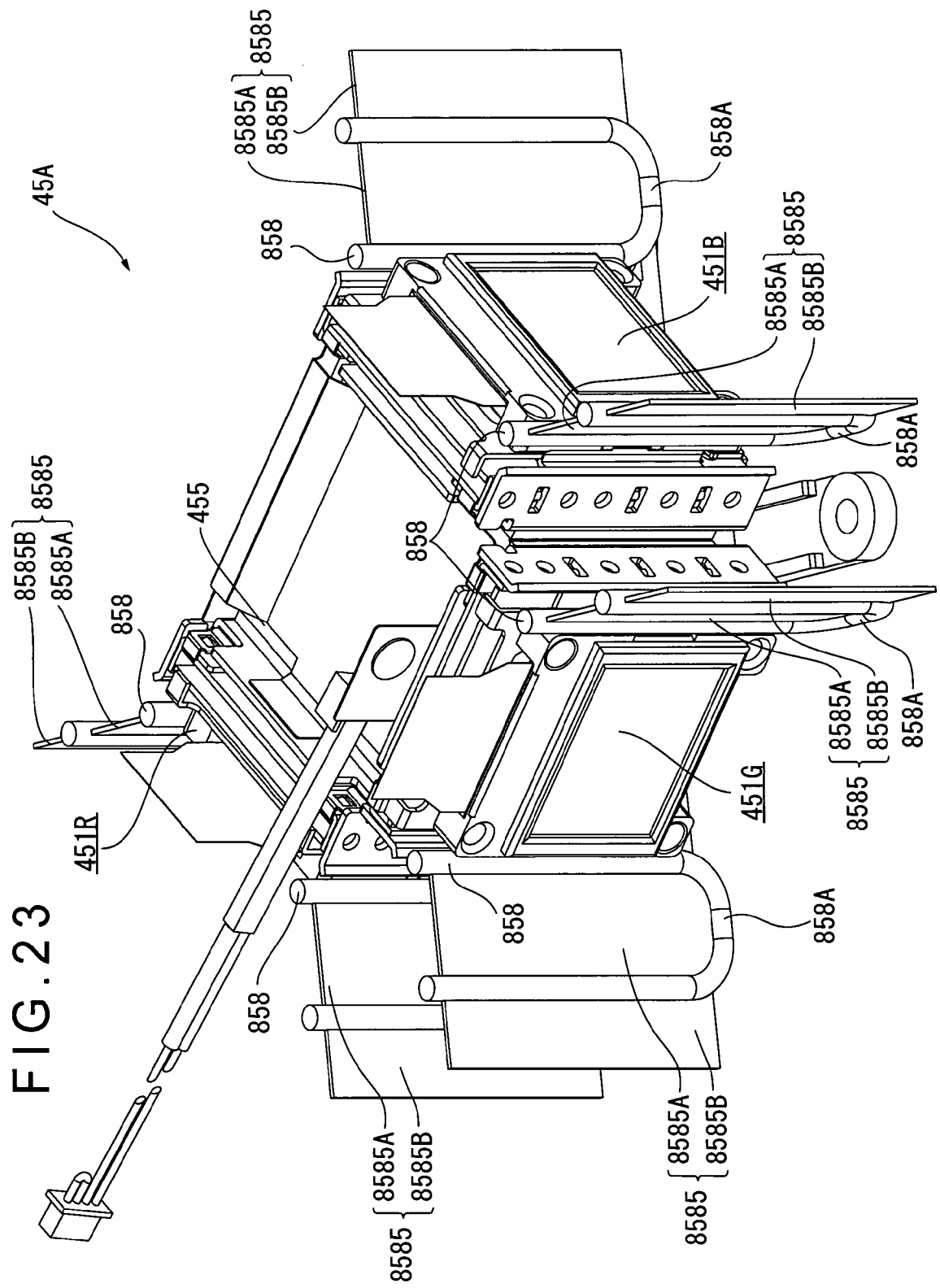
FIG. 23 is an illustration for describing extending directions of a base end, a fin-like portion and a heat releasing plate of the ninth exemplary embodiment.

FIG. 23 is an illustration for showing extending directions of the base end 858A and a fin-like portion 8585 of the heat pipe 858.

As shown in FIG. 22, the fin-like portion 8585 is attached on the outer surface of the heat pipe 858. The fin-like portion 8585 includes a first fin-like portion 8585A attached on the outer surface inside the U-shape of the heat pipe 858 and a second fin-like portion 8585B attached on the outer surface of the outer side of the U-shape of the heat pipe 858.

The first fin-like portion 8585A is formed in substantially the same shape using the same material as the fin-like portions 13585 described in the seventh exemplary embodiment. As shown in FIG. 11, one side of the first fin-like portion 8585A which extends in Y direction is connected in a heat-transferable manner to a position substantially opposite to the pipe-side connecting portion 8581 of the heat pipe 858. As shown in FIG. 22, other sides of the first fin-like portion 8585A are attached in a heat-transferable connection on the outer surfaces of the base end 858A and the extending portion 858C of the inner side of the U-shape of the heat pipe 858 to cover the inside of the U-shape of the heat pipe 858. A connecting structure of a heat releasing plate 8586 and the heat pipe 1358 can be the same as that of the fin-like portions 13585 and the heat pipe 1358 described in the seventh exemplary embodiment.

As shown in FIG. 22, the second fin-like portion 8585B is formed in substantially the same shape using the same material as the above-described first fin-like portions 8585A, the second fin-like portion 8585B extending in the same direction as the extending direction of the base end 858A of the heat pipe 858 and connected in a heat-transferable manner on the outer surface of the outer side of the U-shape of the extending portion 858C of the heat pipe 858. A connecting structure of the fin-like portion 8585 and the heat pipe 1358 can be the same as that of the above-described first fin-like portions 8585A and the heat pipe 858.

As shown in FIG. 23, the base end 858A and the fin-like portions 8585A, 8585B of the heat pipe 858 are attached on the optical modulator 451 so as to project in diagonal directions of the rectangular shape in plan view of the cross dichroic prism 455 with the optical device body 45A integrally assembled.

Next, a structure for releasing heat generated on the liquid crystal panel 4511 due to irradiation of light beams will be described.

Note that the heat releasing structure of the ninth exemplary embodiment is substantially the same as that of the seventh exemplary embodiment but has a difference described below.

In the ninth exemplary embodiment, since the heat pipe 858 has the U-shape in plan view in which the ends on −Y side of the heat pipes 1358 described in the seventh exemplary embodiment are connected with each other and the outer surface of the outer side of the extending portion 858B out of the pair of extending portions 858B, 858C is connected in a heat-transferable manner to the optical modulator 451, the substantially center portion (in Y direction) of the extending portion 858B function as an evaporating portion 8582 and the both ends in Y direction of the extending portion 858B on the low temperature sides (the sides located apart from the evaporating portions 8582), the base end 858A and the extending portion 858C function as condensing portions 8583A, 8583B, 8584A, 8584B.

Specifically, as indicated by arrows R5 in FIG. 22, the heat generated on the liquid crystal panel 4511 moves through a heat transfer passage from the liquid crystal panel 4511 via the holder frame 4512 to the heat pipe 858 and from the evaporating portion 8582 of the heat pipe 858 to the condensing portions 8583A, 8583B, 8584A, 8584B. The heat is released from the condensing portions 8583A, 8583B, 8584A via the first fin-like portion 8585A and from the condensing portion 8584B via the second fin-like portion 8585B. Similarly to the seventh exemplary embodiment, since the first fin-like portions 8585A are provided on the outer surfaces of the heat pipe 858 at the positions substantially opposite to the pipe-side connecting portions 8581, a part of the heat transferred to the pipe-side connecting portions 8581 is transferred toward the condensing portions 8583A, 8583B, 8584A, 8584B as indicated by the arrows R5 in FIG. 22 and released to the outside.

According to the above-described ninth exemplary embodiment, following advantages can be obtained as well as the same advantages as the seventh exemplary embodiment.

In the ninth exemplary embodiment, the heat pipe 858 has the U-shape in plan view formed by the base end 858A and the pair of extending portions 858B, 858C and an outer surface of the outer side of the U-shape on the extending portion 858B out of the pair of extending portions 858B, 858C is connected in a heat-transferable manner to the optical modulator 451. Accordingly, along the sides of the optical modulator 451, by connecting the heat pipes 858 to X sides in Y direction, length in Y direction (i.e. in the thickness) of the projector 1 in which the optical device body 45A is mounted is not increased on account of the heat pipe 858. When the optical device body 45A is housed in the projector 1, the heat pipes 858 can be easily located in gap among components in the projector 1, thereby avoiding increase in size of the projector 1. In addition, by employing the above-described shape of the heat pipes 858 and connecting the heat pipes 858 to the optical modulator 451 in the above-described manner, it is possible to set the length of the heat pipes 858 longer while avoiding increase in size of the projector 1, so that a heat-releasing area of the heat pipes 858 and a temperature difference of the evaporating portions 8582 and the condensing portions 8583A, 8583B, 8584A, 8584B can be increased, thereby increasing the heat transfer rate in the tube.

Further, since the fin-like portion 8585 is attached on the outer surface of the inner side of the U-shape and the outer surface of the outer side of the U-shape of the extending portion 858C of the heat pipe 858, a sufficient heat-releasing area can be obtained while preventing the fin-like portion 8585 from causing increase in size of the optical device body 45A.

Tenth Exemplary Embodiment

A tenth exemplary embodiment of the invention will be described below with reference to the attached drawings.

In the following description, the same reference numerals will be attached to the same structures and components as the above-described ninth exemplary embodiment and detailed description thereof will be omitted or simplified.

Figure 24:
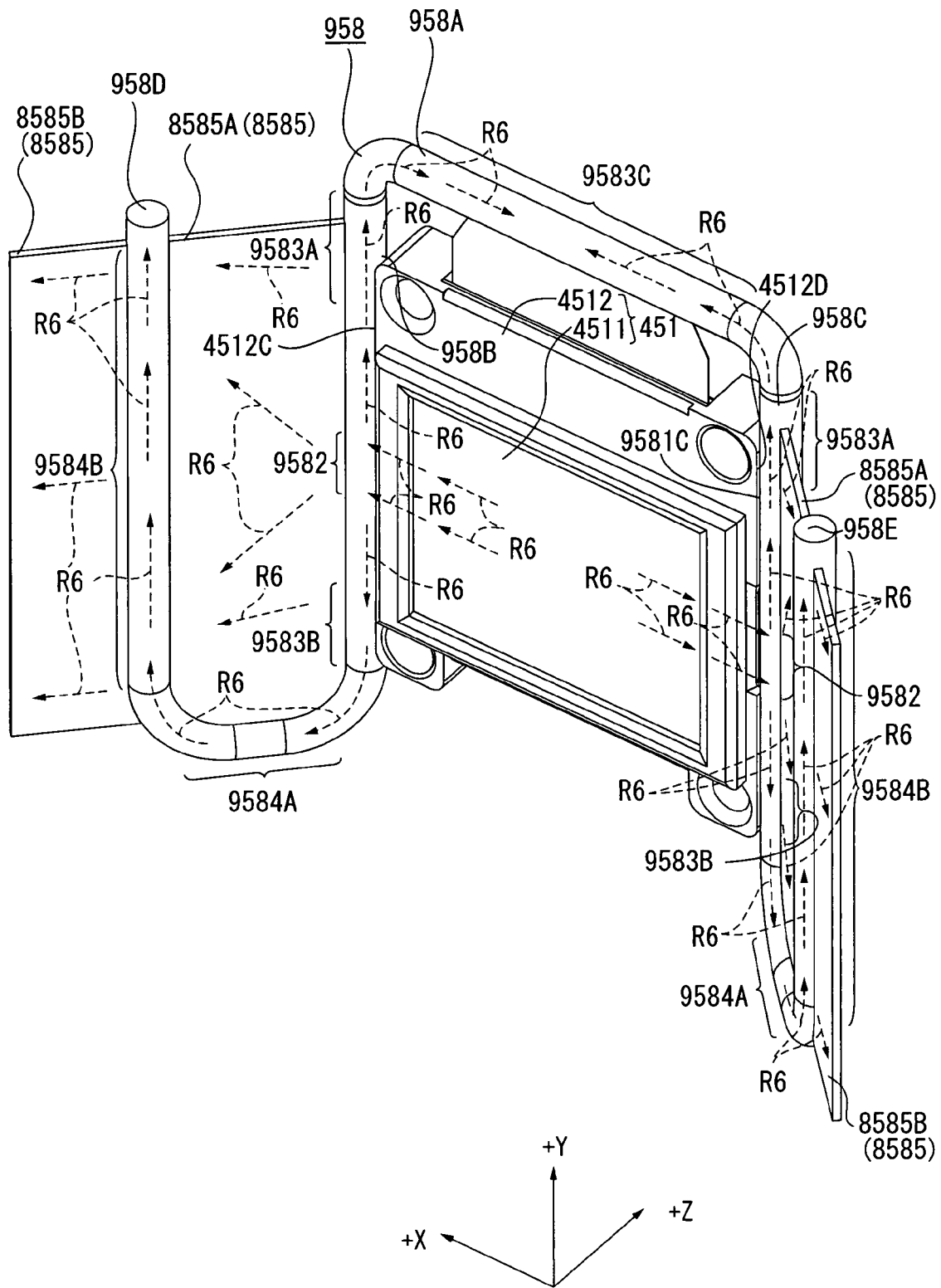
FIG. 24 is a perspective view showing a structure of a heat pipe and a connecting structure of the heat pipe and an optical modulator of a tenth exemplary embodiment.

FIG. 24 is a perspective view showing a structure of a heat pipe 958 (a heat-conducting member) and a connecting structure of the heat pipe 958 and the optical modulator 451 according to the tenth exemplary embodiment. Note that, in FIG. 24, an optical axis of a light beam irradiated from the optical modulator 451 is defined as Z-axis and two axes orthogonal to Z-axis are defined as X-axis (horizontal axis) and Y-axis (vertical axis) for convenience for description.

As shown in FIG. 24, the tenth exemplary embodiment differs from the ninth exemplary embodiment only in the structure of the heat pipe 958. The rest of the arrangement is the same as the ninth exemplary embodiment.

The heat pipe 958 is a heat pipe that has a function and a cross-sectional shape (circular cross section) similar to that of the heat pipe 858 described in the ninth exemplary embodiment except for a difference from the heat pipe 858 in that ends on +Y side of the extending portion 858B of the heat pipes 858 shown in FIG. 22 are connected with each other.

As shown in FIG. 24, the heat pipe 958 is pressed into the U-shape in plan view in correspondence with the outer profile of the optical modulator 451, the U-shape including a base end 958A extending along the surface on +Y side of the optical modulator 451 and a pair of extending portions 958B, 958C extending from ±X sides of the optical modulator 451. The heat pipe 958 is pressed into a shape similar to that of the heat pipe 858 described in the ninth exemplary embodiment, in which ends in −Y direction of the pair of extending portions 958B, 958C are bent to form bend-forming portions 958D, 958E. As shown in FIG. 24, the heat pipe 958 is formed such that a distance between the pair of extending portions 958B, 958C (a distance in X direction) is substantially the same as the outer dimension in X direction of the optical modulator 451. As shown in FIG. 24, opposing outer-surfaces of the pair of extending portions 958B, 958C of the heat pipe 958 are connected in a heat-transferable manner with the optical-element-side connecting portions 4512C, 4512D of the optical modulator 451. In other words, as shown in FIG. 24, pipe-side connecting portions 9581B, 9581C of the outer surfaces of the pair of extending portions 958B, 958C that is connected in a heat-transferable manner with the optical-element-side connecting portions 4512C, 4512D of the heat pipe 958 are provided.

Similarly to the ninth exemplary embodiment, the heat pipe 958 may be connected with the optical modulator 451 by connecting the optical-element-side connecting portions 4512C, 4512D with the pipe-side connecting portions 9581B, 9581C by soldering, welding, adhering with a thermally-conductive adhesive and the like.

With the above-described arrangement, in the tenth exemplary embodiment, three heat pipes 958 are provided for the overall optical device body 45A in correspondence with the number of the optical modulators 451.

The fin-like portions 8585 (each having the first fin-like portion 8585A and the second fin-like portion 8585B) are respectively attached to the extending portion 958B and the bend-forming portion 958D (corresponding to the heat pipe 858 described in the ninth exemplary embodiment) and to the extending portion 958C of the bend-forming portion 958E (corresponding to the heat pipe 858 described in the ninth exemplary embodiment) of the heat pipe 958 in a similar manner to that of the ninth exemplary embodiment as shown in FIG. 24.

Next, a structure for releasing heat generated on the liquid crystal panel 4511 due to irradiation of light beams will be described.

Note that the heat releasing structure of the tenth exemplary embodiment is substantially the same as that of the ninth exemplary embodiment except for a difference described below.

In the tenth exemplary embodiment, since the heat pipe 958 has the shape in which +Y-ends of the heat pipes 858 of the ninth exemplary embodiment are connected with each other, the substantially center portions (in Y direction) of the pair of extending portions 958B, 958C function as evaporating portions 9582 and the both ends in Y direction of the pair of extending portions 958B, 958C on the low temperature sides (the sides located apart from the evaporating portions 9582), the base end 1458A and the bend-forming portion 958D, 958E 8 (corresponding to the base end 858A and the extending portion 858C described in the ninth exemplary embodiment) function as condensing portions 9583A, 9583B, 9583C, 9584A, 9584B.

As indicated by arrows R6 in FIG. 24, the heat generated on the liquid crystal panel 4511 moves through a heat transfer passage from the liquid crystal panel 4511 via the holder frame 4512 to the heat pipe 958 and from the evaporating portions 9582 of the heat pipe 958 to the condensing portions 9583A, 9583B, 9583C, 9584A, 9584B. The heat is released from the condensing portions 9584A, 9584B via the heat releasing plates 8586 and from the condensing portions 9584A, 9584B via the fin-like portions 8585 and the heat releasing plates 8586. Similarly to the ninth exemplary embodiment, since the heat releasing portions 8586 are provided on the outer surfaces of the heat pipe 958 at the positions substantially opposite to the pipe-side connecting portions 9581B, 9581C, a part of the heat transferred to the pipe-side connecting portions 9581B, 9581C is transferred toward the condensing portions 9583A, 9583B, 9584A, 9584B as indicated by the arrows R6 in FIG. 24 and released to the outside.

According to the above-described tenth exemplary embodiment, following advantages can be obtained as well as the same advantages as the ninth exemplary embodiment.

In the ninth exemplary embodiment, the heat pipe 958 is formed in the shape, in which +Y-ends of the extending portions 858B of the heat pipes 858 described in the ninth exemplary embodiment are connected with each other to provide the base end 958A, the pair of extending portions 958B, 958C and the bend-forming portions 958D, 958E. Accordingly, the heat pipe 958 can have the evaporating portions 9582 and the condensing portions 9583A, 9583B, 9584A, 9584B which respectively correspond to the evaporating portions 8582 and the condensing portions 8583, 8584 of the two heat pipes 858 of the ninth exemplary embodiment as well as the condensing portion 9583C. In other words, as compared with the heat pipe 858 described in the ninth exemplary embodiment, the heat pipe 958 has such enlarged condensing portions to ensure a larger heat releasing area, so that temperature difference between the evaporating portions and the condensing portions can be set large, thereby increasing heat transfer rate in the tube. Further, as compared to the arrangement of the ninth exemplary embodiment, the optical modulator 451 can be efficiently cooled by only one heat pipe 958 without providing two heat pipes, the structure of the optical device body 45A can be simplified, thereby reducing the cost of the optical device body 45A.

Eleventh Exemplary Embodiment

An eleventh exemplary embodiment of the invention will be described below with reference to the attached drawings.

In the following description, the same reference numerals will be attached to the same structures and components as the above-described ninth exemplary embodiment and detailed description thereof will be omitted or simplified.

Figure 25:
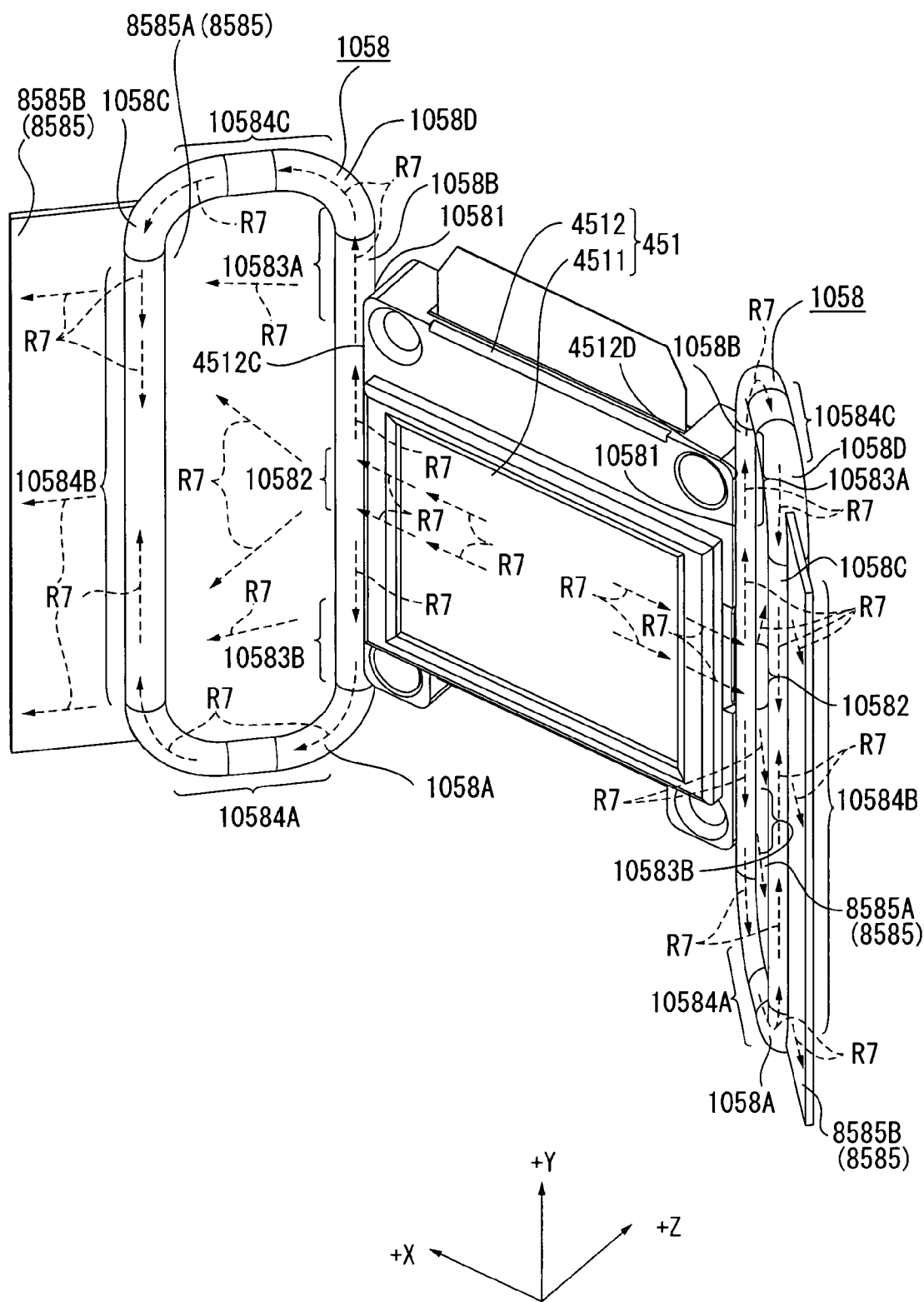
FIG. 25 is a perspective view showing a structure of a heat pipe and a connecting structure of the heat pipe and an optical modulator of an eleventh exemplary embodiment.

FIG. 25 is a perspective view showing a structure of a heat pipe 1058 (a heat-conducting member) and a connecting structure of the heat pipe 1058 and the optical modulator 451 according to the eleventh exemplary embodiment. Note that, in FIG. 25, an optical axis of a light beam irradiated from the optical modulator 451 is defined as Z-axis and two axes orthogonal to Z-axis are defined as X-axis (horizontal axis) and Y-axis (vertical axis) for convenience for description.

As shown in FIG. 25, the tenth exemplary embodiment differs from the ninth exemplary embodiment only in the structure of the heat pipe 1058. The rest of the arrangement is the same as the ninth exemplary embodiment.

The heat pipe 1058 has a function and a cross-sectional shape (circular cross section) similar to that of the heat pipe 858 described in the ninth exemplary embodiment except for a difference from the heat pipe 858 in that +Y ends of the extending portions 858B, 858C of the heat pipes 858 shown in FIG. 22 are connected with each other.

As shown in FIG. 25, the heat pipe 1058 is pressed and bent into a ring rectangular profile in plan view. As shown in FIG. 25, the heat pipe 1058 is formed such that a length in Y direction inside the ring shape is larger than that of the outer dimension in Y direction of the optical modulator 451. As shown in FIG. 25, an outer surface of the outer side of the ring shape of a portion 1058B (corresponding to the extending portion 858B described in the ninth exemplary embodiment) out of a pair of portions extending in Y direction is connected in a heat-transferable manner with the optical-element-side connecting portion 4512C, 4512D of the optical modulator 451. In other words, as shown in FIG. 25, pipe-side connecting portions 10581 of the outer surfaces of the portions 1058B connected in a heat-transferable manner with the optical-element-side connecting portion 4512C, 4512D of the heat pipe 1058 are provided.

Similarly to the ninth exemplary embodiment, the heat pipe 1058 may be connected with the optical modulator 451 by connecting the optical-element-side connecting portions 4512C, 4512D with the pipe-side connecting portions 10581 by soldering, welding, adhering with a thermally-conductive adhesive and the like.

As shown in FIG. 25, the fin-like portion 8585 (the first fin-like portion 8585A, the second fin-like portion 8585B) is attached in a manner similar to an outer surface of the inner side of the ring shape and an outer surface of the outer side of the ring shape of the other portion 1058C out of the pair of portions extending in Y direction of the heat pipe 1058.

The first fin-like portion 8585A is connected in a heat-transferable manner to outer surfaces of the inner side of the ring shape of the portions 1058B, 1058C extending in Y direction, the pair of portions 1058A extending along XY plane (corresponding to the base end 858A of the ninth exemplary embodiment) and a portion 1058D of the heat pipe 1058.

Next, a structure for releasing heat generated on the liquid crystal panel 4511 due to irradiation of light beams will be described.

Note that the heat releasing structure of the eleventh exemplary embodiment is substantially the same as that of the ninth exemplary embodiment but has a difference described below.

In the eleventh exemplary embodiment, since the heat pipe 1058 has the ring shape in which the ends on +Y side of the pair of extending portions 858B, 858C of the heat pipe 858 described in the ninth exemplary embodiment are connected with each other, the substantially center portion (in Y direction) of the portion 1058B extending in Y direction function as an evaporating portion 10582 and the both ends in Y direction of the portion 1058B on the low temperature sides (the sides located apart from the evaporating portion 10582) and the portions 1058A, 1058C, 1058D function as condensing portions 10583A, 10583B, 10584A, 10584B, 10584C.

As indicated by arrows R7 in FIG. 22, the heat generated on the liquid crystal panel 4511 moves through a heat transfer passage from the liquid crystal panel 4511 via the holder frame 4512 to the heat pipe 1058 and from the evaporating portion 10582 of the heat pipe 1058 to the condensing portions 10583A, 10583B, 10584A, 10584B, 10584C. The heat is released from the condensing portions 10583A, 10583B, 10584A, 10584C via the first fin-like portion 8585A and from the condensing portion 10584B via the second fin-like portion 8585B. Similarly to the ninth exemplary embodiment, since the first fin-like portion 8585A is provided on the outer surfaces of the heat pipe 1058 at the position substantially opposite to the pipe-side connecting portion 10581, a portion of the heat transferred to the pipe-side connecting portions 10581 is transferred toward the condensing portions 10583A, 10582B, 10584A, 10584B, 10584C as indicated by the arrows R7 in FIG. 25 and released to the outside.

According to the above-described eleventh exemplary embodiment, following advantages can be obtained as well as the same advantages as the ninth exemplary embodiment.

In the eleventh exemplary embodiment, the heat pipe 1058 has the ring shape in which +Y ends of the pair of extending portions 858B, 858C of the heat pipe 858 described in the ninth exemplary embodiment are connected with each other. Accordingly, in the heat pipe 1058, two reflux passages for coolant in the tube can be provided between the evaporating portions 10582 and the condensing portion 10584B, thereby increasing the heat transfer rate in the tube.

Further, since the fin-like portion 8585 is attached on the inner surface in the ring shape and the outer surface of the outer side of the ring shape at the portion 1058C of the heat pipe 1058, a sufficient heat-releasing area can be obtained while preventing the fin-like portion 8585 from causing increase in size of the optical device body 45A.

Modifications of Fifth to Eleventh Exemplary Embodiments

Note that the scope of the invention is not restricted to the above-described exemplary embodiments, but includes modifications and improvements as long as an object of the invention can be achieved.

In the fifth to eleventh exemplary embodiments, the fin-like portions 4585, 12585, 13585, 8585 may be provided at any positions other than those described in the fifth to eleventh exemplary embodiments as long as the fin-like portions 4585, 12585, 13585, 8585 are provided on the outer surface of the heat pipe (the heat-conducting member).

In the fifth to eleventh exemplary embodiments, the heat pipes 1158, 1258, 1358, 1458, 858, 958, 1058 are used to cool the optical modulators 451. However, the arrangement is not limited thereto and other optical elements such as the polarization converters 423, the incident-side polarizers 452, the irradiation-side polarizers 454 may be cooled.

In the seventh to eleventh exemplary embodiments, the heat pipes 1358, 1458, 858, 958, 1058 have a circular cross section, but the shape thereof is not limited thereto. As described in the fifth and sixth exemplary embodiments, the cross-section may be changed by pressing into a shape such that the pipe-side connecting portions 13581, 14581B, 14581C, 8581, 9581B, 9581C, 10581 are flat to allow surface-contact with the optical modulator 451.

In the seventh to eleventh exemplary embodiments, the fin-like portions 13585, 8585 are provided as bodies separate from the heat pipes 1358, 1458, 858, 958, 1058. However, the arrangement is not limited thereto. The outer surface of the heat pipes may be formed in a fin-like shape similarly to the fifth exemplary embodiment.

In the fifth, sixth and eighth exemplary embodiments, the heat pipes 1158, 1258, 1458 have the U-shape in plan view but may have a ring shape substantially the same as that of the heat pipe 1058 described in the eleventh exemplary embodiment by connecting the distal ends of the U-shape.

In the aforesaid exemplary embodiments, the heat pipes 1158, 1258, 1358, 1458, 858, 958, 1058 have an ellipse or circular cross section, but may have another cross section such as a rectangle, a triangle or a semicircle.

Figure 26:
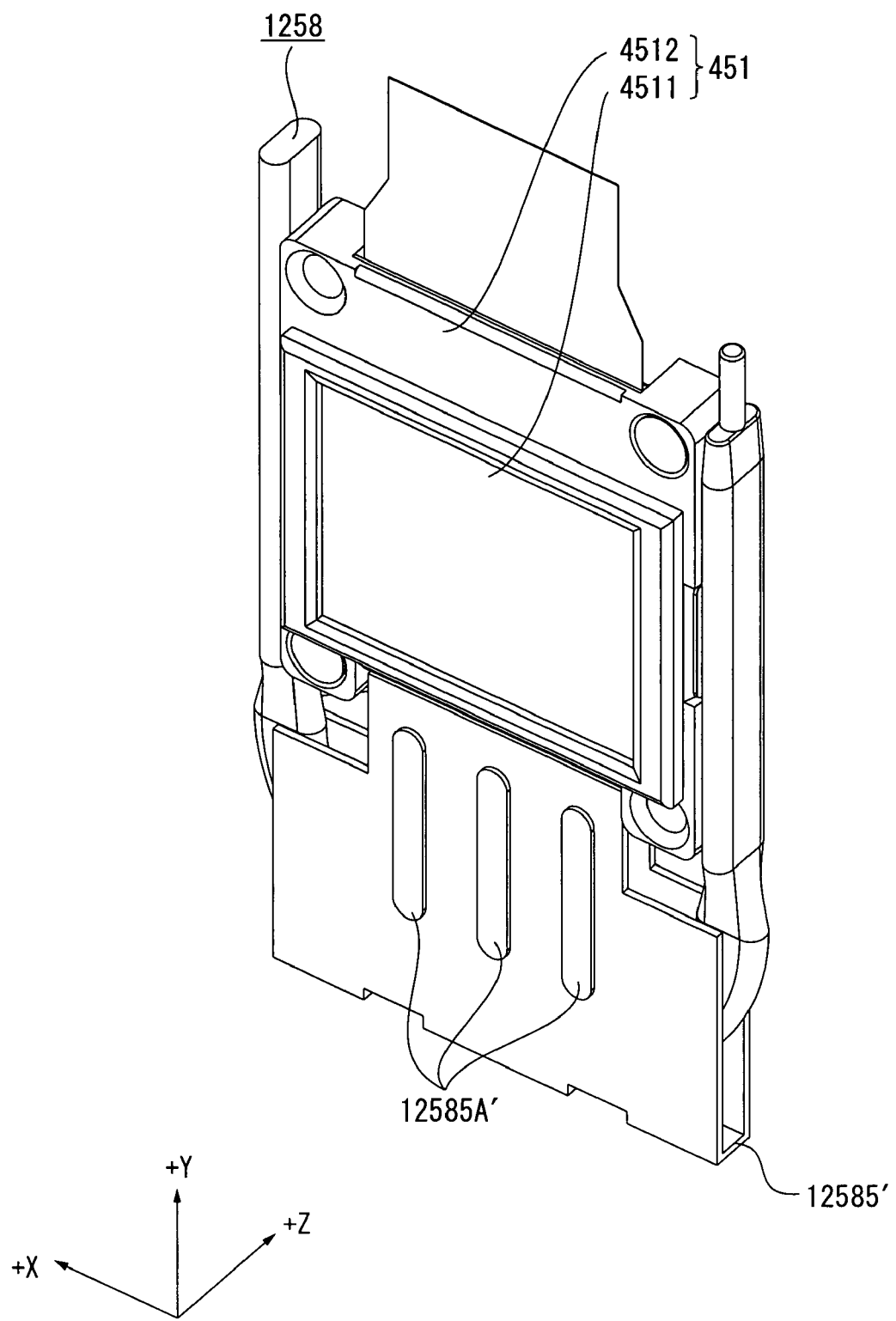
FIG. 26 shows a modification of the sixth exemplary embodiment.
Figure 27:
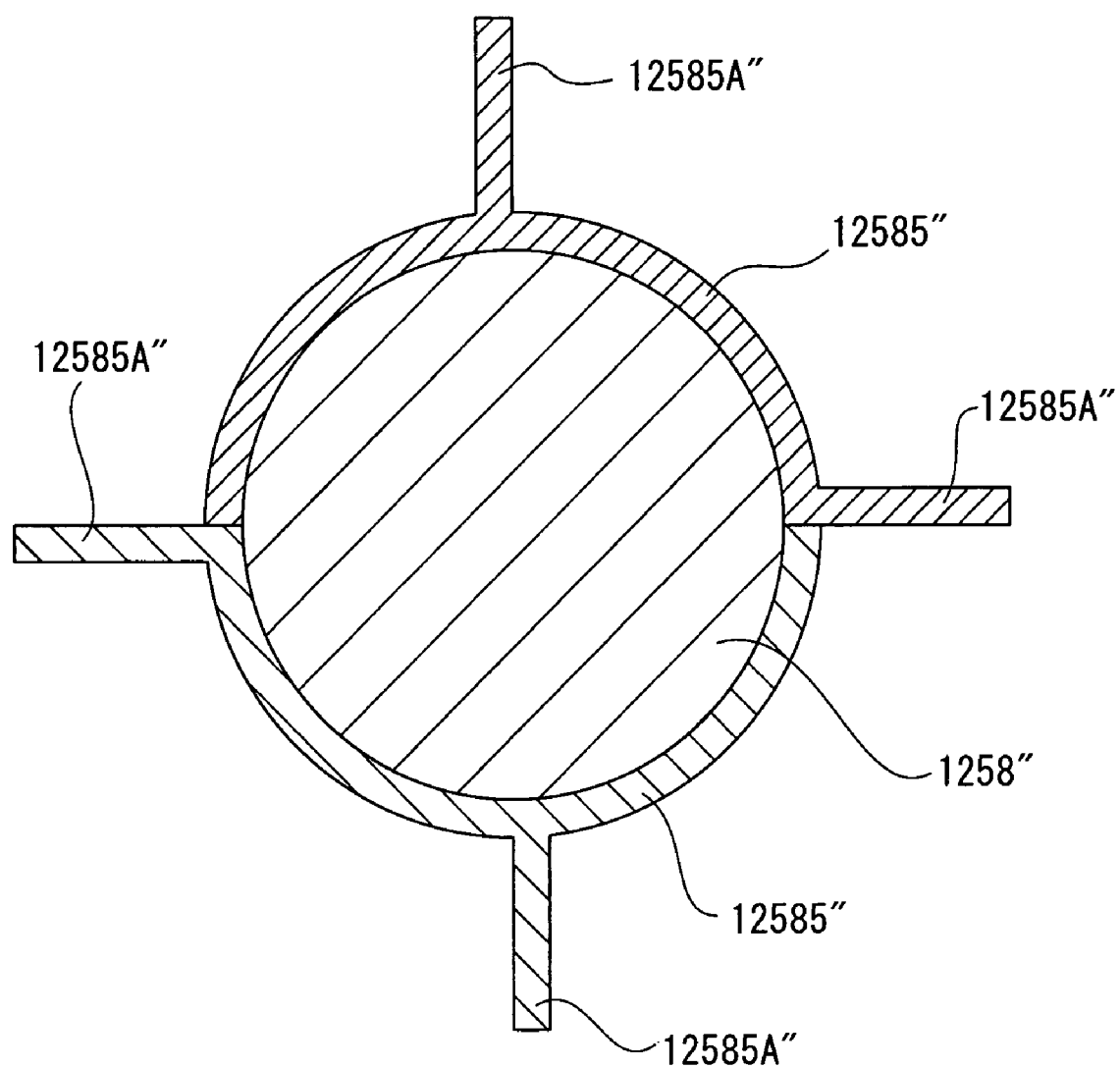
FIG. 27 shows another modification of the sixth exemplary embodiment.

FIGS. 26 and 27 show modifications of the sixth exemplary embodiment.

In the sixth exemplary embodiment, the shape of the fin-like portion 12585 may not be limited to that described in the sixth exemplary embodiment but may be any other shape.

For instance, the fin-like portion 12585' shown in FIG. 26 may alternatively be employed. More specifically, as shown in FIG. 26, the fin-like portion 12585' has the U-shape in cross section into which a plate-like member is pressed (bent) so as to sandwich the fin connectors 1258A1, 1258A2 of the heat pipe 1258. The surfaces of the inner side of the U-shape of the fin-like portion 12585' are connected with the fin connectors 1258A1, 1258A2 in a heat-transferable manner. As shown in FIG. 26, the fin-like portion 12585' has the shape in which the distal end of the U-shape accords with the end on −Y side of the optical modulator 451. As shown in FIG. 26, the fin-like portion 12585' has the shape in which protrusions 12585A' protruding in Y direction are formed on a surface intersecting Z direction.

Alternatively, the fin-like portion 12585" shown in FIG. 27 may be employed. As shown in FIG. 27, the fin-like portion 12585" is provided as two bodies that are formed by sheet-processing a metal member of aluminum or the like, each body including two fins 12585A" having a curved surface to coincide with the outer surface of the circular-cross-sectional heat pipe 1258" at positions spaced apart from the heat pipe 1258". The curved outer surfaces of the fin-like portions 12585" are connected with the outer surface of the heat pipe 1258" in a heat-transferable manner so as to cover the outer surface of the heat pipe 1258" in the connected state.

Modifications of First to Eleventh Exemplary Embodiments

Though the light source device 41 is a discharge-emission light source device in the above exemplary embodiments, various solid light-emitting elements such as laser diode, LED (Light Emitting Diode), Organic EL (Electro-Luminescence) element, silicon light-emitting element and the like may alternatively be used.

Though a single light source device 41 is used and the light from the light source device 41 is separated into three color lights by the color separating optical device 43 in the above exemplary embodiments, the color separating optical device 43 may not be provided and three solid light-emitting elements respectively emitting the three color lights may be used as the light source device.

Though the projector 1 is a three-plate projector having three liquid crystal panels 4511 in the above exemplary embodiments, the projector 1 may be a single-plate projector having a single liquid crystal panel. Alternatively, the projector 1 may be a projector having two liquid crystal panels or a projector having more than three liquid crystal panels.

In the above-described exemplary embodiments, although a transmissive liquid crystal panel having different light-incident side and light-irradiation side is used, a reflective liquid crystal panel having common light-incident side and light-irradiation side may be used.

In the above-described embodiments, the liquid crystal panel is used as the optical modulating element, an optical modulating element using a micro mirror or the like other than a liquid crystal panel may be used. In such case, the incident-side polarizers 452 and the irradiation-side polarizers 454 on the light-incident side and the light-emitting side can be omitted.

In the above exemplary embodiments, the front-type projector that projects an image in a direction for observing a screen is taken as an example, but the invention may be applied to a rear-type projector that projects an image in a direction opposite to the direction for observing the screen.

Although the best mode and the like for implementing the invention have been disclosed above, the invention is not limited thereto. In other words, while the invention has been mainly illustrated and described on the specific exemplary embodiment, a person skilled in the art can modify the arrangements such as shape, material, quantity and the like of the above-described exemplary embodiment without departing from the technical idea and scope of the invention.

Therefore, the description limiting the shapes, materials and the like disclosed above is intended to be illustrative for easier understanding but not to limit the invention, hence the invention includes a description using a name of the components without a part of or all of the limitation on the shapes, materials and the like.

Since an optical element can be efficiently cooled, the invention can be suitably applied to a projector used for presentation, home theatre system and the like.

What is claimed is:

1. A projector, comprising:
   a light source device;
   an optical device that modulates a light beam irradiated from the light source device in accordance with image information; and
   a projection optical device that projects the light beam modulated by the optical device, wherein
   the optical device includes:
      an optical element optically converting the light beam incident thereon and emitting the converted light beam; and
      a heat pipe having an outer surface that is connected with the optical element in a heat transferable manner to cool the optical element, the heat pipe including: a tube; a capillary structure provided in the tube; and a coolant housed in the tube, the coolant circulating in the tube to transfer heat in the heat pipe, and
   the heat pipe has a U-shape in plan view which is formed by a base end extending in a predetermined direction and a pair of extending portions extending from ends of the base end in a direction substantially orthogonal to an extending direction of the base end, the outer surface of the heat pipe being pressed so as to coincide with a profile of an outer surface of the optical element such that the heat pipe surface-contacts with the outer surface of the optical element.

2. The projector according to claim 1, wherein the capillary structure of the heat pipe is provided by a sintered wick.

3. The projector according to claim 1, wherein a fin-like portion for heat-releasing is provided on the outer surface of the heat pipe.

4. The projector according to claim 3, wherein the fin-like portion is made by forming the outer surface of the heat pipe into a fin-like shape.

5. The projector according to claim 3, wherein the fin-like portion is a body separate from the heat pipe, the fin-like portion being connected to the outer surface of the heat pipe in a heat transferable manner.

6. A projector, comprising:
   a light source device;

an optical device that modulates a light beam irradiated from the light source device in accordance with image information; and a projection optical device that projects the light beam modulated by the optical device, wherein the optical device includes:

an optical element optically converting an incident light beam and emitting the converted light beam; and a heat pipe having an outer surface that is connected with the optical element in a heat transferable manner to cool the optical element, the heat pipe including: a tube; a capillary structure provided in the tube; and a coolant housed in the tube, the coolant circulating in the tube to transfer heat in the heat pipe, and a fin-like portion for heat-releasing is provided on the outer surface of the heat pipe, the heat pipe having a U-shape in plan view which is formed by a base end extending in a predetermined direction and a pair of extending portions extending from ends of the base end in a direction substantially orthogonal to an extending direction of the base end, an outer surface of one of the pair of extending portions being connected with the optical element at an outer side of the U-shape in a heat transferable manner, and the fin-like portion includes a first fin-like portion provided on the outer surface of the heat pipe at an inner side of the U-shape to cover the entire inner side of the U-shape and a second fin-like portion provided on the outer surface of the heat pipe at the outer side of the U-shape.

7. The projector according to claim 6, wherein the optical device includes:

a color-combining projector in a rectangular shape in plan view that includes three light-incident-side surfaces on which the light beam is respectively incident and a light-emitting-side surface from which the light beam is irradiated, the color-combining projector emitting the incident light beams after being combined;

three of the optical element are respectively provided on the three light-beam incident side surfaces so as to enclose the color-combining projector;

a plurality of the heat pipes are provided and connected to respective sides of the three optical elements in a heat transferable manner at positions corresponding to the four corners of the rectangular shape in plan view of the color-combining projector; and the fin-like portions provided on the plurality of the heat pipes extend in diagonal directions of the rectangular shape in plan view of the color-combining projector.

8. The projector according to claim 1, wherein the optical element is pressed so as to coincide with the outer surface of the U-shape.

9. The projector according to claim 8, wherein the outer surface of the optical element only surface-contacts with the heat pipe on three sides.

10. The projector according to claim 6, wherein the first fin-like portion is formed in a plane substantially parallel to a plane extending between the pair of extending portions of the heat pipe, and the first fin-like portion extends between the pair of extending portions of the heat pipe such that the first fin-like portion covers the inner side of the U-shape.

* * * * *